(12) United States Patent
Yamaga et al.

(10) Patent No.: US 12,347,457 B2
(45) Date of Patent: Jul. 1, 2025

(54) CARTRIDGE INCLUDING MAGNETIC TAPE INCLUDING MAGNETIC LAYER INCLUDING PROTRUSIONS ON SURFACE THEREOF

(71) Applicant: Sony Group Corporation, Tokyo (JP)

(72) Inventors: Minoru Yamaga, Tokyo (JP); Yuji Iwahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/284,223

(22) PCT Filed: Mar. 31, 2022

(86) PCT No.: PCT/JP2022/016735
§ 371 (c)(1),
(2) Date: Sep. 26, 2023

(87) PCT Pub. No.: WO2022/211066
PCT Pub. Date: Oct. 6, 2022

(65) Prior Publication Data
US 2024/0170019 A1    May 23, 2024

(30) Foreign Application Priority Data
Mar. 31, 2021    (JP) ................. 2021-062464

(51) Int. Cl.
*G11B 23/027*    (2006.01)
*G11B 5/008*    (2006.01)

(52) U.S. Cl.
CPC ........ *G11B 23/027* (2013.01); *G11B 5/00813* (2013.01)

(58) Field of Classification Search
None
See application file for complete search history.

(56) References Cited

U.S. PATENT DOCUMENTS

| | | | | |
|---|---|---|---|---|
| 3,846,223 A | * | 11/1974 | Lederman et al. | B29C 45/0013 264/105 |
| 5,881,960 A | * | 3/1999 | Christie | G11B 23/08778 |
| 2002/0089780 A1 | * | 7/2002 | Soda | G11B 33/1493 |
| 2004/0164198 A1 | * | 8/2004 | Ishihara | G11B 23/043 242/348 |
| 2004/0214048 A1 | * | 10/2004 | Ide | G11B 5/7085 428/844 |

(Continued)

FOREIGN PATENT DOCUMENTS

EP    0618580 B1 *    9/1999
JP    2002121296 A *    4/2002
(Continued)

OTHER PUBLICATIONS

International Search Report from corresponding PCT application PCT/JP2022/008221, dated Jun. 21, 2022.

*Primary Examiner* — William J Klimowicz
(74) *Attorney, Agent, or Firm* — K&L Gates LLP

(57) ABSTRACT

Provided is a cartridge capable of curbing charging of a magnetic tape even in a case where a drive gear is configured of an insulating resin.
The cartridge includes a reel that has conductivity and includes a bottom wall, a magnetic tape that is wound around the reel, and a conductive member that is in contact with the reel, the conductive member having a reel gear on a lower surface of the bottom wall.

13 Claims, 24 Drawing Sheets

(56) References Cited

U.S. PATENT DOCUMENTS

| | | | | |
|---|---|---|---|---|
| 2005/0105210 A1* | 5/2005 | Okawa | ............ | G11B 15/67 |
| 2005/0145736 A1* | 7/2005 | Hiraguchi | ............ | G11B 23/043 |
| | | | | 242/348 |
| 2005/0230513 A1* | 10/2005 | Asano | ............ | G11B 23/044 |
| | | | | 242/348 |
| 2010/0246073 A1* | 9/2010 | Katayama | ............ | G11B 5/7085 |
| | | | | 360/324 |
| 2011/0240786 A1* | 10/2011 | Takenoshita | ............ | B65H 75/50 |
| | | | | 242/348.3 |
| 2016/0093322 A1* | 3/2016 | Kasada | ............ | G11B 5/708 |
| | | | | 428/840.2 |
| 2024/0170013 A1* | 5/2024 | Yamaga | ............ | G11B 5/708 |

FOREIGN PATENT DOCUMENTS

| | | | | | | |
|---|---|---|---|---|---|---|
| JP | 2003022643 A | | 1/2003 | | | |
| JP | 2003223774 A | * | 8/2003 | ............ | B82Y 10/00 |
| JP | 2005196938 A | * | 7/2005 | ............ | G11B 23/043 |
| JP | 2006073089 A | * | 3/2006 | | |
| JP | 2006073090 A | | 3/2006 | | |
| JP | 2011210342 A | * | 10/2011 | ............ | B29C 45/0005 |
| WO | WO-03065373 A1 | * | 8/2003 | ............ | B82Y 10/00 |

* cited by examiner

CARTRIDGE INCLUDING MAGNETIC TAPE INCLUDING MAGNETIC LAYER INCLUDING PROTRUSIONS ON SURFACE THEREOF

TECHNICAL FIELD

The present disclosure relates to a cartridge.

BACKGROUND ART

Since a coating-type magnetic tape includes magnetic powder fixed with a non-conductive binder (organic substance), a surface of a magnetic layer (hereinafter, referred to as a "magnetic surface") is likely to be charged. If the magnetic surface is charged, unexpected electrical discharge may occur, and a magnetic head may be damaged. Since a tunnel magneto resistance effect (TRM) element in the magnetic head is vulnerable to an excess current, the TRM element is particularly likely to be damaged if unexpected electrical discharge happens. Therefore, a technology for curbing charging of a magnetic tape has been desired.

Patent Literature 1 discloses that a reel hub is electrically connected to a reel drive shaft at the time of tape loading and a magnetic tape is prevented from being charged by the reel hub being formed of a conductive material. Also, it discloses that the above configuration is made on the assumption that at least a surface of the reel drive shaft (spindle) is configured of a conductive material such as metal and an electrical resistance [Ω] from the reel hub as a ground terminal to the ground is the order of 10 to the power of 7 or less.

CITATION LIST

Patent Literature

[PTL 1]
JP 2003-223774A

SUMMARY

Technical Problem

In a drive of the magnetic tape, a reel gear of a cartridge reel comes into contact with a drive gear of the drive at the time of tape loading. However, since the drive gear of the drive is configured of an insulating resin in a case of a typical drive, it is difficult to curb charging of the magnetic tape if the reel hub is formed of a conductive material as in Patent Literature 1.

An object of the present disclosure is to provide a cartridge capable of curbing charging of a magnetic tape even in a case where a drive gear is configured of an insulating resin.

Solution to Problem

In order to solve the above problem, the present disclosure provides a cartridge including: a reel that has conductivity; a magnetic tape that is wound around the reel; and an elastic member that has conductivity, in which the reel has a reel gear that meshes with a drive gear, and the elastic member is configured to be able to be biased toward a conductive portion included in a spindle of a drive when the reel gear meshes with the drive gear.

The present disclosure provides a cartridge including: a reel that has conductivity; a magnetic tape that is wound around the reel; and an elastic member that has conductivity, in which the reel has a reel gear that meshes with a drive gear, and the elastic member is configured to be able to be biased toward a conductive portion included in a spindle of a drive when the reel gear meshes with the drive gear.

DESCRIPTION OF EMBODIMENTS

Figure 1:
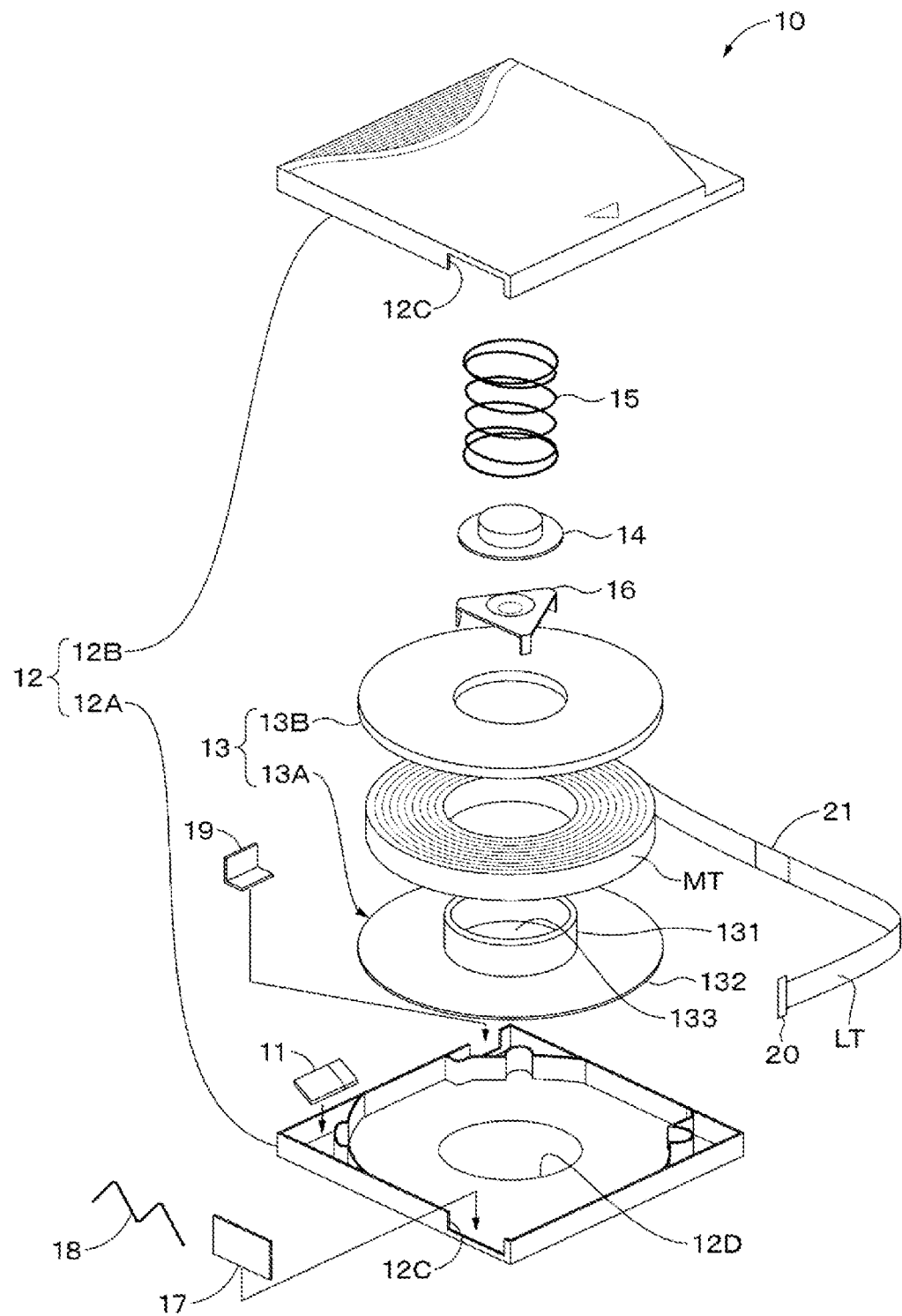
FIG. 1 is an exploded perspective view illustrating an example of a configuration of a magnetic tape cartridge according to an embodiment of the present disclosure.

An embodiment of the present disclosure will be described in the following order.
1 Configuration of magnetic tape cartridge
2 Configuration of spindle
3 Configuration of reel
4 Configuration of cartridge memory
5 Configuration of magnetic tape
6 Method of manufacturing magnetic tape
7 Operation and effect
8 Modification examples

1 CONFIGURATION OF CARTRIDGE

Figure 1A:
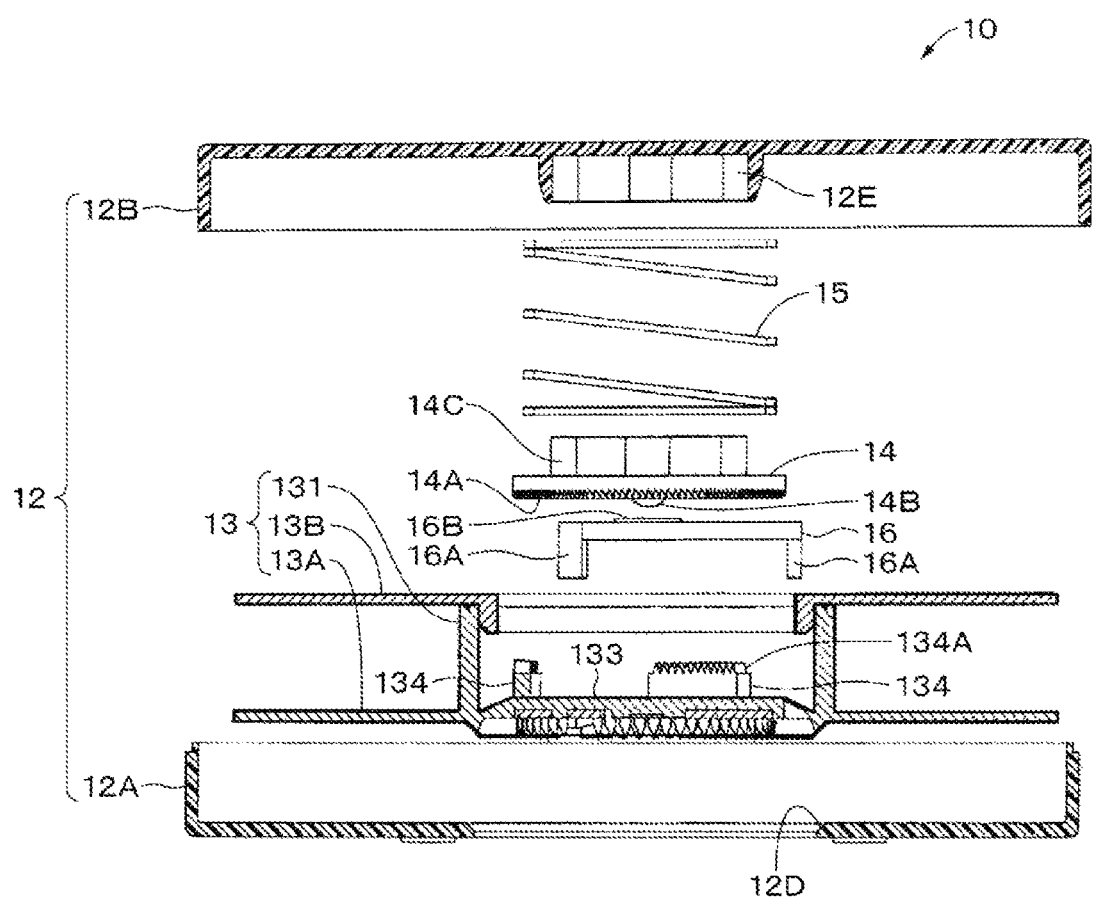
FIG. 1A is an exploded side view illustrating the example of the configuration of the magnetic tape cartridge according to the embodiment of the present disclosure.
Figure 2:
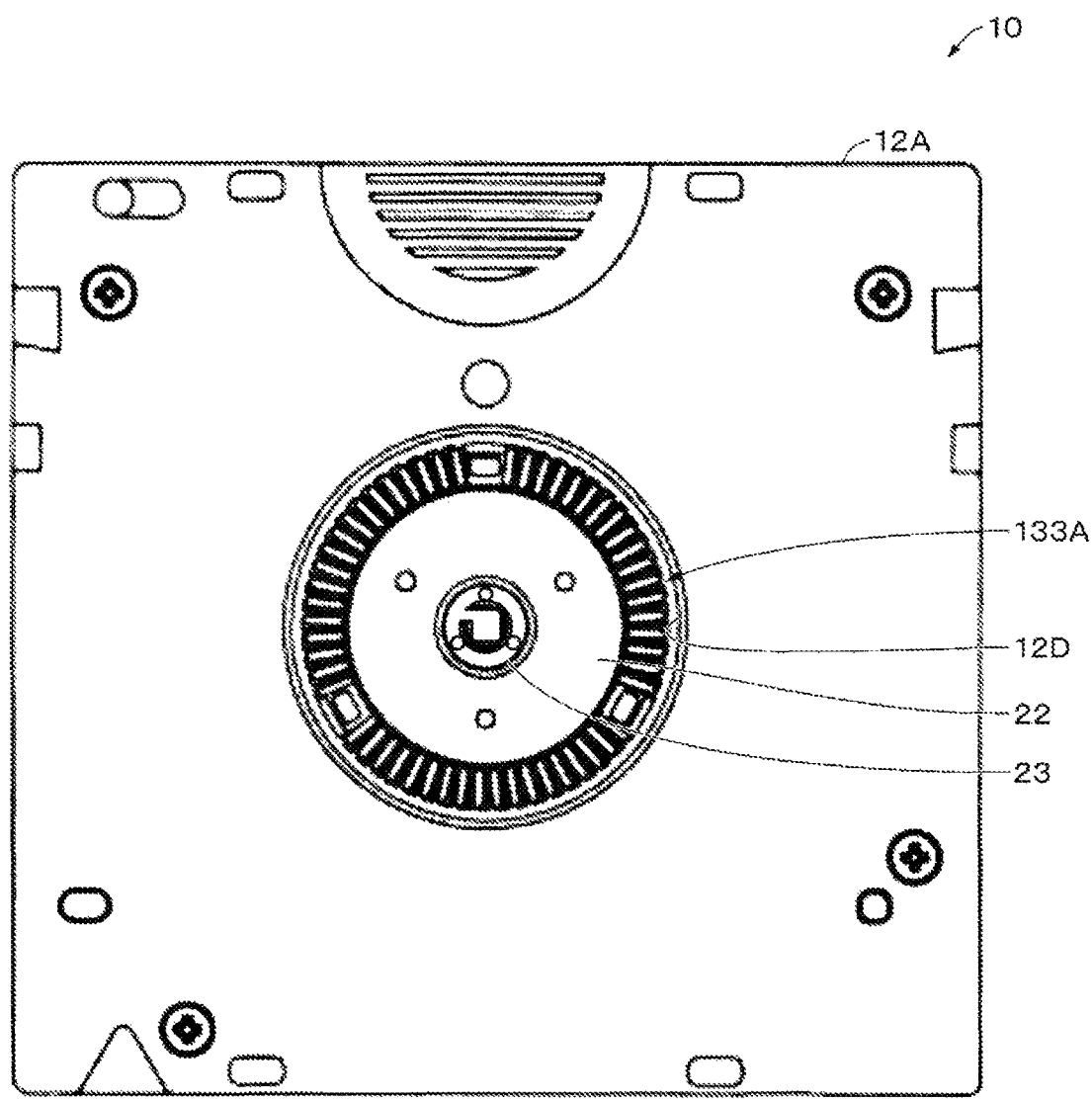
FIG. 2 is a plan view illustrating an example of a configuration of the magnetic tape cartridge on the lower surface side according to the embodiment of the present disclosure.

FIG. 1 is an exploded perspective view illustrating an example of a configuration of a magnetic tape cartridge 10 (hereinafter, simply referred to as a "cartridge 10") according to an embodiment of the present disclosure. FIG. 1A is an exploded side sectional view illustrating the cartridge 10 according to the embodiment of the present disclosure. FIG. 2 is a plan view illustrating an example of a constitution of the cartridge 10 on the side of a lower surface according to the embodiment of the present disclosure. The cartridge 10 is a one-reel-type cartridge and includes, inside a cartridge case 12, one reel 13 around which a magnetic tape MT as a tape-shaped magnetic recording medium is wound, a reel lock 14 and a reel spring 15 for locking rotation of the reel 13, a spider 16 for releasing a locked state of the reel 13, a slide door 17 that opens and closes a tape outlet 12C provided in the cartridge case 12, a door spring 18 that biases the slide door 17 toward a closed position of the tape outlet 12C, a write protection 19 for preventing erroneous deletion, a cartridge memory 11, a metal plate 22, and a plate spring 23.

The cartridge case 12 is configured of a lower shell 12A and an upper shell 12B. An opening 12D is provided at the center portion of the lower shell 12A. The tape outlet 12C is provided across the lower shell 12A and the upper shell 12B. A leader tape LT is connected to an end portion of the magnetic tape MT on the outer peripheral side. A leader pin 20 is provided at a distal end of the leader tape LT.

The cartridge 10 has a first main surface, a second main surface on the side opposite to the first surface, and side surfaces located between peripheral edges of the first surface and the second surface. The first main surface and the second main surface have substantially square shapes. The first main surface is a surface where the opening 12D for chucking the reel 13 with a spindle of a drive (recording reproduction device) is provided. Hereinafter, the side of the first main surface of the cartridge 10 will be referred to as a lower side while the side of the second main surface of the cartridge 10 will be referred to as an upper side in description of the cartridge 10.

A reel locking mechanism for preventing rotation of the tape reel when the tape cartridge 1 is not used is provided inside a reel hub 13A. The reel locking mechanism includes a plurality of gear formation walls 134 provided to stand on an upper surface of a bottom wall 133 of the reel hub 13A, the reel lock 14 that has engagement teeth (not illustrated) that mesh the gear portions 134A formed on the upper surfaces of the gear formation walls 134, the spider 16 for releasing engagement between the gear formation walls 134 and the reel lock 14, and the reel spring 15 provided between an inner surface of the upper shell 12B and an upper surface of the reel lock 14 as illustrated in FIG. 1A. The reel spring 15 is a coil spring and biases the reel 13 toward the side of the lower shell 12A via the reel lock 14.

The gear formation walls 134 have arc shapes and are formed at equal intervals at three locations on the upper surface of the bottom wall 133 of the reel hub 13A and on concentric circle circumferences around an axial center of the reel hub 13A. The engagement teeth 14A of the reel lock 14 facing the gear portions 134A of the gear formation walls 134 are formed in an annular shape on the lower surface of the reel lock 14 and are constantly biased by the reel spring 15 in a direction in which they are engaged with the gear portions 134A. A fitting projecting portion 14C is formed on the upper surface of the reel lock 14, and a fitting recess portion 12E that is fitted onto the fitting projecting portion 14C is formed at substantially the center portion of the inner surface of the upper shell 2.

The spider 16 has substantially a triangular shape and is disposed between the bottom wall 133 of the reel hub 13A and the reel lock 14. A total of three legs 16A are formed on the lower surface of the spider 16 to project downward from parts near vertexes of the substantially triangular shape thereof, and these legs are located between gears of chucking gears via insertion holes formed in the bottom wall 133 of the reel hub 13A when the cartridge is not used.

Each leg 16A of the spider 16 moves the reel lock 14 to a lock released position against a biasing force of the reel spring 15 by being pressed upward by a reel rotation drive shaft of a tape drive device that is engaged with a reel gear (a reel gear 133A, which will be described later) when the cartridge is used. Also, each leg 16A is configured to be rotatable relative to the reel lock 14 along with the tape reel 5. A support surface 16B that supports a slide contact portion 14B with an arc-shaped section formed to project from substantially the center portion of the lower surface of the reel lock 14 is provided at substantially the center portion of the upper surface of the spider 16.

The cartridge 10 may be a magnetic tape cartridge based on a linear tape-open (LTO) standard or may be a magnetic tape cartridge based on a standard different from the LTO standard.

2 CONFIGURATION OF SPINDLE

Figure 3:
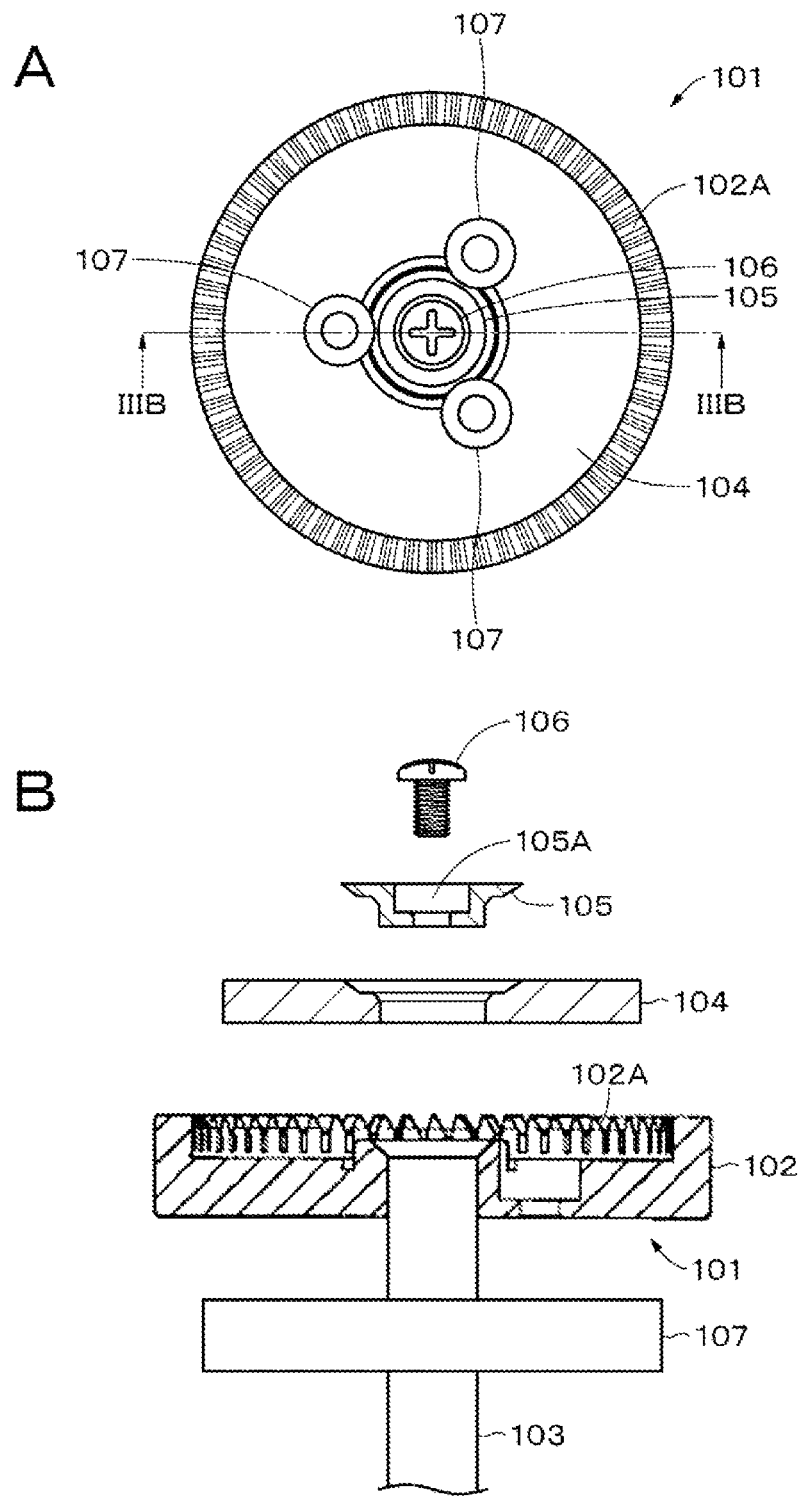
FIG. 3A is a plan view illustrating an example of a configuration of a spindle.
FIG. 3B is an exploded sectional view illustrating the example of the configuration of the spindle.

FIG. 3A is a plan view illustrating an example of a configuration of a spindle 101. FIG. 3B is an exploded sectional view illustrating an example of the configuration of the spindle 101. The spindle 101 is included in a typical drive. The spindle 101 is configured to be able to chuck the cartridge 10 having the above configuration. The spindle 101 includes a disk portion 102, a shaft 103, a magnet 104, a magnet fixing jig 105, and a screw 106. The shaft 103 is supported by a bearing 107.

The disk portion 102 has a drive gear 102A. The drive gear 102A is provided on the upper surface of the disk portion 102. The drive gear 102A has an annular shape around a rotation shaft of the disk portion 102 in plan view from a direction perpendicular to the upper surface of the disk portion 102.

The shaft 103 drives and rotates the disk portion 102. The disk portion 102 is fixed to an upper end of the shaft 103. The shaft 103 has conductivity. The shaft 103 is configured of, for example, metal. The shaft 103 is grounded. The shaft 103 may be grounded via a bearing.

The magnet 104 is provided inside the drive gear 102A in a plan view from a direction perpendicular to the upper surface of the disk portion 102. The magnet 104 has a disk shape having a through-hole at the center.

The magnet fixing jig 105 is adapted to fix the magnet 104 at a defined position on the upper surface of the disk portion 102. The magnet fixing jig 105 has a hole portion 105A. The magnet fixing jig 105 may be configured of metal or may be configured of a synthetic resin.

The screw 106 is adapted to fix the magnet fixing jig 105 to the upper surface of the disk portion 102. The screw 106 is fitted into a screw hole (not illustrated) provided at an upper end of the shaft 103 via a hole portion 105A of the magnet fixing jig. The screw 106 has conductivity, and conduction is established between the screw 106 and the shaft 103. The screw 106 is configured of, for example, metal. The screw 106 is an example of a fixing member (conductive portion) included in the spindle 101. The screw 106 is provided on the rotation shaft of the disk portion 102 in plan view from a direction perpendicular to the upper surface of the disk portion 102.

3 CONFIGURATION OF REEL

Figure 4:
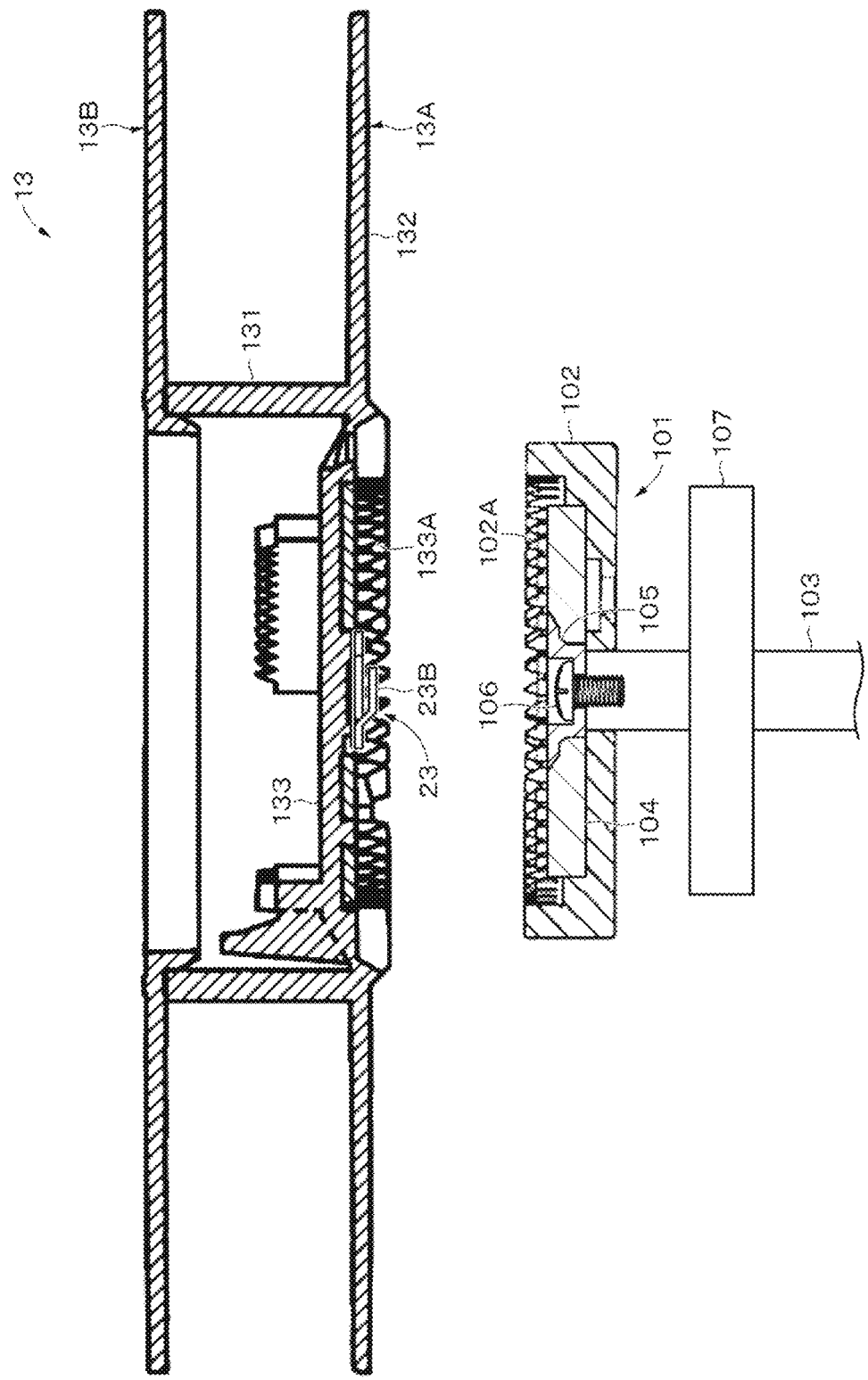
FIG. 4 is a sectional view illustrating an example of a configuration of a reel.
Figure 5:
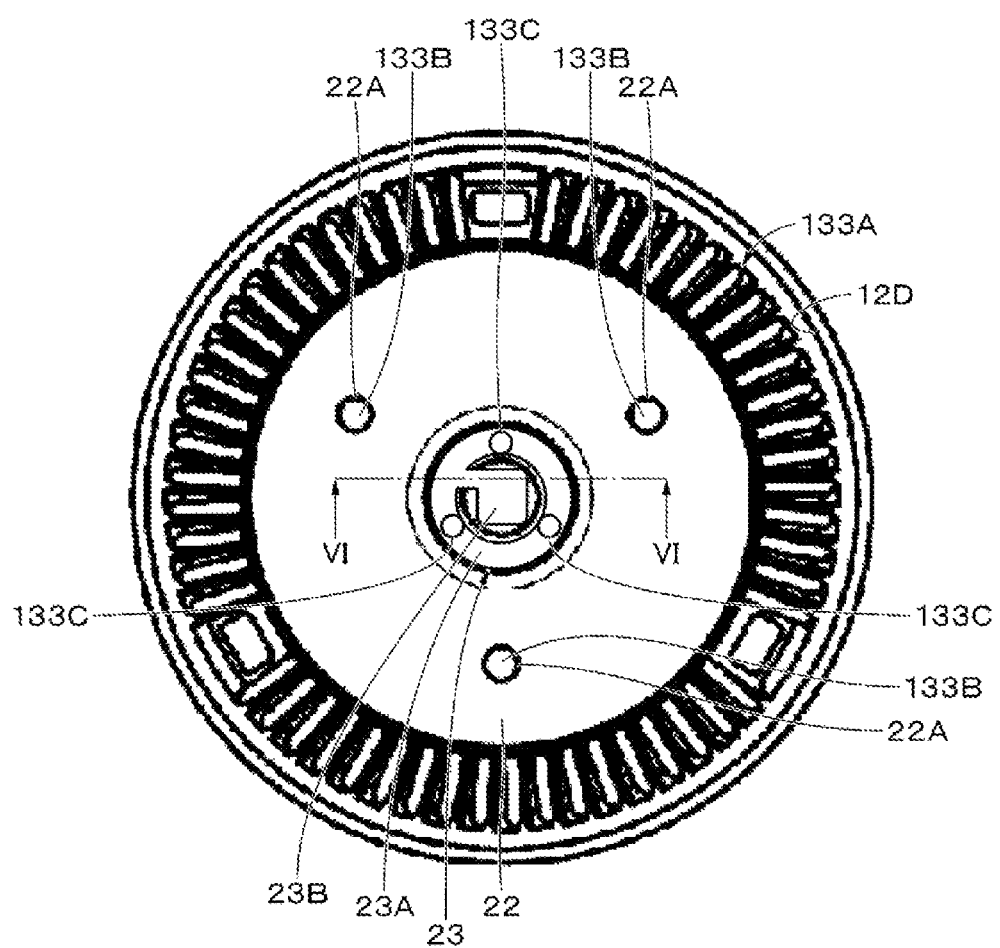
FIG. 5 is a plan view depicting a part of FIG. 2 in an enlarged manner.

FIG. 4 is a sectional view illustrating an example of a configuration of the reel 13. FIG. 5 is a plan view depicting a part of FIG. 2 in an enlarged manner. The reel 13 is adapted such that the magnetic tape MT is wound therearound. The reel 13 includes the reel hub 13A and a flange 132. The reel 13 has conductivity. Specifically, only the reel hub 13A out of the reel hub 13A and a flange 13B may have conductivity, or both the reel hub 13A and the flange 13B may have conductivity.

The upper limit value of the surface resistivity of the reel 13 is preferably $1 \times 10^6$ Ω/sq. or less. The lower limit value of the surface resistivity of the reel 13 is preferably $1 \times 10^4$ Ω/sq. or more. In the present embodiment, the surface resistivity of the reel 13 means a surface resistance of the reel hub 13A. If the upper limit value of the surface resistivity of the reel 13 is $1 \times 10^6$ Ω/sq. or less, it is possible to form a conductive bus from the magnetic tape MT to the plate spring 23 during running. Therefore, it is possible to curb charging of the magnetic tape MT during running. Since if the surface resistivity of the reel 13 is too low, an excessively high current may flow from a magnetic surface to an element of a recording reproduction head in a case where electrical discharge occurs on the side of the magnetic surface in the drive, and this may lead to breakage of the element, it is thus preferable to provide the lower limit value, and the lower limit value is preferably $1 \times 10^4$ Ω/sq. or more.

The above surface resistivity of the reel 13 is measured as follows. The surface resistivity of the surface of the flange 132 facing the flange 13B is measured in accordance with ASTMD 257, and the measurement result is defined as the surface resistivity of the reel 13.

The reel 13 includes a synthetic resin and a conductive material. The reel 13 may further include known additives such as an antioxidant and a flame retardant. The synthetic resin includes, for example, an acrylonitrile-butadiene-styrene copolymer resin (ABS resin) or polyacetal (POM) resin.

The conductive material includes, for example, at least one of a conductive filler and a conductive polymer. The conductive material is preferably dispersed in the synthetic resin. Examples of a shape of the conductive filler include a spherical shape, an ellipsoidal shape, a needle shape, a plate shape, a scale shape, a tube shape, a wire shape, a rod shape, a fibrous shape, an irregular shape, and the like, but it is not particularly limited thereto. Also, only a conductive filler having one type of the shape may be used, or conductive fillers having two or more types of the shape may be used in combination.

The conductive filler contains, for example, at least one of a carbon-based filler, a metal-based filler, a metal oxide-based filler, and a metal-coated filler. Here, the metal is defined to include semimetals.

The carbon-based filler includes, for example, at least one of carbon black (for example, Ketjen black, acetylene black, etc.), porous carbon, carbon fibers (for example, PAN-based, pitch-based, etc.), carbon nanofibers, fullerene, graphene, vapor-grown carbon fibers (VGCF), carbon nanotubes (for example, SWCNTs, MWCNTs, etc.), carbon microcoils, and carbon nanohorns.

The metal-based filler contains, for example, at least one of copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead.

The metal oxide-based filler includes, for example, indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide, indium oxide-tin oxide, or zinc oxide-indium oxide-magnesium oxide.

The metal coated filler is a base filler coated with a metal. The base filler is, for example, mica, glass beads, glass fibers, carbon fibers, calcium carbonate, zinc oxide or titanium oxide. The metal that coats the base filler includes, for example, at least one of Ni and Al.

The conductive polymer includes, for example, at least one of polyethylene dioxythiophene/polystyrene sulfonic acid (PEDOT/PSS), polyaniline, polyacetylene, and polypyrrole.

(Reel Hub)

The reel hub 13A includes a hub 131, the flange 132, and the bottom wall 133. The hub 131 is adapted such that the magnetic tape MT is wound therearound. One end of the magnetic tape MT is fixed to the hub 131. The hub 131 has a cylindrical shape with one end blocked. The hub 131 and the flange 132 may have a one-piece structure integrally molded by injection molding or the like.

The bottom wall 133 is provided at the lower end of the hub 131. The bottom wall 133 blocks the lower end of the hub 131. The bottom wall 133 has the reel gear 133A. The reel gear 133A meshes the drive gear 102A on the drive side when the spindle 101 chucks the cartridge 10. The reel gear 133A is provided along the outer circumferential portion of the lower surface of the bottom wall 133. The reel gear 133A has an annular shape around the rotation shaft of the reel hub 13A. The reel gear 133A is disposed to face the opening 12D in the bottom surface of the cartridge case 12.

(Flange)

The flange 13B and the flange 132 cover both ends of the magnetic tape MT wound around the hub 131 in the width direction. The flange 13B and the flange 132 are supported by the hub 131 at a defined interval therebetween such that their main surfaces face each other. The flange 13B sticks out of the upper end of the outer circumferential surface of the hub 131 in the radial direction of the hub 131. The flange 132 sticks out of the lower end of the outer circumferential surface of the hub 131 in the radial direction of the hub 131. The flange 13B and the flange 132 have disk shapes. The flange 13B is fixed to the upper end of the outer circumferential surface of the hub 131 through adhesion or welding (for example, ultrasonic welding), for example. The flange 132 is molded integrally with the hub 131 as described above, for example.

(Metal Plate)

The metal plate 22 is adsorbed by a magnetic force of the magnet $10^4$ when the spindle 101 chucks the cartridge 10. The metal plate 22 has an annular shape. The metal plate 22 is provided on the side closer to the inner circumference than the reel gear 2E in plan view from a direction perpendicular to the lower surface of the bottom wall 133. The metal plate 22 is disposed to face the opening 12D in the bottom surface of the cartridge case 12 along with the reel gear 2E. The metal plate 22 has a plurality of hole portions 22A. A plurality of projecting portions 133B are provided on the lower surface of the bottom wall 133. Each of the plurality of projecting portions 133B is provided at a position corresponding to each hole portion 22A. The plurality of projecting portions 133B are molded integrally with the bottom wall 133 by injection molding, for example. Each projecting portion 133B is inserted into each of the plurality of hole portions 22A. In this manner, the metal plate 22 is fixed to the lower surface of the bottom wall 133. The reel hub 13A and the metal plate 22 may be integrally molded by insert molding.

(Plate Spring)

Figure 6:
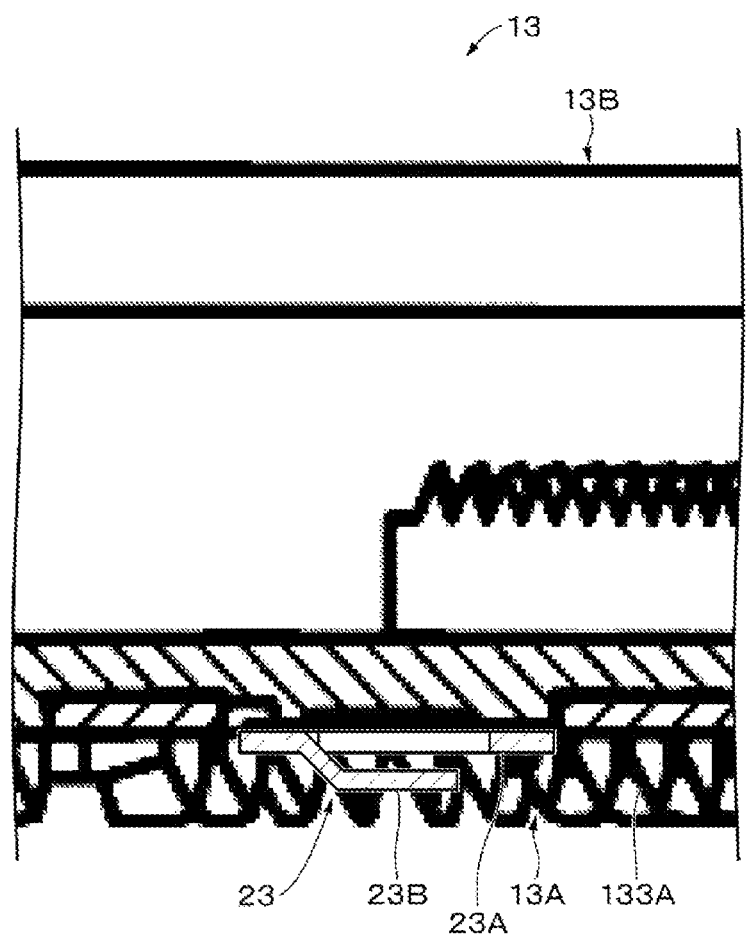
FIG. 6 is a sectional view depicting a part of FIG. 4 in an enlarged manner.
Figure 7:
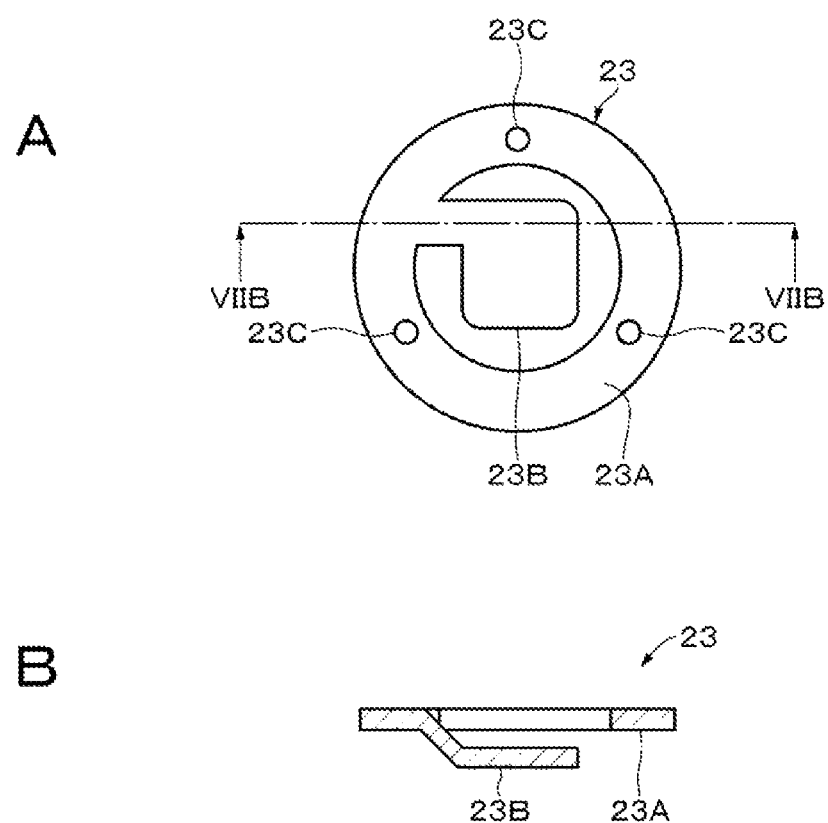
FIG. 7A is a plan view illustrating an example of a configuration of a plate spring.
FIG. 7B is a sectional view along the line VIIB-VIIB of FIG. 7A.

FIG. 6 is a sectional view along the line VI-VI in FIG. 5. FIG. 7A is a plan view illustrating an example of a configuration of the plate spring 23. FIG. 7B is a cross-sectional view along line VIIB-VIIB of FIG. 7A. The plate spring 23 is configured to be biased toward the screw 106 included in the spindle 101 when the reel gear 133A is caused to mesh with the drive gear 102A. The plate spring 23 is an example of an elastic member with conductivity. The plate spring 23 is provided inside an opening of the metal plate 22 in plan view from the direction perpendicular to the lower surface of the bottom wall 133. The plate spring 23 is provided on the rotation shaft of the reel 13, that is, on the rotation shaft of the reel gear 133A.

The plate spring 23 includes a ring portion and 23A and a projecting portion 23B. The ring portion 23A is fixed to the lower surface of the bottom wall 133. The ring portion 23A has a plurality of hole portions 23C. A plurality of projecting portions 133C are provided on the lower surface of the bottom wall 133. Each of the plurality of projecting portions 133C is provided at a position corresponding to each hole portion 23C. The plurality of projecting portions 133C are molded integrally with the bottom wall 133 by injection molding, for example. Each projecting portion 133C is inserted into each of the plurality of hole portions 23C. In this manner, the plate spring 23 is fixed to the lower surface of the bottom wall 133. The apex portion of each projecting portion 133C may be crimped.

The projecting portion 23B is biased toward the screw 106 included in the spindle 101 and is bent when the reel gear 133A is caused to mesh with the drive gear 102A. The projecting portion 23B is provided to extend downward, that is, in a direction away from the lower surface of the bottom wall 133 from a part of the inner circumference of the ring portion 23A. In other words, the projecting portion 23B projects relative to the lower surface of the bottom wall 133 in a state where the plate spring 23 is provided on the lower surface of the bottom wall 133. The plate spring 23 is located inside the inner circumference of the ring portion 23A in plan view from the direction perpendicular to the lower surface of the bottom wall 133.

4 CONFIGURATION OF CARTRIDGE MEMORY

The cartridge memory 11 is provided in the vicinity of one corner of the cartridge 10. The cartridge memory 11 faces the reader/writer of the drive in a state where the cartridge 10 is loaded on the drive. The cartridge memory 11 performs communication with the drive, specifically, the reader/writer by a wireless communication standard in accordance with the LTO standard.

Figure 8:
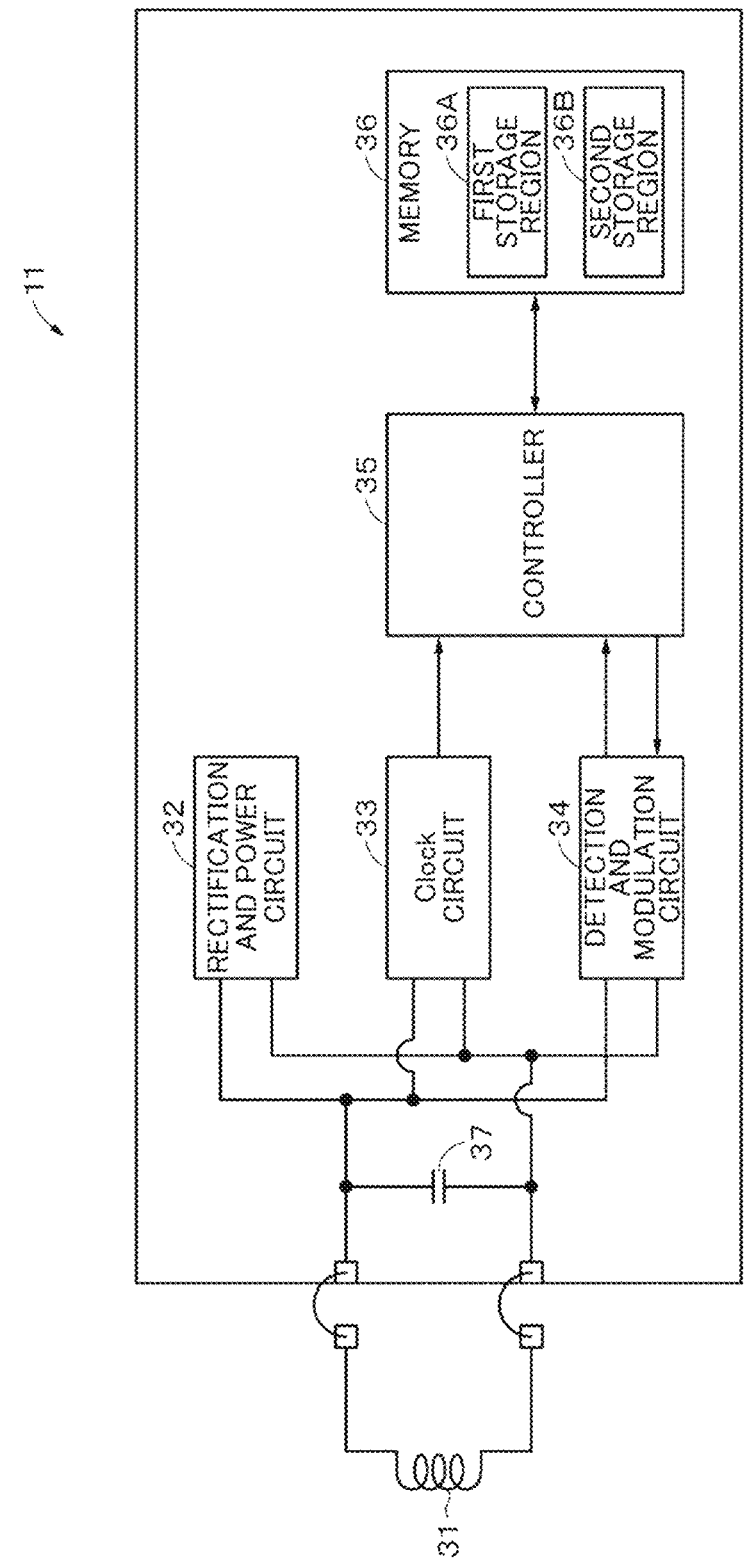
FIG. 8 is a block diagram illustrating an example of a configuration of a cartridge memory.

FIG. 8 is a block diagram illustrating an example of a configuration of the cartridge memory 11. The cartridge memory 11 includes an antenna coil (communication unit) 31 that communicates with the reader/writer in accordance with a specified communication standard, a rectification and power circuit 32 that generates power by generating and rectifying power from radio waves received by the antenna coil 31 using an induced electromotive force, a clock circuit 33 that similarly generates a clock using an induced electromotive force from radio waves received by the antenna coil 31, a detection and modulation circuit 34 that detects radio waves received by the antenna coil 31 and modulates a signal to be transmitted by the antenna coil 31, a controller (control unit) 35 which is constituted by a logic circuit or the like for discriminating a command and data from a digital signal extracted from the detection and modulation circuit 34 and processing the command and data, and a memory (storage unit) 36 that stores information. In addition, the cartridge memory 11 includes a capacitor 37 which is connected to the antenna coil 31 in parallel, and a resonance circuit is constituted by the antenna coil 31 and the capacitor 37.

The memory 36 stores information and the like related to the cartridge 10. The memory 36 is a non-volatile memory (NVM). A storage capacity of the memory 36 is preferably approximately 32 KB or more.

The memory 36 has a first storage region 36A and a second storage region 36B. The first storage region 36A corresponds to a storage region of the cartridge memory in accordance with a magnetic tape standard (the LTO standard before LTO8, for example) before the defined generation, for example, and is a region for storing information in accordance with the magnetic tape standard (the LTO standard before LTO8, for example) before the defined generation. The information in accordance with the magnetic tape standard (the LTO standard before LTO8, for example) before the defined generation includes, for example, at least one kind of manufacturing information of the cartridge 10 (a unique number and the like of the cartridge 10, for example) and a utilization history (the number of times (thread count) the magnetic tape MT is pulled out, for example) of the cartridge 10.

The second storage region 36B corresponds to an expanded storage region for the storage region of the cartridge memory in accordance with the magnetic tape standard (the LTO standard before LTO8, for example) before the defined generation. The second storage region 36B is a region for storing additional information. Here, the additional information means information related to the cartridge 10 that is not defined by the magnetic tape standard (the LTO standard before LTO8, for example) before the defined generation, for example. The additional information includes at least one kind selected from a group including, for example, tension adjustment information, management record data, index information, thumb nail information, and the like.

The tension adjustment information is information for adjusting tension applied in the longitudinal direction of the magnetic tape MT. The tension adjustment information includes at least one kind of information selected from a group including, for example, information obtained by intermittently measuring the width between servo bands in the longitudinal direction of the magnetic tape MT, tension information of the drive, information of the temperature and the humidity of the drive, and the like. Such information may be managed in conjunction with information related to a utilization condition of the cartridge 10 and the like. The tension adjustment information is preferably acquired when data is recorded in the magnetic tape MT or before the data is recorded. The tension information of the drive means information regarding a tension applied in the longitudinal direction of the magnetic tape MT.

The management record data is data including at least one kind of the capacity of a data file recorded in the magnetic tape MT, the date of creation, the date of edition, a storage location, and the like. The index information is meta data and the like for retrieving content of the data file. The thumb nail information is a thumb nail of a movie or a stationary image stored in the magnetic tape MT.

The memory 36 may include a plurality of banks. In this case, the first storage region 36A may be constituted by some of the plurality of banks, and the second storage region 36B may be constituted by the remaining banks.

The antenna coil 31 induces an induced voltage by electromagnetic induction. The controller 35 performs communication with the drive in accordance with a defined communication standard via the antenna coil 31. Specifically, the controller performs, for example, mutual authentication, transmission and reception of commands, data exchange, and the like.

The controller 35 stores information received from the drive via the antenna coil 31 in the memory 36. For example, the tension adjustment information received from the drive via the antenna coil 31 is stored in the second storage region 36B of the memory 36. The controller 35 reads information from the memory 36 and transmits it to the drive via the antenna coil 31, in response to a request from the drive. For example, the controller 35 reads the tension adjustment information from the second storage region 36B of the memory 36 and transmits it to the drive via the antenna coil 31 in response to a request from the drive.

3 CONFIGURATION OF MAGNETIC TAPE

Figure 9:
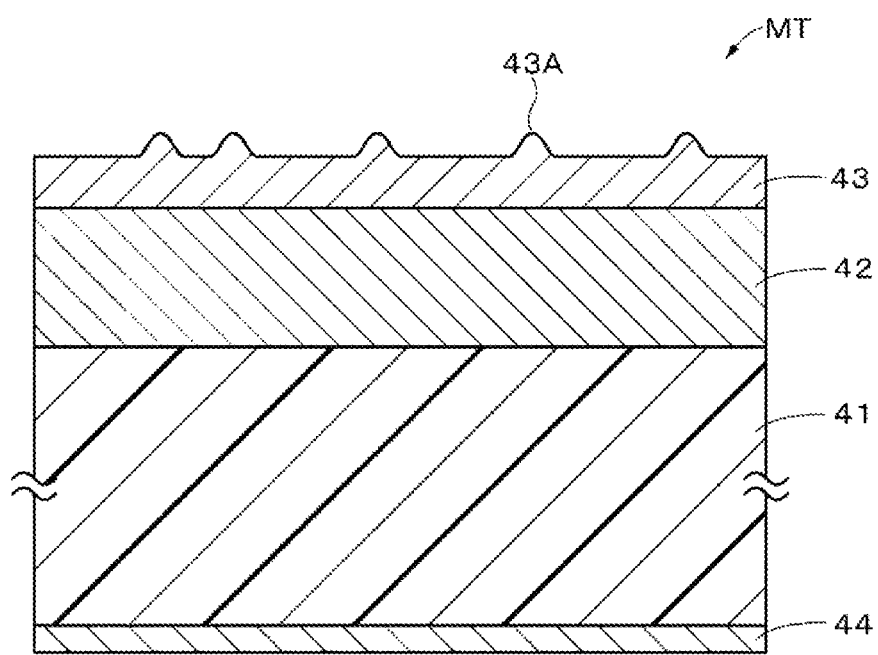
FIG. 9 is a sectional view illustrating an example of a configuration of a magnetic tape.

FIG. 9 is a sectional view illustrating an example of a configuration of the magnetic tape MT. The magnetic tape MT includes a long substrate 41, an underlayer 42 provided on one main surface (first main surface) of the substrate 41, a magnetic layer 43 provided on the underlayer 42, and a back layer 44 provided on the other main surface (second main surface) of the substrate 41. Here, the underlayer 42 and the back layer 44 may be provided as necessary or may not be provided. The magnetic tape MT may be a perpendicular recording type magnetic recording medium, or may be a longitudinal recording type magnetic recording medium. The magnetic tape MT preferably contains a lubricant in terms of improvement of runnability. The lubricant may be contained in at least one layer out of the underlayer 42 and the magnetic layer 43.

The magnetic tape MT may be based on an LTO standard or may be based on a standard different from the LTO standard. The width of the magnetic tape MT may be ½ inch or may be larger than ½ inch. In a case where the magnetic tape MT is based on the LTO standard, the width of the magnetic tape MT is ½ inch. The magnetic tape MT may have a configuration capable of keeping a constant or substantially constant width of the magnetic tape MT by the drive adjusting the tension to be applied in the longitudinal direction of the magnetic tape MT during running. A TMR element is preferably used for reproducing the magnetic tape MT.

The magnetic tape MT has a long shape and runs in the longitudinal direction at the time of recording/reproducing. The magnetic tape MT is preferably used in a drive including a ring-type head as a recording head. The magnetic tape MT is preferably used for a drive configured to be able to record data in the data track width of 1500 nm or less or 1000 nm or less.

(Substrate)

The substrate 41 is a non-magnetic support that supports the underlayer 42 and the magnetic layer 43. The substrate 41 has a long film shape. The upper limit value of the average thickness of the substrate 41 is preferably 4.4 μm or less, is preferably 4.2 μm or less, is more preferably 4.0 μm or less, is further preferably 3.8 μm or less, is particularly preferably 3.6 μm or less, and is most preferably 3.4 μm or less, for example. When the upper limit value of the average thickness of the substrate 41 is 4.4 μm or less, a recording capacity capable of being recorded in one data cartridge can be increased more than in a general magnetic tape. A lower limit value of the average thickness of the substrate 41 is preferably 3 μm or more, and more preferably 3.2 μm or more. When the lower limit value of the average thickness of the substrate 41 is 3 μm or more, it is possible to minimize a decrease in the strength of the substrate 41.

The average thickness of the substrate 41 is obtained as follows. First, the magnetic tape MT is prepared and is cut into a length of 250 mm, and a sample is thereby created. Then, layers other than the substrate 41 of the sample (that is, the underlayer 42, the magnetic layer 43, and the back layer 44) are removed with a solvent such as methyl ethyl ketone (MEK) or a dilute hydrochloric acid. Then, the thickness of the sample (substrate 41) is measured at five positions by using a laser hologage (LGH·110C) manufactured by Mitutoyo as a measurement device, and the measurement values are simply averaged (arithmetic mean), thereby calculating an average thickness of the substrate 41. Here, the measurement positions are randomly selected from the sample.

The substrate 41 contains, for example, at least one kind of polyesters, polyolefins, cellulose derivatives, a vinyl-based resin, and other polymer resins. In a case where the substrate 41 contains two or more kinds out of the above materials, the two or more kinds of materials may be mixed, copolymerized, or laminated.

The substrate 41 preferably contains polyesters from among the above polymer resins. It is possible to reduce the Young's modulus of the substrate 41 in the longitudinal direction preferably to 2.5 GPa or more and 7.8 GPa or less, or more preferably to 3.0 GPa or more and 7.0 GPa or less by the substrate 41 containing polyesters. Therefore, the control for keeping a constant or substantially constant width of the magnetic tape MT is particularly easily performed by the drive adjusting the tension in the longitudinal direction of the magnetic tape MT during running. A method for measuring the Young's modulus of the substrate 41 in the longitudinal direction will be described later.

The polyester includes, for example, at least one kind of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB) and polyethylene bisphenoxycarboxylate. When the substrate 41 contains two or more kinds of polyesters, the two or more kinds of polyesters may be mixed, copolymerized, or laminated. At least one of the terminal and the side chain of the polyester may be modified.

Incorporation of polyesters into the substrate 41 is confirmed as follows, for example. First, the magnetic tape MT is prepared and is cut into a length of 250 mm to create a sample, and the layers other than the substrate 41 in the sample are removed, similarly to the method for measuring the average thickness of the substrate 41. Then, an IR spectrum of the sample (substrate 41) is acquired by infrared absorption spectrometry (IR). Incorporation of the polyesters into the substrate 41 can be confirmed on the basis of the IR spectrum.

Polyolefins include at least one kind of polyethylene (PE) and polypropylene (PP), for example. The cellulose derivatives include at least one kind of cellulose diacetate, cellulose triacetate, cellulose acetate butyrate (CAB), and cellulose acetate propionate (CAP), for example. The vinyl-based resin includes at least one kind of polyvinyl chloride (PVC) and polyvinylidene chloride (PVDC).

Other polymer resins include, for example, at least one kind of polyamide (PA) or nylon, aromatic polyamide or aramid (PA), polyimide (PI), aromatic polyimide (PI), polyamide imide (PAI), aromatic polyamide imide (PAI), Polybenzoxazole (PBO), for example, Zylon (registered trademark), polyether, polyether ketone (PEK), polyether ether ketone (PEEK), polyether ester, polyether sulfone (PES), polyether imide (PEI), polysulfone (PSF), polyphenylene sulfide (PPS), polycarbonate (PC), polyarylate (PAR), and polyurethane (PU).

The substrate 41 may be biaxially stretched in the longitudinal direction and the width direction. The polymer resin contained in the substrate 41 is preferably oriented obliquely with respect to the width direction of the substrate 41.

(Magnetic Layer)

The magnetic layer 43 is a recording layer in which a signal is recorded by a magnetization pattern. The magnetic layer 43 may be a perpendicular recording type recording layer or a longitudinal recording type recording layer. The magnetic layer 43 contains, for example, magnetic powder, a binder, and carbon. The magnetic layer 43 may further contain, as necessary, at least one additive among a lubricant, an antistatic agent, an abrasive, a curing agent, an antirust agent, non-magnetic reinforcing particles, and the like.

The magnetic layer 43 has, on its magnetic surface, a large number of protrusions 43A projecting from the magnetic surface and configured of carbon as illustrated in FIG. 9. The magnetic layer 43 may have, on its magnetic surface, a large number of protrusions 43A projecting from the magnetic surface and configured of an abrasive (alumina, for example). Hereinafter, the protrusions 43A projecting from the magnetic surface and configured of carbon will be referred to as "carbon protrusions 43A" while the protrusions 43A projecting from the magnetic surface and configured of alumina will be referred to as "alumina protrusions 43A".

Figure 10:
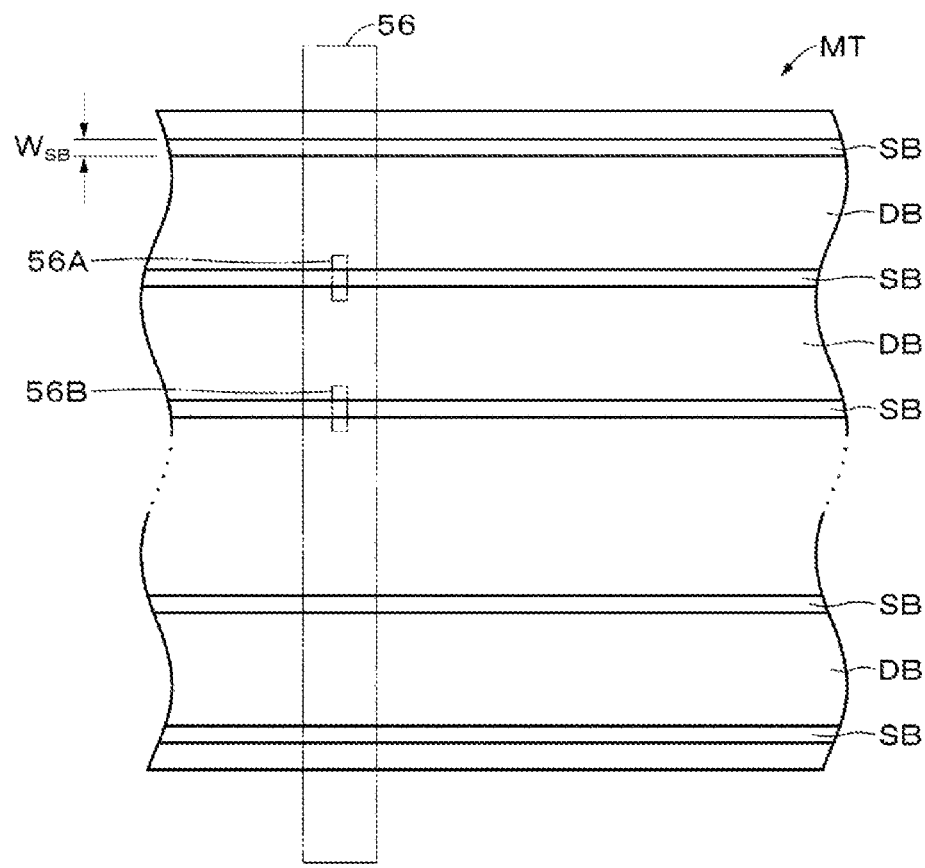
FIG. 10 is a schematic diagram illustrating an example of a layout of data bands and servo bands.

The magnetic layer 43 may have a plurality of servo bands SB and a plurality of data bands DB in advance as illustrated in FIG. 10. The plurality of servo bands SB are provided at equal intervals in the width direction of the magnetic tape MT. The data bands DB are provided between adjacent servo bands SB. The servo bands SB are for guiding heads 56 (specifically, servo read heads 56A and 56B) when data is recorded or reproduced. A servo pattern (servo signal) for performing tracking control of the heads 56 is written in the servo bands SB in advance. User data is recorded in the data band DB.

An upper limit value of a ratio $R_S(=(S_{SB}/S)\times 100)$ of a total area $S_{SB}$ of the plurality of servo bands SB with respect to an area S of the magnetic surface is preferably 4.0% or less, more preferably 3.0% or less, and still more preferably 2.0% or less from the viewpoint of securing a high recording capacity. On the other hand, a lower limit value of the ratio $R_S$ of the total area $S_{SB}$ of the plurality of servo bands SB with respect to the area S of the surface of the magnetic layer 43 is preferably 0.8% or more from the viewpoint of securing five or more servo bands SB.

The ratio $R_S$ of the total area $S_{SB}$ of the plurality of servo bands SB with respect to the area S of the entire surface of the magnetic layer 43 is obtained as follows. The magnetic tape MT is developed using a ferricolloid developer (manufactured by Sigma Hi-Chemical Inc., SigMarker Q), the developed magnetic tape MT is then observed under an optical microscope, and the servo bandwidth $W_{SB}$ and the number of servo bands SB are measured. Next, the ratio $R_S$ is obtained from the following formula.

Ratio $R_S[\%]=(((\text{servo bandwidth } W_{SB})\times(\text{the number of servo bands SB}))/(\text{width of the magnetic tape MT}))\times 100$ The number of servo bands SB is, for example, 5+4n (where, n is an integer of 0 or more) or more. The number of servo bands SB is preferably 5 or more, and more preferably 9 or more. When the number of servo bands SB is 5 or more, it is possible to minimize the influence on the servo signal due to the change in the size of the magnetic tape MT in the width direction, and it is possible to secure stable recording/reproducing characteristics with fewer off-track errors. The upper limit value of the number of servo bands SB is not particularly limited, and is, for example, 33 or less.

The number of servo bands SB is obtained in the same manner as in the above method of calculating the ratio $R_S$.

In order to secure a high recording capacity, the upper limit value of the servo bandwidth $W_{SB}$ is preferably 95 µm or less, more preferably 60 µm or less, and still more preferably 30 µm or less. The lower limit value of the servo bandwidth $W_{SB}$ is preferably 10 µm or more. It is difficult to manufacture a head 56 capable of reading a servo signal of the servo bandwidth $W_{SB}$ of less than 10 µm.

The width of the servo bandwidth $W_{SB}$ is obtained in the same manner as in the above method of calculating the ratio $R_S$.

Figure 11:
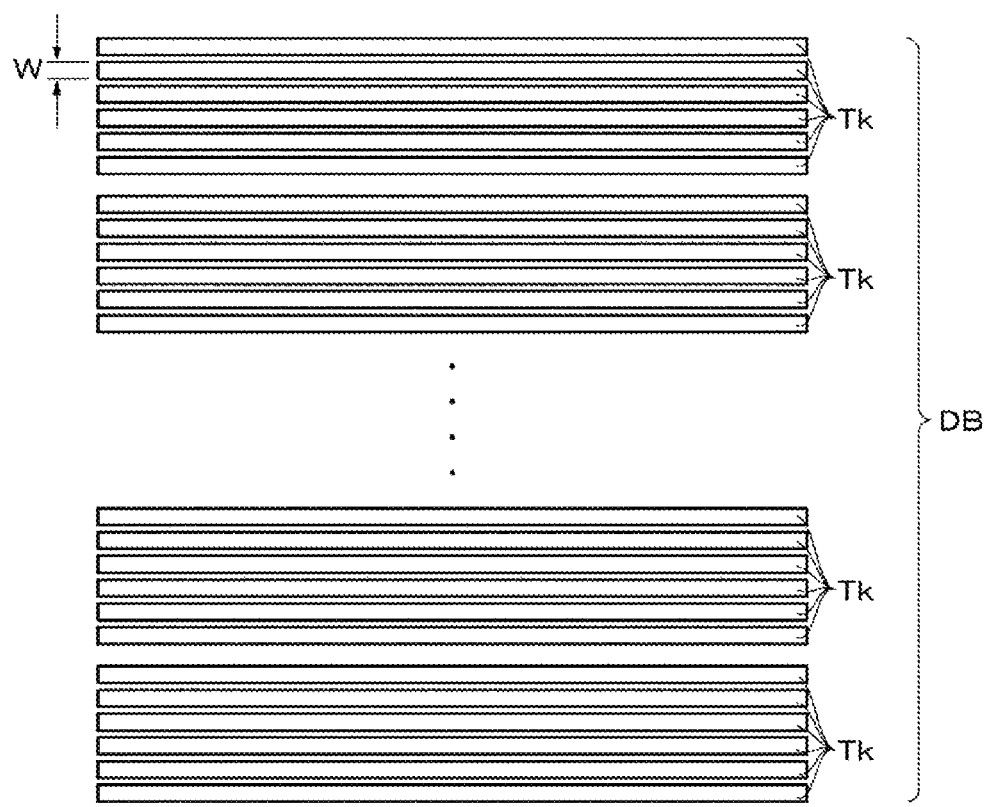
FIG. 11 is an enlarged view illustrating an example of a configuration of a data band.

As illustrated in FIG. 11, the magnetic layer 43 is configured such that a plurality of data tracks Tk can be formed in the data band DB. From the viewpoint of improving a track recording density and securing a high recording capacity, the upper limit value of the data track width W is preferably 1,500 nm or less, more preferably 1,000 nm or less, still more preferably 800 nm or less, and particularly preferably 600 nm or less. The lower limit value of the data track width W is preferably 20 nm or more in consideration of the magnetic particle size.

From the viewpoint of securing a high recording capacity, the magnetic layer 43 has a configuration in which data can be recorded so that the minimum value L of the distance between magnetization reversals is preferably 40 nm or less, more preferably 36 nm or less, and still more preferably 32 nm or less. The lower limit value of the minimum value L of the distance between magnetization reversals is preferably 20 nm or more in consideration of the magnetic particle size.

The data track width W is obtained as follows. The magnetic tape MT in which data is recorded on the entire surface is prepared, a data recording pattern of the data band DB part of the magnetic layer 43 is observed using a magnetic force microscope (MFM) to obtain an MFM image. As the MFM, Dimension 3100 (commercially available from Digital Instruments) and its analysis software are used. The measurement region on the MFM image is set to 10 μm×10 μm, and the measurement region of 10 μm×10 μm is split into 512×512 (=262,144) measurement points. Measurement with the MFM is performed on three 10 μm×10 μm measurement regions at different locations, that is, three MFM images are obtained. The track width is measured at ten locations in the obtained three MFM images, and an average value (a simple average) is obtained, by using an analysis software accompanying Dimension 3100. The average value is the data track width W. Note that the measurement conditions for the above MFM are a sweep rate: 1 Hz, a used chip: MFMR-20, a lift height: 20 nm, and correction: Flatten order 3.

The minimum value L of the distance between the magnetization reversals is obtained as follows. The magnetic tape MT in which data is recorded on the entire surface is prepared, and a data recording pattern of the data band DB part of the magnetic layer 43 is observed using a magnetic force microscope (MFM), and an MFM image is obtained. As the MFM, Dimension 3100 manufactured by Digital Instruments and the analysis software thereof are used. The measurement region on the MFM image is set to 2 μm×2 μm, and the measurement region of 2 μm×2 μm is divided into 512×512 (=262, 144) measurement points. Three 2 μm×2 μm measurement regions at different locations are measured using the MFM, that is, three MFM images are obtained. 50 inter-bit distances are measured from the two-dimensional unevenness chart of the recording pattern of the obtained MFM image. The inter-bit distance is measured using analysis software bundled in Dimension 3100. The value that is approximately the greatest common divisor of the measured 50 inter-bit distances is the minimum value L of the distance between magnetization reversals. Note that the measurement conditions are a sweep rate: 1 Hz, a used chip: MFMR-20, a lift height: 20 nm, and correction: Flatten order 3.

The servo pattern is a magnetized region and is formed by a specific region on the magnetic layer 43 being magnetized in a specific direction with a servo light head at the time of manufacturing of the magnetic tape. A region where the servo pattern is not formed in each servo band SB (hereinafter, referred to as a "no-pattern region") may be a magnetized region where the magnetic layer 43 is magnetized or may be a non-magnetized region where the magnetic layer 43 is not magnetized. In a case where the no-pattern region is a magnetized region, the servo pattern formation region and the no-pattern region are magnetized in different directions (opposite directions, for example).

Figure 12:
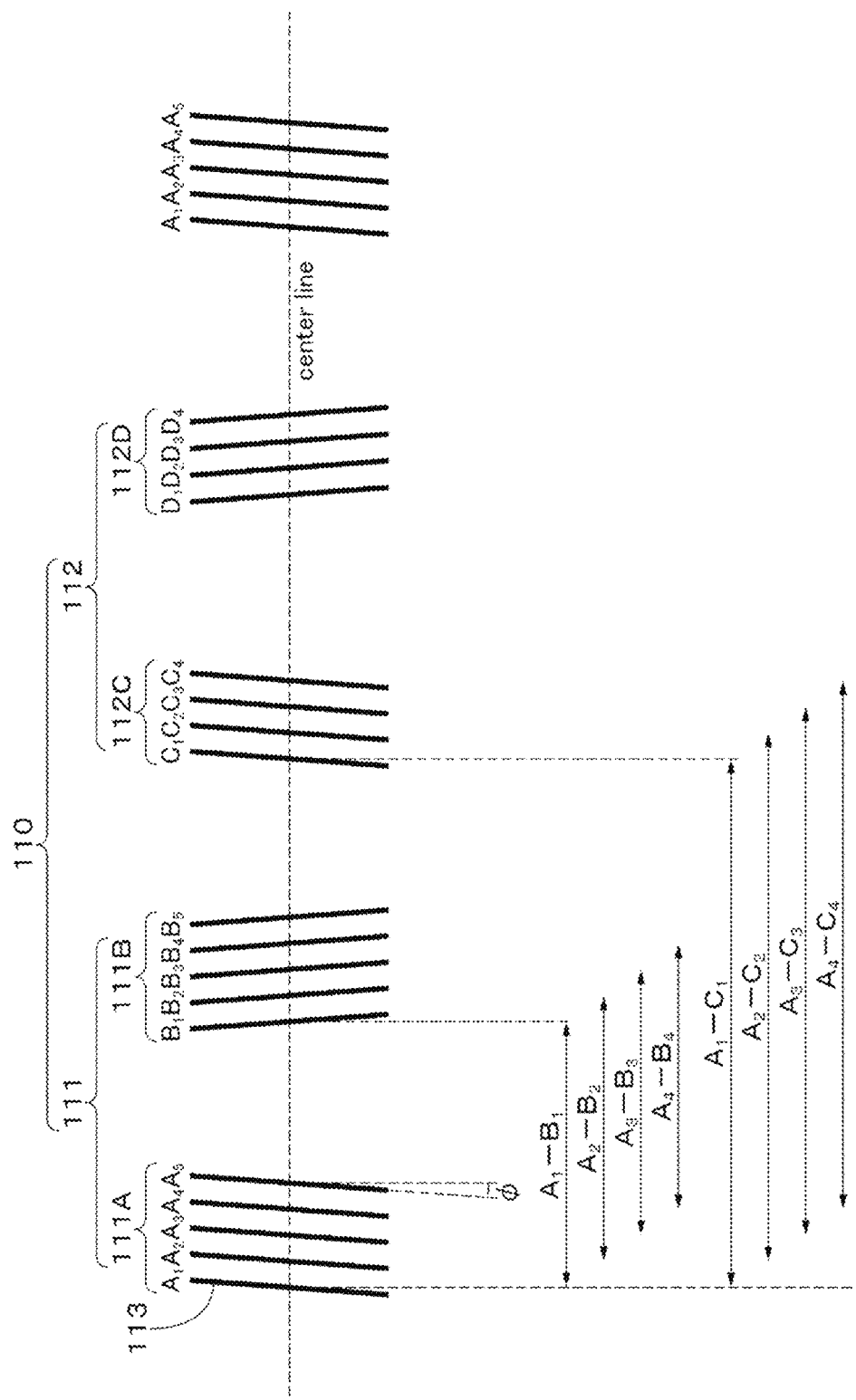
FIG. 12 is an enlarged view illustrating an example of a configuration of a servo band.

In the LTO standard, a servo pattern including a plurality of servo stripes (linear magnetized region) 113 inclined with respect to the width direction of the magnetic tape MT is formed in the servo band SB as illustrated in FIG. 12.

The servo band SB includes a plurality of servo frames 110. Each servo frame 110 is configured of eighteen servo stripes 113. Specifically, each servo frame 110 is configured of a servo subframe 1(111) and a servo subframe 2(112).

The servo subframe 1(111) is configured of an A burst 111A and a B burst 111B. The B burst 111B is disposed to be adjacent to the A burst 111A. The A burst 111A includes five servo stripes 113 that are inclined at a predetermined angle φ with respect to the width direction of the magnetic tape MT and formed at defined intervals. In FIG. 12, these five servo stripes 113 are denotes with reference signs $A_1$, $A_2$, $A_3$, $A_4$, and $A_5$ from the end of tape (EOT) to the beginning of tape (BOT) of the magnetic tape MT. Similar to the A burst 111A, the B burst 111B includes five servo pulses 63 formed at specified intervals, which are inclined at a predetermined angle φ with respect to the width direction of the magnetic tape MT. In FIG. 12, these five servo stripes 113 are indicated by the reference numerals $B_1$, $B_2$, $B_3$, $B_4$, and B; from the EOT to the BOT of the magnetic tape MT. The servo stripe 113 of the B burst 111B is inclined in the direction opposite to the servo stripe 113 of the A burst 111A. That is, the servo stripe 113 of the A burst 111A and the servo stripe 113 of the B burst 111B are disposed in an inverted V-shape.

The servo subframe 2 (112) includes a C burst 112C and a D burst 112D. The D burst 112D is disposed adjacent to the C burst 112C. The C burst 112C includes four servo stripes 113 formed at specified intervals, which are inclined at a predetermined angle φ with respect to the width direction of the tape. In FIG. 12, these four servo stripes 113 are indicated by the reference numerals $C_1$, $C_2$, $C_3$, and $C_4$ from EOT to BOT of the magnetic tape MT. Like the C burst 112C, the D burst 112D includes four servo pulses 63 formed at specified intervals, which are inclined at a predetermined angle φ with respect to the width direction of the tape. In FIG. 12, these four servo stripes 113 are indicated by the reference numerals $D_1$, $D_2$, $D_3$, and $D_4$ from EOT to BOT of the magnetic tape MT. The servo stripe 113 of the D burst 112D and the servo stripe 113 of the C burst 112C are inclined in directions opposite to each other. In other words, the servo stripe 113 of the C burst 112C and the servo stripe 113 of the D burst 112D are disposed in an inverted V-shape.

The above predetermined angle φ of the servo stripe 113 in the A burst 111A, the B burst 111B, the C burst 112C, and the D burst 112D is preferably 11° or more and 40° or less, is more preferably 11° or more and 36° or less, is more preferably 11° or more and 25° or less, and is further preferably 17° or more and 25° or less, for example.

Information for acquiring the tape speed and the position of the head 56 in the vertical direction is obtained by the head 56 reading the servo band SB. The tape speed is calculated from times between four timing signals (A1-C1, A2-C2, A3-C3, and A4-C4). The position of the head 56 is calculated from the aforementioned times between the four timing signals and times between other four timing signals (A1-B1, A2-B2, A3-B3, and A4-B4). The servo pattern may have a shape including two parallel lines.

As illustrated in FIG. 12, it is preferable that the servo patterns (that is, the plurality of servo stripes 113) be linearly arranged in the longitudinal direction of the magnetic tape MT. That is, it is preferable that the servo band SB have a linear shape in the longitudinal direction of the magnetic tape MT.

The upper limit value of the average thickness of the magnetic layer 43 is preferably 80 nm or less, is more preferably 70 nm or less, is further preferably 60 nm or less, and is particularly preferably 50 nm or less. If the upper limit value of the average thickness of the magnetic layer 43 is 80 nm or less, the influence of the diamagnetic field can be reduced in a case where a ring-type head is used as a recording head, and it is thus possible to obtain better electromagnetic conversion characteristics.

The lower limit value of the average thickness of the magnetic layer 43 is preferably 35 nm or more. If the lower limit value of the average thickness of the magnetic layer 43 is 35 nm or more, an output can be secured in a case where an MR type head is used as a reproducing head, and it is thus possible to obtain more excellent electromagnetic conversion characteristics.

The average thickness of the magnetic layer 43 is obtained as follows. First, the magnetic tape MT accommodated in the cartridge 10 is rolled off, the magnetic tape MT is cut at each of three positions at 10 m, 30 m, and 50 m in the longitudinal direction from a connected portion 21 between the magnetic tape MT and the leader tape LT (specifically, in a direction from one end on the side of the leader tape LT to the other end on the side opposite thereto), and three samples are thereby produced. Then, each sample is processed by the FIB method or the like and is thus sliced. In the case where the FIB method is used, a carbon layer and a tungsten layer are formed as protective films in preprocessing for observing a TEM photograph of a section, which will be described later. The carbon layer is formed on the surface of the magnetic tape MT on the side of the magnetic layer 43 and on the surface thereof on the side of the back layer 44 by the vapor deposition method, and the tungsten layer is further formed on the surface on the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The section of each obtained sliced sample is observed by a transmission electron microscope (TEM) under the following conditions to obtain a TEM photograph of each sliced sample. Here, the magnification and the acceleration voltage may be appropriately adjusted according to the type of the device.

Device: TEM (H9000NAR commercially available from Hitachi, Ltd.)
Acceleration voltage: 300 kV
Magnification: 100,000 times Next, the obtained TEM photograph of each sliced sample is used to measure the thickness of the magnetic layer 43 at ten positions on each sliced sample. Note that since the slicing is performed in the longitudinal direction of the magnetic tape MT as described above, the ten measurement positions on each sliced sample are positioned aligned in the longitudinal direction of the magnetic tape MT. An average value obtained by simply averaging (arithmetic mean of) the obtained measurement values of each sliced sample (the thicknesses at the total of thirty points on the magnetic layers 43) is obtained as an average thickness [nm] of the magnetic layer 43. Here, the positions at which the measurement is performed are randomly selected from the test piece.

(Magnetic Powder)

The magnetic powder contains a plurality of magnetic particles. The magnetic particles are, for example, particles containing metal oxide (hereinafter, referred to as "metal oxide particles"). The metal oxide particles are, for example, particles containing hexagonal ferrite (hereinafter, referred to as "hexagonal ferrite particles"), particles containing epsilon-type iron oxide (ε-iron oxide) (hereinafter, referred to as "ε-iron oxide particles"), or particles containing Co-containing spinel ferrite (hereinafter, referred to as "cobalt ferrite particles"). The magnetic powder preferably has crystal orientation in the vertical direction of the magnetic tape MT with priority. In the present specification, the vertical direction (thickness direction) of the magnetic tape MT means the thickness direction of the magnetic tape MT in a planar state.

(Hexagonal Ferrite Particles)

The hexagonal ferrite particles have, for example, a plate shape such as a hexagonal plate shape or a columnar shape such as a hexagonal prism shape (however, the thickness or the height is smaller than the long diameter of the plate surface or the bottom surface). In the present specification, the hexagonal plate shape includes a substantially hexagonal plate shape. The hexagonal ferrite preferably contains at least one of Ba, Sr, Pb and Ca, and more preferably at least one of Ba and Sr. Specifically, the hexagonal ferrite may be, for example, barium ferrite or strontium ferrite. The barium ferrite may further contain at least one of Sr, Pb and Ca in addition to Ba. The strontium ferrite may further contain at least one of Ba, Pb and Ca in addition to Sr.

More specifically, the hexagonal ferrite has an average composition represented by a general formula of $MFe_{12}O_{19}$. Here, M is, for example, at least one metal of Ba, Sr, Pb and Ca, and preferably at least one metal of Ba and Sr. M may be a combination of Ba, and at least one metal selected from the group consisting of Sr, Pb and Ca. In addition, M may be a combination of Sr, and at least one metal selected from the group consisting of Ba, Pb and Ca. In the above general formula, some of Fe may be replaced with other metal elements.

In the case where the magnetic powder includes hexagonal ferrite particle powder, the average particle size of the magnetic powder is preferably 13 nm or more and 22 nm or less, is more preferably 13 nm or more and 19 nm or less, is more preferably 13 nm or more and 18 nm or less, is particularly preferably 14 nm or more and 17 nm or less, and is most preferably 14 nm or more and 16 nm or less. If the average particle size of the magnetic powder is 22 nm or less, it is possible to obtain further excellent electromagnetic conversion characteristics (an SNR, for example) of the magnetic tape MT with a high recording density. On the other hand, if the average particle size of the magnetic powder is 13 nm or more, dispersibility of the magnetic powder is further improved, and it is possible to obtain further excellent electromagnetic conversion characteristics (an SNR, for example).

In a case where the magnetic powder contains hexagonal ferrite particle powder, the average aspect ratio of the magnetic powder is preferably 1.0 or more and 3.0 or less, more preferably 1.5 or more and 2.8 or less, and still more preferably 1.8 or more and 2.7 or less. When the average aspect ratio of the magnetic powder is in a range between 1.0 or more and 3.0 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved.

In the case where the magnetic powder contains hexagonal ferrite particle powder, the average particle size and the average aspect ratio of the magnetic powder are obtained as follows. First, the magnetic tape MT as a target of measurement is worked by the FIB method or the like to obtain a sliced piece. In the case where the FIB method is used, a carbon layer and a tungsten layer are formed as protective films in pre-processing for observing a TEM photograph of a section, which will be described later. The carbon layer is formed on the surface of the magnetic tape MT on the side of the magnetic layer 43 and on the surface on the side of the back layer 44 by the vapor deposition method, and the tungsten layer is further formed on the surface on the side of the magnetic layer 43 by the vapor evaporation method or the sputtering method. The slicing is performed in the length direction (longitudinal direction) of the magnetic tape MT. In other words, according to the slicing, a cross section parallel to both the longitudinal direction and the thickness direction of the magnetic tape MT is formed.

The section of the obtained sliced sample is observed such that the entire magnetic layer 43 is included in the thickness direction of the magnetic layer 43 with an acceleration voltage of 200 kV and a total magnification of 500,000 times by using a transmission electron microscope (H-9500 manufactured by Hitachi High Technologies Co., Ltd.), and a TEM photograph is captured. The number of TEM photographs prepared is such a number that it is possible to extract fifty particles, the plate diameters DB and the plate thicknesses DA (see FIG. 13) described blow can be measured.

Figure 13:
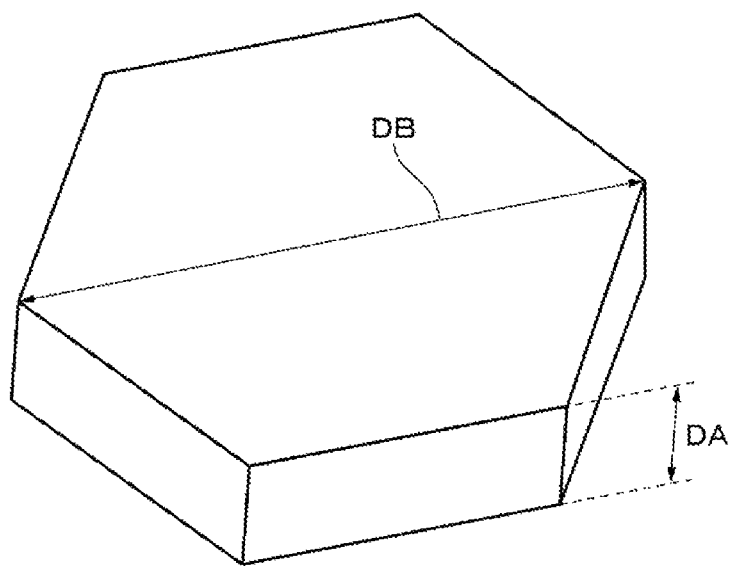
FIG. 13 is a perspective view illustrating an example of a particle shape.

In the present specification, in a case where the shape of the particles observed in the above TEM photographs is a plate shape or a columnar shape (however, the thickness or the height is smaller than the longer diameter of the plate surface or the bottom surface) as illustrated in FIG. 13, the longer diameter of the plate surface or the bottom surface of the particles is defined as a value of the plate diameter DB. The thickness or the height of the particles observed in the above TEM photographs is defined as the value of the plate thickness DA. In a case where the plate shape or the bottom shape of the particles observed in the TEM photographs is a hexagonal shape, the longer diameter means the longest diagonal distance. In a case where the particle thickness or height in one particle is not constant, the maximum thickness or height of the particle is defined as the plate thickness DA.

Next, fifty particles to be extracted from the captured TEM photographs are picked up on the basis of the following criteria. Particles that partially stick out from the fields of view of the TEM photographs are not measured, and particles that have clear outlines and are present independently are measured. In a case where particles overlap each other, the particles, the boundary of which is clear, and the entire shapes of which are distinguishable, are measured as individual particles. However, particles, the boundary of which is not clear, and the entire shapes of which cannot be distinguished, are defined as particles with undistinguishable shapes and are not measured.

Figure 14:
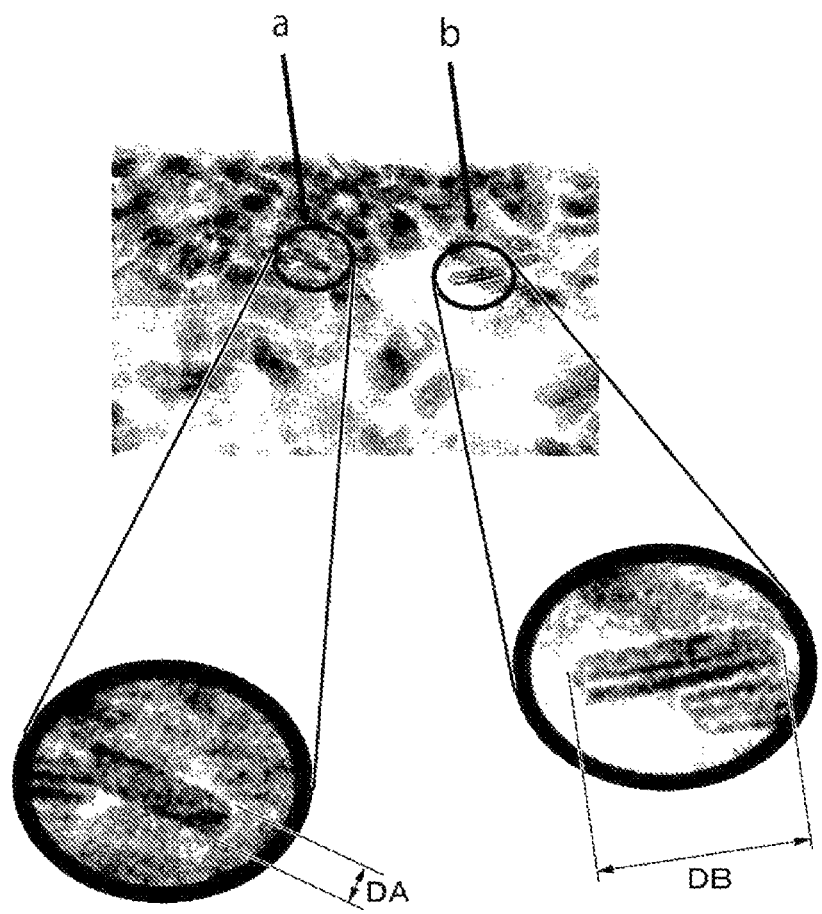
FIG. 14 is a diagram illustrating an example of a TEM photograph of a magnetic layer.
Figure 15:
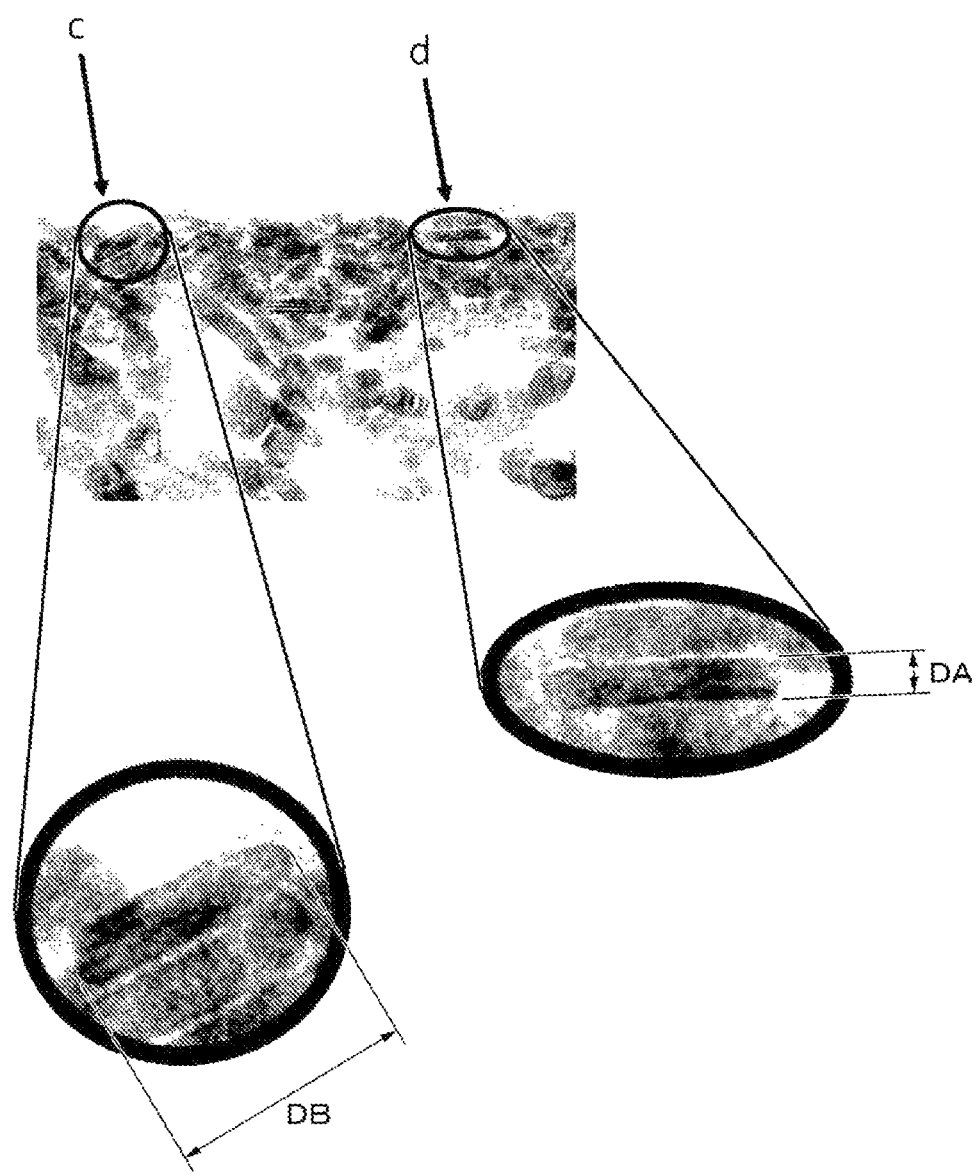
FIG. 15 is a diagram illustrating an example of the TEM photograph of the magnetic layer.

FIGS. 14 and 15 illustrate examples of the TEM photographs. In FIGS. 14 and 15, the particles illustrated with the arrows a and d, for example, are picked up since the plate thicknesses of the particles (the thicknesses or the heights of the particles) DA can be clearly confirmed. The plate thickness DA of each of the selected fifty particles is measured. The thus obtained plate thicknesses DA is simply averaged (arithmetic mean) to obtain an average plate thickness $DA_{ave}$. The average plate thickness $DA_{ave}$ is an average particle plate thickness. Then, the plate diameter DB of each magnetic powder is measured. In order to measure the plate diameter DB of the particles, fifty particles, the plate diameters DB of which can be obviously confirmed, are picked up from the captured TEM photographs. For examples, the particles illustrated with the arrows b and c, for example, in FIGS. 14 and 15 are selected since the plate diameter DB thereof can be obviously confirmed. The plate diameter DB of each of the fifty selected particles is measured. The thus obtained plate diameters DB are simply averaged (arithmetic mean) to obtain an average plate diameter $DB_{ave}$. The average plate diameter $DB_{ave}$ is an average particle size.

Then, an average aspect ratio ($DB_{ave}/DA_{ave}$) is obtained from the average plate thickness $DA_{ave}$ and the average plate diameter $DB_{ave}$.

In the case where the magnetic powder contains hexagonal ferrite particle powder, the average particle volume of the magnetic powder is preferably 500 nm$^3$ or more and 2500 nm$^3$ or less, is more preferably 500 nm$^3$ or more and 1600 nm$^3$ or less, is yet further preferably 500 nm$^3$ or more and 1500 nm$^3$ or less, is particularly preferably 600 nm$^3$ or more and 1200 nm$^3$ or less, and is most preferably 600 nm$^3$ or more and 1000 nm$^3$ or less. If the average particle volume of the magnetic powder is 2500 nm$^3$ or less, effects similar to those in a case where the average particle size of the magnetic powder is set to 22 nm or less are obtained. On the other hand, if the average particle volume of the magnetic powder is 500 nm$^3$ or more, effects similar to those in a case where the average particle size of the magnetic powder is set to 13 nm or more are obtained.

The average particle volume of the magnetic powder is obtained as follows. First, as described in regard to the aforementioned method of calculating the average particle size of the magnetic powder, an average plate thickness $DA_{ave}$ and an average plate diameter $DB_{ave}$ are obtained. Next, an average volume V of a magnetic powder is obtained by the following formula.

$$V = \frac{3\sqrt{3}}{8} \times DA_{ave} \times DB_{ave} \times DB_{ave} \qquad [\text{Math. 1}]$$

(ε-Iron Oxide Particles)

The ε-iron oxide particles are hard magnetic particles with which it is possible to obtain a high coercive force even in a case of fine particles. The ε-iron oxide particles have a spherical shape or a three-dimensional shape. In the present specification, the spherical shape includes a substantially spherical shape. Also, the three-dimensional shape includes a substantially three-dimensional shape. Since the ε-iron oxide particles have the shape as described above, the contact areas between particles in the thickness direction of the magnetic tape MT can be reduced, and aggregation of particles can be curbed, in a case where the ε-iron oxide particles are used as the magnetic particles as compared with a case where barium ferrite particles with a hexagonal plate shape are used as the magnetic particles. Therefore, it is possible to enhance dispersibility of the magnetic powder and to obtain further excellent electromagnetic conversion characteristic (an SNR, for example).

The ε-iron oxide particles have a core-shell type structure. Specifically, the ε-iron oxide particles have a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of ε-$Fe_2O_3$ crystal as a main phase, and more preferably composed of single-phase ε-$Fe_2O_3$.

The first shell part covers at least a part of the periphery of the core part. Specifically, the first shell part may partially cover the periphery of the core part or may cover the entire periphery of the core part. In order to make exchange coupling between the core part and the first shell part sufficient and improve magnetic characteristics, it is preferable to cover the entire surface of the core part.

The first shell part is a so-called soft magnetic layer, and contains, for example, a soft magnetic component such as α-Fe, Ni—Fe alloys or Fe—Si—Al alloys. α-Fe may be obtained by reducing the ε-iron oxide contained in the core part.

The second shell part is an oxide film as an antioxidant layer. The second shell part contains α-iron oxide, aluminum oxide or silicon oxide. The α-iron oxide contains at least one kind of iron oxides from $Fe_3O_4$, $Fe_2O_3$, and FeO, for example. In a case where the first shell part contains α-Fe (soft magnetic component), the α-iron oxide may be obtained by oxidizing α-Fe contained in the first shell part.

Since the ε-iron oxide particles have the first shell part as described above, a coercive force Hc of the core part alone can be kept at a large value in order to secure thermal stability, and the coercive force Hc of the entire ε-iron oxide particles (core-shell particles) can be adjusted to a coercive force Hc suitable for recording. In addition, since the ε-iron oxide particles have the second shell part as described above, the ε-iron oxide particles are exposed to the air and rust and the like occur on the surfaces of the particles in the process of manufacturing the magnetic tape MT and the preceding process thereof, and it is thus possible to curb degradation of the properties of the ε-iron oxide particles. Therefore, it is possible to minimize deterioration of characteristics of the magnetic tape MT.

The ε-iron oxide particles may have a shell part having a single-layer structure. In this case, the shell part has the same configuration as the first shell part. Here, in order to minimize deterioration of characteristics of the ε-iron oxide particles, it is preferable for the ε-iron oxide particles to have a shell part having a two-layer structure as described above.

The ε-iron oxide particles may contain an additive in place of the core-shell structure, or may contain an additive together with the core-shell structure. In this case, some of Fe of the ε-iron oxide particles is replaced with an additive. Even when the ε-iron oxide particles contain an additive, since the coercive force Hc of the entire ε-iron oxide particles can be adjusted to a coercive force Hc suitable for recording, it is possible to improve ease of recording. The additive is a metal element other than iron, preferably a trivalent metal element, more preferably at least one of Al, Ga and In, and still more preferably at least one of Al and Ga.

Specifically, the ε-iron oxide containing an additive is an $ε-Fe_{2-x}M_xO_3$ crystal (where, M is a metal element other than iron, preferably a trivalent metal element, more preferably at least one kind of Al, Ga and In, and still more preferably at least one kind of Al and Ga; x satisfies, for example, 0<x<1).

In the case where the magnetic powder contains ε-iron oxide particles, the average particle size of the magnetic powder is preferably 10 nm or more and 20 nm or less, is more preferably 10 nm or more and 18 nm or less, is further preferably 10 nm or more and 16 nm or less, is particularly preferably 10 nm or more and 15 nm or less, and is most preferably 10 nm or more and 14 nm or less. In the magnetic tape MT, the region of a size of ½ the recording wavelength is an actual magnetization region. Therefore, it is possible to obtain further excellent electromagnetic conversion characteristics (an SNR, for example) by setting the average particle size of the magnetic powder to be equal to or less than a half the shortest recording wavelength. Therefore, if the average particle size of the magnetic powder is 20 nm or less, it is possible to further obtain further excellent electromagnetic conversion characteristics (an SNR, for example) in the magnetic tape MT with a high recording density (the magnetic tape MT configured to be able to record a signal with the shortest recording wavelength of 40 nm or less, for example). On the other hand, if the average particle size of the magnetic powder is 10 nm or more, dispersibility of the magnetic powder is further improved, and it is possible to obtain further excellent electromagnetic conversion characteristics (an SNR, for example).

In the case where the magnetic powder contains ε-iron oxide particles, an average aspect ratio of the magnetic powder is preferably 1.0 or more and 3.0 or less, is more preferably 1.0 or more and 2.5 or less, is still more preferably 1.0 or more and 2.1 or less, and is particularly preferably 1.0 or more and 1.8 or less. When the average aspect ratio of the magnetic powder is in a range between 1.0 or more and 3.0 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved.

In the case where the magnetic powder contains ε-iron oxide particle powder, the average particle size and the average aspect ratio of the magnetic powder are obtained as follows. First, the magnetic tape MT as a measurement target is worked and sliced by the focused ion beam (FIB) method or the like. In a case where the FIB method is used, a carbon layer and a tungsten layer are formed as protective layers in pre processing for observing a TEM photograph of a section, which will be described later. The carbon layer is formed on the surface of the magnetic tape MT on the side of the magnetic layer 43 and on the surface thereof on the side of the back layer 44 by the vapor deposition method, and the tungsten layer is further formed on the surface on the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The above section of the obtained sliced sample was observed such that the entire magnetic layer 43 is included with respect to the thickness direction of the magnetic layer 43 with an acceleration voltage of 200 kV and a total magnification of 500,000 times by using a transmission electron microscope (H-9500 manufactured by Hitachi High Technologies Co., Ltd.), and a TEM photograph is captured. Then, fifty particles, the shapes of which can be obviously confirmed are picked up from the captured TEM photograph, and the long axis length DL and the short axis length DS of each particle are measured. Here, the long axis length DL means the maximum distance (a so-called maximum Feret diameter) from among distances between two parallel lines drawn at any angles to be in contact with the outline of each particle. On the other hand, the short axis length DS means the maximum length from among particle lengths in the direction perpendicular to the long axis (DL) of the particle. Then, the measured long axis lengths DL of the fifty particles are simply averaged (arithmetic mean) to obtain an average long axis length $DL_{ave}$. The average long axis length $DL_{ave}$ obtained in this manner is defined as an average particle size of the magnetic powder. Also, the measured short axis lengths DS of the fifty particles is simply averaged (arithmetic mean) to obtain an average short axis length $DS_{ave}$. Then, an average aspect ratio ($DL_{ave}/DS_{ave}$) of a particle is obtained from the average major axis length $DL_{ave}$ and the average minor axis length $DS_{ave}$.

In the case where the magnetic powder contain ε-iron oxide particles, the average particle volume of the magnetic powder is preferably 500 nm³ or more and 4000 nm³ or less, is more preferably 500 nm³ or more and 3000 nm³ or less, is further preferably 500 nm³ or more and 2000 nm³ or less, is particularly preferably 500 nm³ or more and 1600 nm³ or less, and is most preferably 500 nm³ or more and 1300 nm³ or less. Since noise of the magnetic tape MT is typically inversely proportional to a square root of the number of particles (that is, proportional to a square root of the volume of the particles), it is possible to obtain further excellent electromagnetic conversion characteristics (an SNR, for example) by further reducing the volume of the particles. Thus, if the average particle volume of the magnetic powder is 4000 nm³ or less, more excellent electromagnetic conversion characteristics (an SNR, for example) can be obtained similarly to a case where the average particle size of the magnetic powder is set to 20 nm or less. On the other hand, if the average particle volume of the magnetic powder is 500 nm³ or more, effects similar to those in a case where the average particle size of the magnetic powder is set to 10 nm or more are obtained.

In a case where the ε-iron oxide particle has a spherical shape, the average particle volume of the magnetic powder is obtained as follows. First, an average major axis length $DL_{ave}$ is obtained in the same manner as in the method of calculating the average particle size of the magnetic powder. Next, an average volume V of the magnetic powder is obtained by the following formula.

$$V=(\pi/6) \times DL_{ave}^3$$

In the case where the ε-iron oxide particles have a three-dimensional shape, an average volume of the magnetic powder is obtained as follows. The magnetic tape MT is worked by the focused iron beam (FIB) method or the like and sliced.

In the case where the FIB method is used, a carbon film and a tungsten film are formed as protective films in pre-processing for observing a TEM photograph of a section, which will be described later. The carbon film is formed on the surface of the magnetic tape MT on the side of the magnetic layer 43 and on the surface thereof on the side of the back layer 44 by the vapor evaporation method, and the tungsten thin film is further formed on the surface on the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The section of the obtained sliced sample is observed such that the entire magnetic layer 43 is included with respect to the thickness direction of the magnetic layer 43 with an acceleration voltage of 200 kV and a total magnification of 500,000 times by using a transmission electron microscope (H-9500 manufactured by Hitachi High Technologies Co., Ltd.), and a TEM photograph is captured. Note that the magnification and the acceleration voltage may be appropriately adjusted in accordance with the type of the device. Next, fifty particles, the shapes of which are obvious, are selected from the captured TEM photograph, and the length DC of a side of each particle is measured. Then, the lengths DC of the sides of the fifty particles are simply averaged (arithmetic mean) to obtain an average side length $DC_{ave}$. Next, an average volume $V_{ave}$ of the magnetic powder (particle volume) is obtained from the following formula using the average side length $DC_{ave}$.

$$V_{ave}=DC_{ave}^3$$

(Cobalt Ferrite Particles)

The cobalt ferrite particles preferably have uniaxial crystal anisotropy. When the cobalt ferrite particles have uniaxial crystal anisotropy, the magnetic powder can be crystal-oriented preferentially in the vertical direction of the magnetic tape MT. The cobalt ferrite particles have, for example, a cube shape. In this specification, the cube shape includes a substantially cube shape. The Co-containing spinel ferrite may further contain at least one of Ni, Mn, Al, Cu and Zn in addition to Co.

The Co-containing spinel ferrite has, for example, an average composition represented by the following formula.

$$Co_xM_yFe_2O_z$$

(where, in the formula, M is, for example, at least one metal among Ni, Mn, Al, Cu and Zn; x is a value in a range of 0.4≤x≤1.0; y is a value in a range of 0≤y≤0.3; here, x and y satisfy a relationship of (x+y)≤1.0; z is a value in a range of 3≤z≤4; and some of Fe may be replaced with other metal elements).

In a case where the magnetic powder contains cobalt ferrite particle powder, the average particle size of the magnetic powder is preferably 8 nm or more and 16 nm or less, is more preferably 8 nm or more and more and 13 nm or less, and is further more preferably 8 nm or more and 10 nm or less. If the average particle size of the magnetic powder is 16 nm or less, it is possible to obtain further excellent electromagnetic conversion characteristics (an SNR, for example) in the magnetic tape MT with a high recording density. On the other hand, if the average particle size of the magnetic powder is 8 nm or more, dispersibility of the magnetic powder is further improved, and it is possible to obtain further excellent electromagnetic conversion characteristics (an SNR, for example). A method of calculating the average particle size of the magnetic powder is the same as a method of calculating the average particle size of the magnetic powder in a case where the magnetic powder contains ε-iron oxide particle powder.

In the case where the magnetic powder contains cobalt ferrite particle powder, an average aspect ratio of the magnetic powder is preferably 1.0 or more and 2.5 or less, is more preferably 1.0 or more and 2.1 or less, and is further more preferably 1.0 or more and 1.8 or less. When the average aspect ratio of the magnetic powder is in a range between 1.0 or more and 2.5 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved. A method of calculating the average aspect ratio of the magnetic powder is the same as a method of calculating the average aspect ratio of the magnetic powder in a case where the magnetic powder contains ε-iron oxide particle powder.

In the case where the magnetic powder contains cobalt ferrite particle powder, the average particle volume of the magnetic powder is preferably 500 nm³ or more and 4000 nm³ or less, is more preferably 500 nm³ or more and 2000 nm³ or less, and is further more preferably 500 nm³ or more and 1000 nm³ or less. If the average particle volume of the magnetic powder is 4000 nm³ or less, effects similar to those in a case where the average particle size of the magnetic powder is set to 16 nm or less are obtained. On the other hand, when the average particle volume of the magnetic powder is 500 nm³ or more, the same effects as in a case where the average particle size of the magnetic powder is set to 8 nm or more are obtained. A method of calculating the average particle volume of the magnetic powder is the same as a method of calculating an average particle volume in a case where a ε-iron oxide particle has a cube shape.
(Binding Agent)

Examples of the binder include thermoplastic resins, thermosetting resins, and reactive resins. Examples of thermoplastic resins include vinyl chloride, vinyl acetate, vinyl chloride vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene butadiene copolymers, polyurethane resins, polyester resins, amino resins, and synthetic rubber.

Examples of thermosetting resins include phenolic resins, epoxy resins, polyurethane curable resins, urea resins, melamine resins, alkyd resins, silicone resins, polyamine resins, and urea formaldehyde resins.

In all of the above-described binding agent, for the purpose of improving dispersibility of the magnetic powder, —$SO_3M$, —$OSO_3M$, —COOM, P=O(OM)$_2$ (where, M in the formula represents a hydrogen atom or an alkali metal such as lithium, potassium, or sodium), a side-chain amine having a terminal group represented by —$NR1R2$, —$NR1R2R3^+$—$X^-$, a main-chain amine represented by >$NR1R2^+$—$X^-$ (where, R1, R2, and R3 in the formula represent a hydrogen atom or a hydrocarbon group, and X— represents halogen element ions such as fluorine, chlorine, bromine and iodine, inorganic ions, or organic ions.), and a polar functional group such as —OH, —SH, —CN, or an epoxy group may be introduced. The amount of these polar functional groups introduced into the binding agent is preferably $10^{-1}$ mol/g or more and $10^{-8}$ mol/g or less, and is more preferably $10^{-2}$ mol/g or more and 10-6 mol/g or less.
(Lubricant)

The lubricant contains, for example, at least one selected from among fatty acids and fatty acid esters, and preferably contains both fatty acids and fatty acid esters. When the magnetic layer 43 contains a lubricant, particularly, when the magnetic layer 43 contains both fatty acids and fatty acid esters, this contributes to improving the running stability of the magnetic tape MT.

The fatty acids may preferably be compounds represented by Formula (1) or (2) below. For example, one of a compound represented by Formula (1) below and a compound represented by Formula (2) may be contained, or both of them may be contained, as the fatty acids.

Also, the fatty acid esters may preferably compounds represented by Formula (3) o (4) below. For example, one of a compound represented by Formula (3) below and a compound represented by Formula (4) may be contained, or both of them may be contained, as the fatty acid esters.

When the lubricant contains one or both of the compound represented by General Formula (1) and the compound represented by General Formula (2), and one or both of the compound represented by General Formula (3) and the compound represented by General Formula (4), it is possible to minimize an increase in the dynamic friction coefficient due to repeated recording or reproducing of the magnetic tape MT.

$$CH_3(CH_2)_kCOOH \qquad (1)$$

(where, in General Formula (1), k is an integer selected from the range of 14 or more and 22 or less, and more preferably selected from the range of 14 or more and 18 or less).

$$CH_3(CH_2)_n CH=CH(CH_2)_mCOOH \qquad (2)$$

(where, in General Formula (2), a sum of n and m is an integer selected from the range of 12 or more and 20 or less, and more preferably selected from the range of 14 or more and 18 or less).

$$CH_3(CH_2)_pCOO(CH_2)_qCH_3 \qquad (3)$$

(where, in General Formula (3), p is an integer selected from the range of 14 or more and 22 or less, and more preferably selected from the range of 14 or more and 18 or less, and q is an integer selected from the range of 2 or more and 5 or less, and more preferably selected from the range of 2 or more and 4 or less).

$$CH_3(CH_2)_rCOO—(CH_2)_s CH(CH_3)_2 \qquad (4)$$

(where, in General Formula (4), r is an integer selected from the range of 14 or more and 22 or less, and s is an integer selected from the range of 1 or more and 3 or less).
(Carbon)

Carbon contained in the magnetic layer 43 functions as an antistatic agent. The carbon contained in the magnetic layer 43 may function as a lubricant or the like. The carbon specifically means carbon particles. The carbon particles contain at least one kind selected from a group consisting of carbon black, acetylene black, ketjen black, carbon nanotube, and graphene, for example.
(Antistatic Agent)

Examples of the antistatic agent include a natural surfactant, a nonionic surfactant, and a cationic surfactant.
(Abrasive)

Examples of abrasives include α-alumina with an α transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, and those obtained by performing a surface treatment on the above materials with aluminum and/or silica as necessary.
(Curing Agent)

Examples of a curing agent include polyisocyanates and the like. Examples of polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. The weight-average molecular weight of these polyisocyanates is preferably in a range of 100 or more and 3,000 or less.
(Antirust Agent)

Examples of antirust agents include phenols, naphthols, quinones, heterocyclic compounds containing nitrogen atoms, heterocyclic compounds containing oxygen atoms, and heterocyclic compounds containing sulfur atoms.
(Non-Magnetic Reinforcing Particles)

Examples of non-magnetic reinforcing particles include aluminum oxide (α, β or γ alumina), chromium oxide, silicon oxide, diamond, garnet, emery, boron nitride, titanium carbide, silicon carbide, titanium carbide, and titanium oxide (rutile type or anatase type titanium oxide).

(Underlayer)

The underlayer 42 is provided to alleviate the unevenness of the surface of the substrate 41 and adjust the unevenness of the surface of the magnetic layer 43. The underlayer 42 is a non-magnetic layer containing a non-magnetic powder, a binding agent and a lubricant. According to the underlayer 42, the lubricant is supplied to the surface of the magnetic layer 43. The underlayer 42 may further contain at least one additive among an antistatic agent, a curing agent, an antirust agent, and the like, as necessary.

The upper limit value of the average thickness of the underlayer 42 is preferably 1.2 µm or less, is more preferably 0.9 µm or less, is further more preferably 0.8 µm or less, is particularly more preferably 0.7 µm or less, and is the most preferably 0.6 µm or less. If the upper limit value of the average thickness of the underlayer 42 is 1.2 µm or less, it is possible to reduce the thickness of the magnetic tape MT and thereby to increase the recording capacity for recording in one data cartridge as compared with a typical magnetic tape. Also, if the average thickness of the underlayer 42 is 1.2 µm or less, the degree of expansion and contraction of the magnetic tape MT due to an external force increases, and it is thus easier to adjust the width of the magnetic tape MT by adjusting the tension. The lower limit value of the average thickness of the underlayer 42 is preferably 0.3 µm or more. If the lower limit value of the average thickness of the underlayer 42 is 0.3 µm or more, it is possible to curb degradation of the function of the underlayer 42. Note that the average thickness of the underlayer 42 is obtained in a manner similar to that for the average thickness of the magnetic layer 43. Here, the magnification of the TEM photograph is appropriately adjusted according to the thickness of the underlayer 42.

(Non-Magnetic Powder)

The non-magnetic powder contains, for example, at least one of inorganic particle powder and inorganic particle powder. In addition, the non-magnetic powder may contain carbon powder such as carbon black. Here, one type of non-magnetic powder may be used alone, or two or more types of non-magnetic powders may be used in combination. Examples of inorganic particles include metals, metal oxides, metal carbonates, metal sulfates, metal nitrides, metal carbides and metal sulfides. Examples of shapes of non-magnetic powders include various shapes such as a needle shape, a spherical shape, a cube shape, and a plate shape, but the present disclosure is not limited to these shapes.

(Binding Agent and Lubricant)

The binding agent and the lubricant are similar to those of the above magnetic layer 43.

(Additive)

The antistatic agent, the curing agent and the antirust agent are similar to those of the above magnetic layer 43.

(Back Layer)

The back layer 44 contains a binding agent and a non-magnetic powder. The back layer 44 may further contain at least one additive among a lubricant, a curing agent, an antistatic agent, and the like, as necessary. The binding agent and the non-magnetic powder are similar to those of the above underlayer 42. The curing agent and the antistatic agent are similar to those of the above magnetic layer 43.

The average particle size of the non-magnetic powder is preferably 10 nm or more and 150 nm or less, and more preferably 15 nm or more and 110 nm or less. The average particle size of the non-magnetic powder is obtained in the same manner as the above-described average particle size of the magnetic powder. The non-magnetic powder may contain a non-magnetic powder having a particle size distribution of 2 or more.

An upper limit value of an average thickness of the back layer 44 is preferably 0.6 µm or less. If the upper limit value of the average thickness of the back layer 44 is 0.6 µm or less, the thicknesses of the underlayer 42 and the substrate 41 can be kept large even in a case where an average thickness of the magnetic tape MT is 5.3 µm or less, and thus running stability of the magnetic tape MT in the drive can be maintained. A lower limit value of an average thickness of the back layer 44 is not particularly limited, but is, for example, 0.2 µm or more.

The average thickness $t_b$ of the back layer 44 is obtained as follows. First, the average thickness $t_T$ of the magnetic tape MT is measured. The method for measuring the average thickness $t_T$ is as described in "Average thickness of magnetic tape" below. Next, the back layer 44 of the sample is removed by a solvent such as methyl ethyl ketone (MEK) or a dilute hydrochloric acid. Then, the thickness of the sample is measured at five positions by using a laser hologage (LGH-110C) manufactured by Mitutoyo, and the measurement values are simply averaged (arithmetic mean) thereby to calculate an average value $t_B$ [µm]. Then, the average thickness $t_b$ [µm] of the back layer 44 is obtained from the following formula. Here, the measurement positions are randomly selected from the sample.

$$t_b[\mu m]=t_T[\mu m]-t_B[\mu m]$$

(Average Height of Protrusions of Carbon)

An upper limit value of the average height of the protrusions 43A of the carbon is preferably 12 nm or less. If the upper limit value of the average height is 12 nm or less, it is possible to curb degradation of an output due to a spacing loss and thereby to curb degradation of electromagnetic conversion characteristics The lower limit value of the average height of the protrusions 43A of carbon is preferably 5 nm or more. If the upper limit value of the average height is 5 nm or more, it is possible to satisfactorily bring the head 56 into contact with carbon when the head 56 and the magnetic tape MT come into contact with each other and thereby to obtain satisfactory conduction between the head 56 and the magnetic tape MT. It is thus possible to curb charging of the magnetic tape MT.

(Number of Protrusion of Carbon)

The lower limit value of the number of protrusions 43A of carbon per unit area on the magnetic surface is $1.2/\mu m^2$ or more. If the lower limit value of the number is $1.2/\mu m^2$ or more, the number of carbons that come into contact with the head 56 when the head 56 and the magnetic tape MT come into contact with each other increases, and it is thus possible to obtain satisfactory conduction between the head 56 and the magnetic tape MT. It is thus possible to curb charging of the magnetic tape MT. The upper limit value of the number of protrusions 43A of carbon per unit area on the magnetic surface is preferably $2.5/\mu m^2$ or less. If the upper limit value of the number is $2.5/\mu m^2$ or less, it is possible to curb a decrease in number of magnetic particles on the magnetic surface and thereby to curb degradation of electromagnetic conversion characteristics.

(Average Area of Protrusions of Carbon)

The average area of the protrusions 43A of carbon is preferably 8000 $nm^2$ or more and 15000 $nm^2$ or less. If the average area of the protrusions 43A is 8000 $nm^2$ or more, the contact area between the head 56 and carbon increases when the head 56 and the magnetic tape MT come into contact with each other, and it is thus possible to obtain satisfactory conduction between the head 56 and the magnetic tape MT. It is thus possible to curb charging of the magnetic tape MT. On the other hand, if the average area of the protrusions 43A is 15000 nm$^2$ or less, it is possible to curb a decrease in area of the magnetic particles on the magnetic surface and thereby to curb degradation of electromagnetic conversion characteristics.

(Method for Calculating Average Area of Protrusions of Carbon)

The average area of the protrusions 43A of carbon is calculated as follows.

<FE-SEM Measurement Condition>
  Device: HITACHI S-4800 (manufactured by Hitachi High-Technologies Corporation)
  Viewing angle: 5.1 μm×3.8 μm
  Acceleration voltage: 5 kV
  Measurement magnification: 25000 times
  Binarization processing is performed on the obtained FE-SEM image (FIG. 19) under the two processing conditions described below by using an image processing software Image J. From the image obtained by the binarization processing, information regarding the numbers of protrusions formed by the first particles and the second particles, the average area per protrusion, the total area of the protrusions, and the diameter (Feret diameter) of the protrusions is obtained. Note that the conditions are changed as follows for the second particles (the white part in FIG. 19) with high luminance and the first particles (the black part in FIG. 19) with low luminance in the binarization processing.

<Binarization Processing Conditions for Obtaining Information Regarding First Particles>
  Software: Image J Ver 1.44p
  Binarization threshold value: Threshold (0.65)
  Binarization target size: 0.002 μm—infinity <Binarization Processing Conditions for Obtaining Information Regarding Second Particles>
  Software: Image J Ver 1.44p
  Binarization threshold value: Threshold (220,255)
  Binarization target size: 0.001 μm—infinity (Method for Calculating Average Height of Protrusions of Carbon and Number of Protrusions of Carbon Per Unit Area on Magnetic Surface)

The average height of the protrusions 43A of carbon and the number of protrusions 43A of carbon per unit area on the magnetic surface are obtained by following Steps 1 to 4 below. Here, a case where an abrasive is alumina will be described.

Step 1: Marking on the sample surface by a manipulator
  Step 2: Acquisition of an AFM image of the marking portion
  Step 3: Acquisition of an FE-SEM image of the marking portion and binarization processing of the acquired FE-SEM image
  Step 4: Extraction of the protrusions 43A of carbon
  Step 5: Measure the height of protrusions 43A by AFM analysis software Hereinafter, details of Steps 1 to 4 will be described in order.

(Step 1: Marking on Sample Surface by Manipulator)

First, the magnetic tape MT accommodated in the cartridge 10 is rolled off, the magnetic tape MT is cut at a position of 30 m in the longitudinal direction from the connected portion 21 between the magnetic tape MT and the leader tape LT (specifically, in the direction from the one end on the side of the leader tape LT to the other end on the side opposite thereto), and a sample is thereby produced. Then, marking is applied on the magnetic surface of the sample by a manipulator. The marking is for performing acquisition of an AFM image in Step S2 and acquisition of an FE-SEM image in Step S3 at the same position.

(Step 2: Acquisition of AFM Image of Marking Portion)

Figure 16:
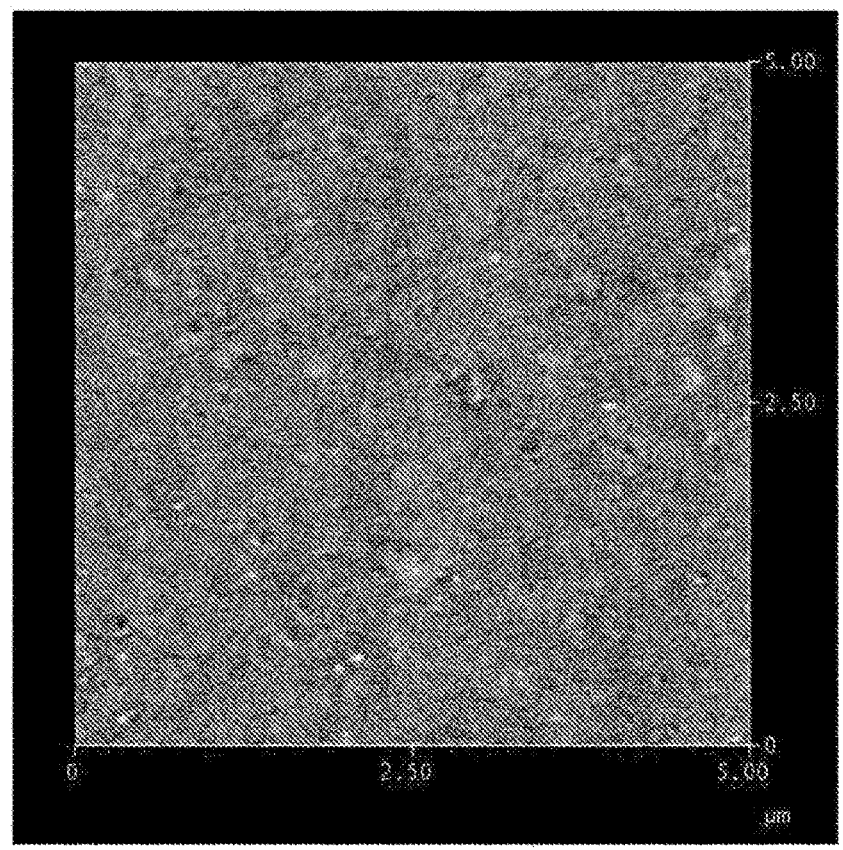
FIG. 16 is a diagram illustrating an example of an AFM image of a magnetic surface of the magnetic tape.

The part of the magnetic surface of the sample on which marking has been applied is observed with an AFM, and an AFM image is obtained (see FIG. 16). AFM observation conditions will be described below.

Device name: NanoscopeIV manufactured by Digital Instruments
  Measurement mode: Tapping
  Cantilever: SNL-10
  Scan size: 5×5 μm
  Scan rate: 1 Hz
  Scan line: 256

Figure 17:
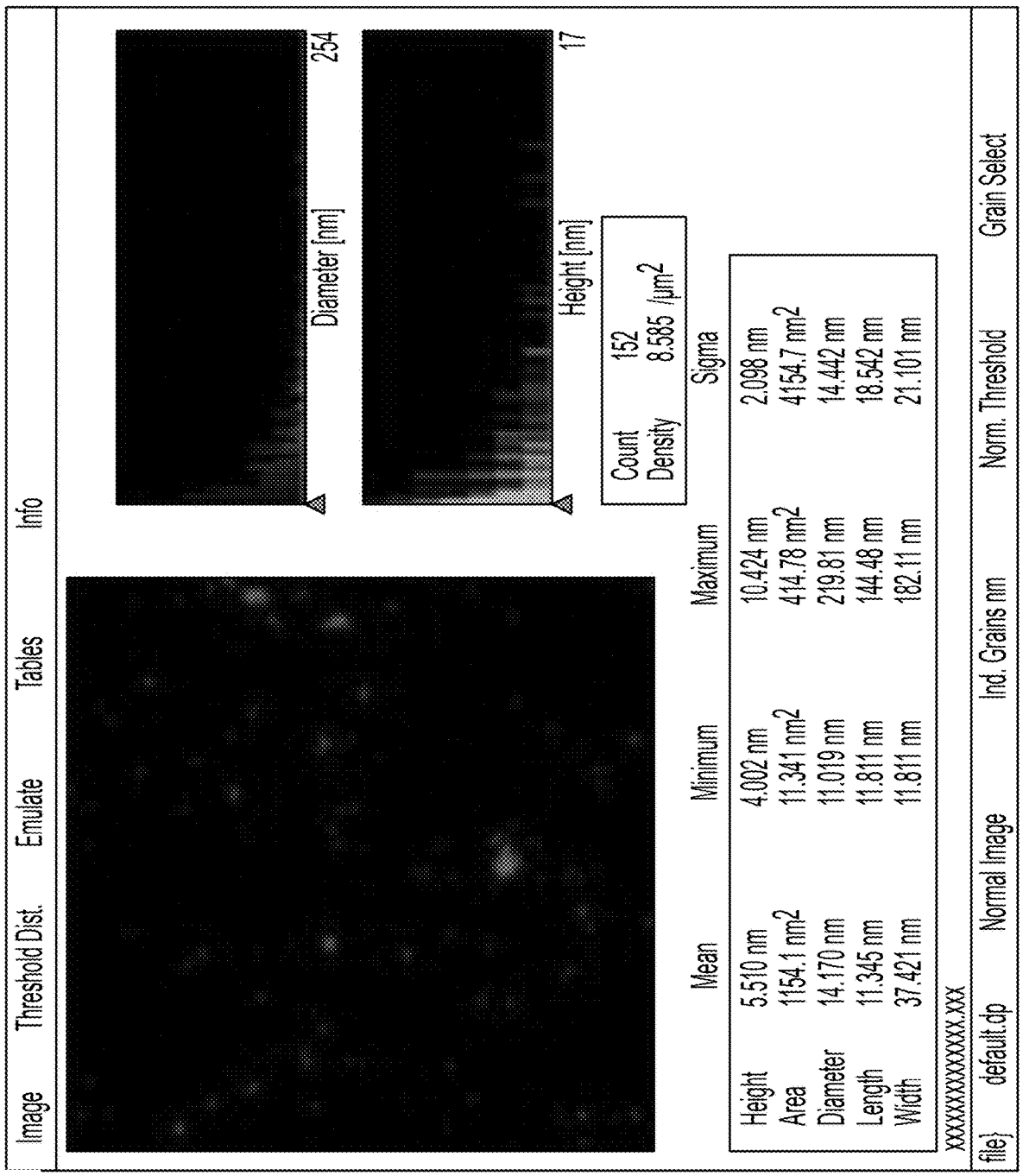
FIG. 17 is a diagram illustrating a protrusion analysis result obtained by AFM.
Figure 18:
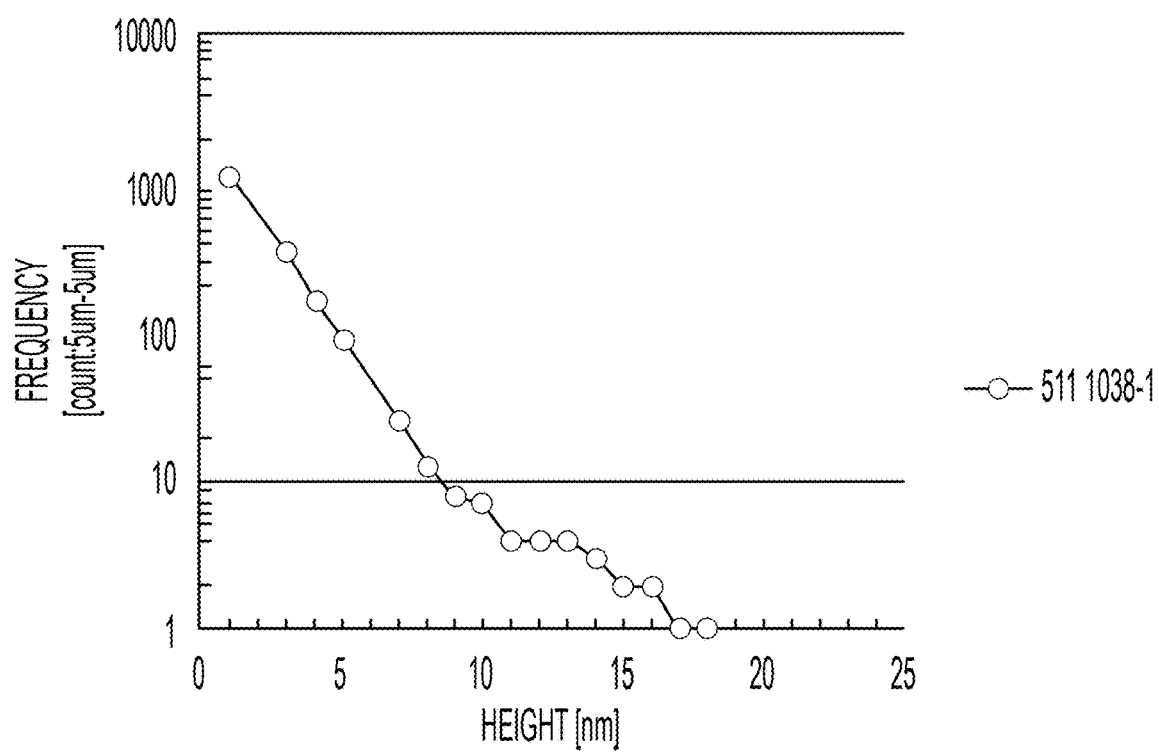
FIG. 18 is a diagram illustrating protrusion height distribution obtained by AFM.

With the AFM, it is possible to obtain information regarding the number of protrusions 43A, the height of the protrusions 43A, and the like. FIG. 17 illustrates an analysis result of the protrusions 43A obtained with the AFM. FIG. 18 illustrates a calculation result of height distribution of the protrusions 43A obtained with the AFM.

(Step 3: Acquisition of FE-SEM Image of Marking Portion and Binarization Processing of Acquired FE-SEM Image)

Figure 19:
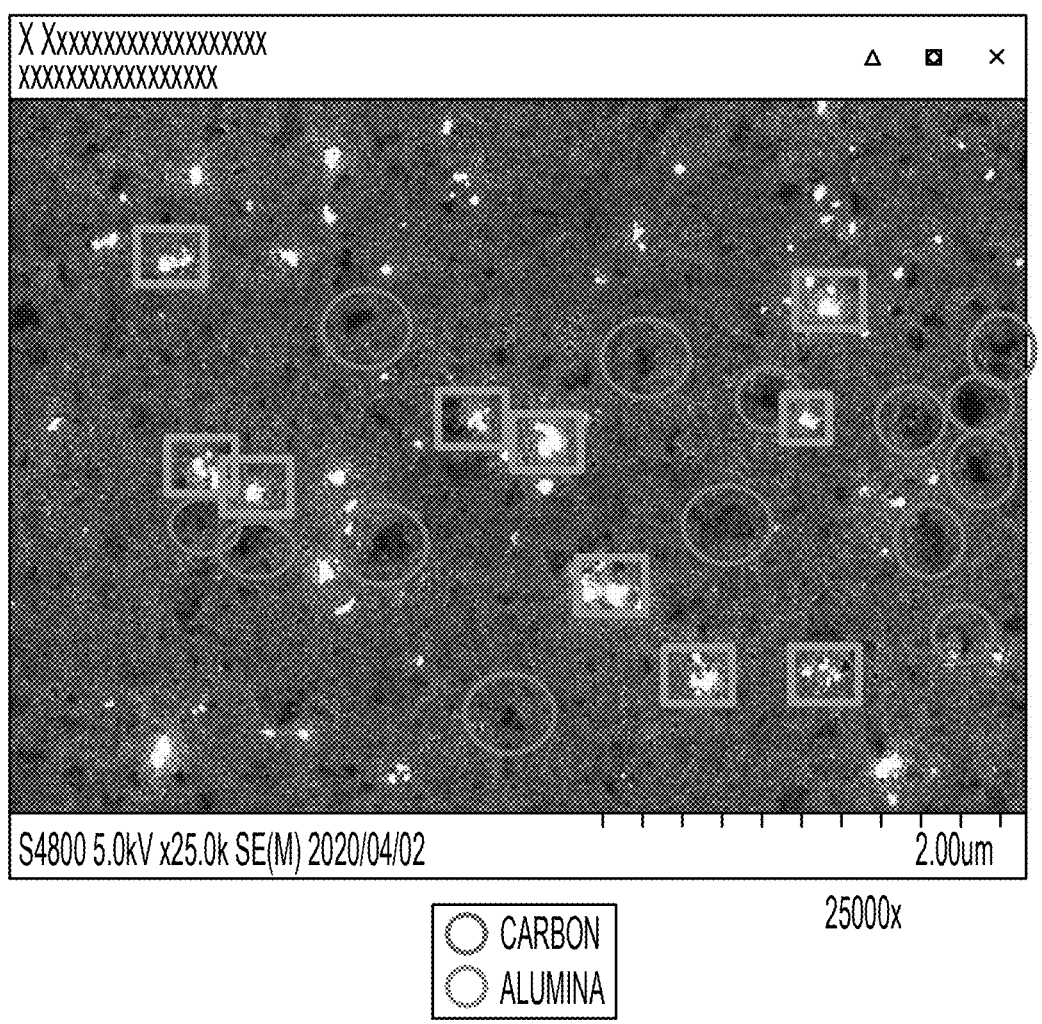
FIG. 19 is a diagram illustrating an example of an FE-SEM image of the magnetic surface of the magnetic tape.

First, the part of the magnetic surface of the sample where the marking has been applied is observed with FE-SEM, and a Tif file (1260×960 pixels) of an FE-SEM image (black and white grayscale image) of the observed surface is obtained (see FIG. 19). Note that the part that looks with a black color corresponds to the part where carbon is present, and the part that looks with a white color corresponds to the part where alumina is present, in the SEM image.

Observation conditions of FE-SEM will be described below.

Device name: S-4800 manufactured by Hitachi High-Technologies Corporation
  Acceleration voltage: 5 kV
  Observation magnification: 25000 times (size: 5.1 μm×3.8 μm)
  (The observation magnification of 25000 times is a measurement magnification corresponding to the above scan size (5×5 μm) of the AFM.)

Next, carbon (black part) is extracted from the SEM image as follows by using a luminance difference caused by a difference in secondary electron emissions. After the SEM image (black and white grayscale image) is converted into 256 gradations, and binarization is performed by using image analysis software. In this manner, a binary image (see FIG. 20) illustrating the protrusions 43A configured of carbon is obtained.

Conditions of the binarization processing are as follows.
  Image analysis software: Image J Ver 1.44p
  Binarization threshold value: Threshold (0.65)
  Binarization target size: 0.002 μm-infinity Note that the same software as that for the binarization processing is used for the processing for conversion into 256 gradations as well.

Figure 20:
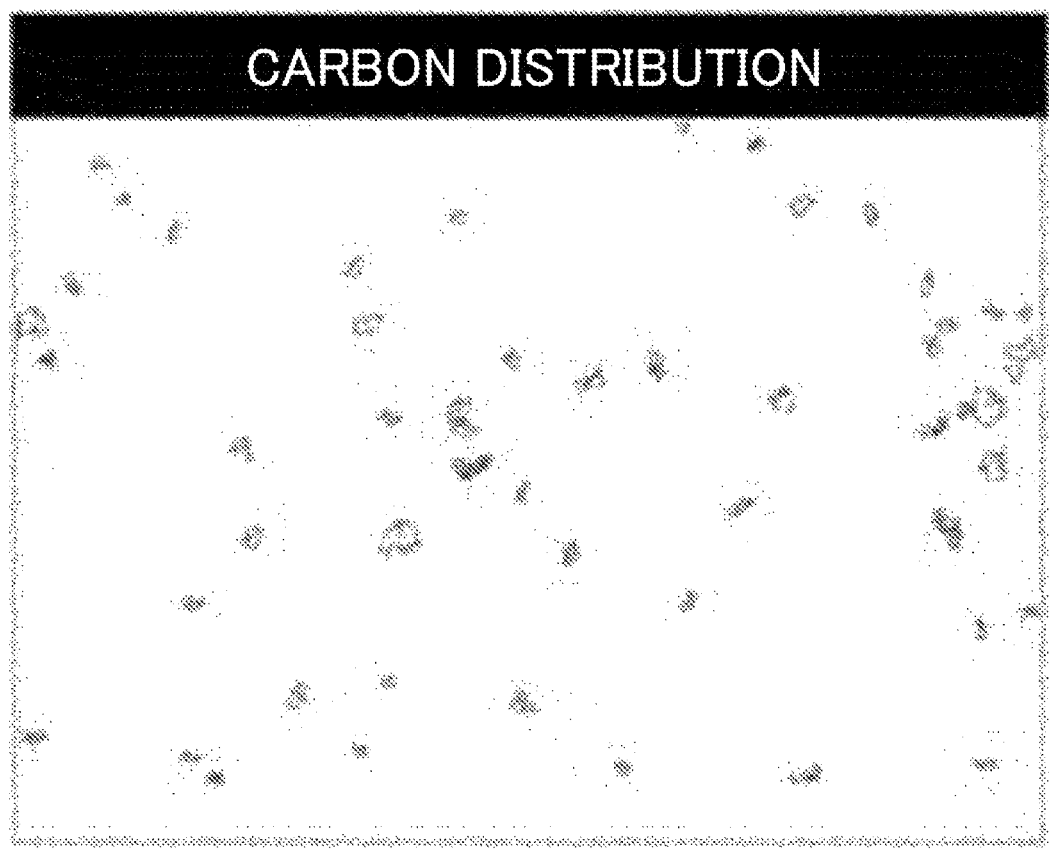
FIG. 20 is a diagram illustrating an example of a binary image of the magnetic surface of the magnetic tape.

It is possible to calculate information such as the number of carbons, the average area per carbon, the total area of carbons, and the diameter of carbons (Feret diameter) from the above binary image by using the image analysis software (Image J Ver 1.44p). The above information calculated from the binary image illustrated in FIG. 20 is as follows.
  Number: 55
  Average area: 0.005 μm$^2$
  Total area: 0.262 μm$^2$
  Feret diameter: 0.013 μm (Step 4: Extraction of Protrusions 43A of Carbon)

Figure 21:
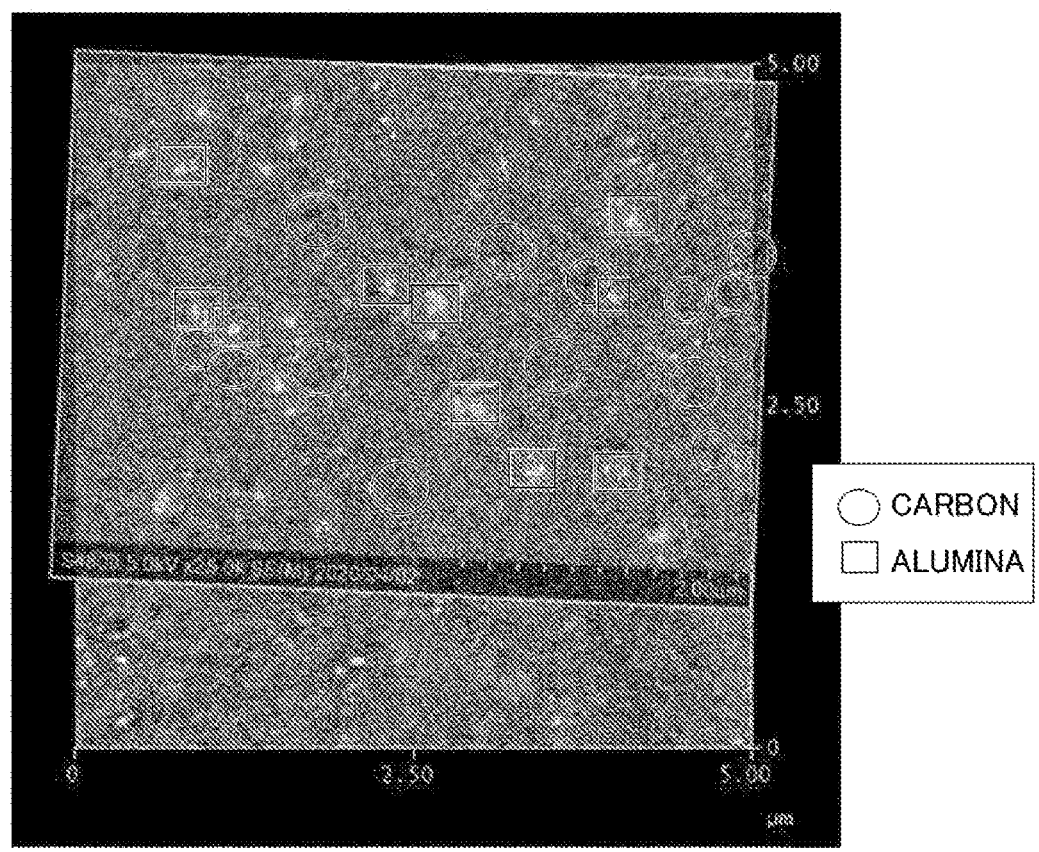
FIG. 21 is a diagram illustrating a synthesized image of the AFM image and the FE-SEM image.
Figure 22:
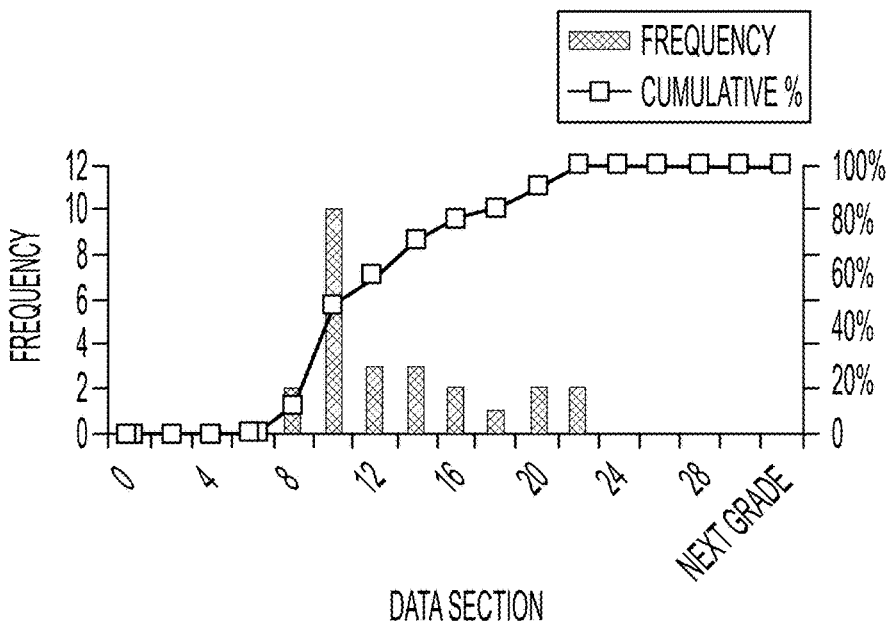
FIG. 22 is a diagram illustrating cumulative frequency distribution of protrusion heights.

First, a synthesized image is obtained by causing the above AFM image and FE-SEM image to overlap each other (see FIG. 21). Subsequently, which of carbon and alumina protrusions 43A the protrusions 43A correspond to is determined from the obtained synthesized image. Next, the number of protrusions 43A of carbon is measured by using AFM software. Also, the average height of the protrusions 43A of carbon (the average height of twenty samples) is calculated by using the AFM software. FIG. 22 illustrates an example of cumulative frequency distribution obtained by the above measurement (cumulative frequency distribution of the heights of the protrusions 43A of carbon). In this measurement example, twenty protrusions 43A of carbon are measured.

Figure 23:
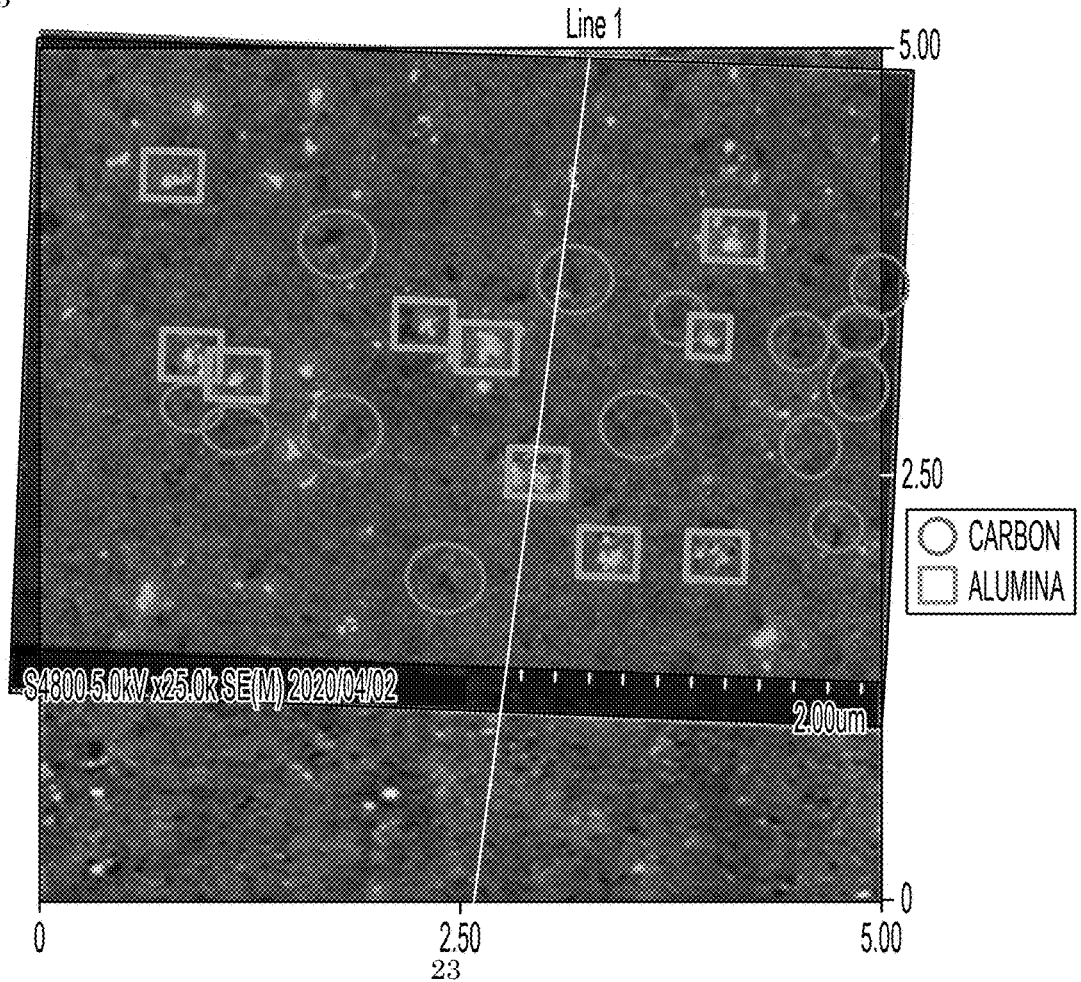
FIG. 23 is a diagram illustrating an acquisition position (Line 1) of a sectional profile in the synthesized image.
Figure 24:
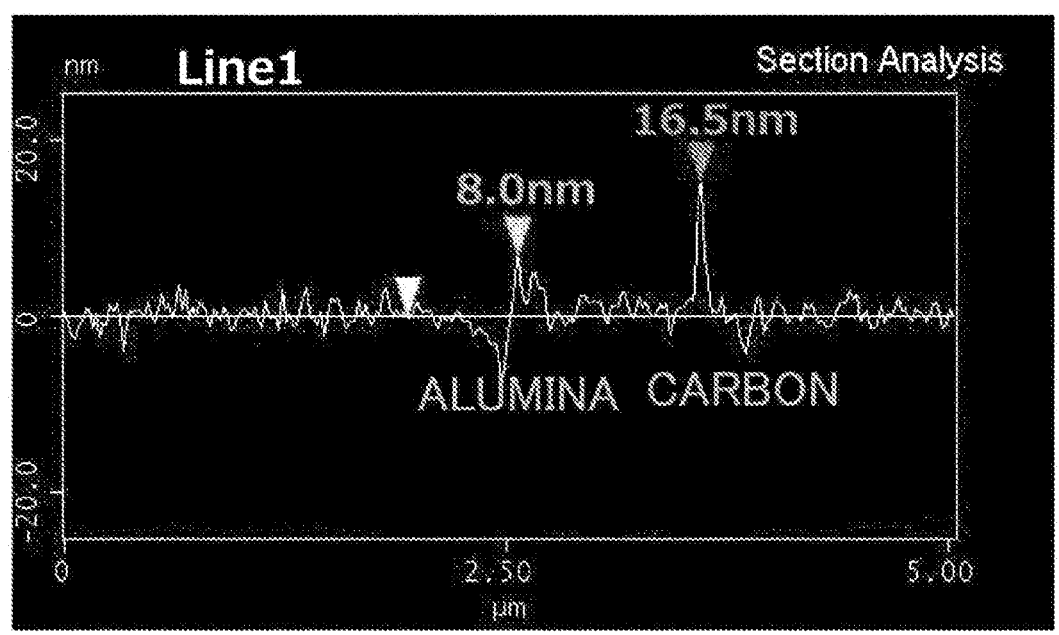
FIG. 24 is a diagram illustrating a sectional profile acquired at Line 1 illustrated in FIG. 23.

FIG. 23 illustrates an acquisition position (Line1) of a sectional profile in the synthesized image. FIG. 24 illustrates the sectional profile acquired at Line1 illustrated in FIG. 23. In the sectional profile at Line1, the protrusions 43A of carbon and protrusions 43A of alumina are observed.

(Surface Resistivity of Magnetic Surface of Magnetic Tape)

The upper limit value of the surface resistivity of the magnetic surface of the magnetic tape MT is preferably $1 \times 10^6$ Ω/sq. or less. If the upper limit value of the surface resistivity is $1 \times 10^6$ Ω/sq. or less, it is possible to form a conductive path from the magnetic surface of the magnetic tape MT to the reel 13 during running and thereby to curb charging of the magnetic tape MT during running. The lower limit value of the surface resistivity of the magnetic surface of the magnetic tape MT is preferably $1 \times 10^4$ Ω/sq or more. If the surface resistivity of the magnetic surface of the magnetic tape MT is excessively low, an excessively large current flows through the element of the recording reproduction head from the magnetic surface in a case where discharging occurs on the side of the magnetic surface in the drive, which may lead to breakage of the element, it is thus preferable to provide a lower limit value, and the lower limit value is preferably $1 \times 10^4$ Ω/sq or more.

The surface resistivity of the magnetic surface of the magnetic tape MT is measured as follows. First, the magnetic tape MT accommodated in the cartridge 10 is rolled off, the magnetic tape MT is cut at the position of 30 m in the longitudinal direction from the connected portion 21 between the magnetic tape MT and the leader tape LT (specifically, in the direction from one end on the side of the leader tape LT to the other end on the side opposite thereto), and a sample is thereby produced. Next, the surface resistivity of the magnetic surface of the sample is measured by the method based on the following standard.

ECMA-0319

9.18 Electrical resistance of coated surfaces 9.18.1 Requirement 9.18.2 Procedure (Average Thickness of Magnetic Tape)

An upper limit value of the average thickness (average total thickness) $t_T$ of the magnetic tape MT is preferably 5.3 μm or less, is more preferably 5.1 μm or less, is yet more preferably 4.9 μm or less, is particularly preferably 4.6 μm or less, and is most preferably 4.4 μm or less. When average thickness $t_T$ of the magnetic tape MT is 5.3 μm or less, the recording capacity that can be recorded in one data cartridge can be increased as compared with a general magnetic tape. A lower limit value of an average thickness $t_T$ of the magnetic tape MT is not particularly limited, but is, for example, 3.5 μm or more.

The average thickness $t_T$ of the magnetic tape MT is obtained as follows. First, the magnetic tape MT is prepared, and it is cut into the length of 250 mm, and a sample is thereby produced. Next, the thickness of the sample is measured at five positions by using a laser hologage (LGH-110C) manufactured by Mitutoyo as a measurement device, the measurement values are simply averaged (arithmetic mean), and the average value $t_T$ [μm] is thereby calculated. Here, the measurement positions are randomly selected from the sample.

(Surface Roughness $R_b$ of Back Surface)

It is preferable that a surface roughness of a back surface (surface roughness of the back layer 44) $R_b$ be $R_b \leq 6.0$ [nm]. When the surface roughness $R_b$ of the back surface is in the above-described range, more excellent electromagnetic conversion characteristics can be obtained.

The surface roughness $R_b$ of the back surface is obtained as follows. First, the magnetic tape MT with the width of 12.65 mm is prepared, it is cut into the length of 100 mm, and a sample is thereby produced. Next, the sample is put on a slide glass with a measurement target surface thereof (the surface on the side of the magnetic layer) facing up, and the end portions of the sample are fixed with a mending tape. The surface shape is measured by using VertScan (objective lens: 50 times) as a measurement device, and the surface roughness $R_b$ of the back surface is obtained from the following equation on the basis of the standard ISO 25178.

Device: Non-contact roughness meter using optical interference (Non-contact surface/layer cross-sectional shape measurement system VertScan R5500GL-M100-AC manufactured by Ryoka System Co., Ltd.)

Objective lens: 20 times

Measurement region: 640×480 pixels (field of view: approximately 237 μm×178 μm field of view)

Measurement mode: phase

Wavelength filter: 520 nm

CCD: ⅓ lens

Noise removal filter: smoothing 3×3

Face correction: Correction with quadratic polynomial approximation surface

Measurement software: VS-Measure Version 5.5.2

Analysis software: VS-viewer Version 5.5.5

$$S_a = \frac{1}{A} \int\!\!\int_A |Z(x,y)| dx dy \quad \text{[Math. 2]}$$

As described above, after surface roughness is measured at least at 5 points in the longitudinal direction of the magnetic tape MT, the average value of each arithmetic mean roughness $S_a$ (nm) automatically calculated from the surface profile obtained at each position is defined as surface roughness $R_b$ (nm) of the back surface.

(Coercive force Hc)

The upper limit value of a coercive force Hc2 of the magnetic layer 43 in the longitudinal direction of the magnetic tape MT is preferably 3,000 Oe or less, is more preferably 2,000 Oe or less, is still more preferably 1,900 Oe or less, and is particularly preferably 1,800 Oe or less. If the coercive force Hc2 of the magnetic layer 43 in the longitudinal direction of the magnetic tape MT is 3,000 Oe or less, sufficient electromagnetic conversion characteristics can be provided even at a high recording density.

The lower limit value of the coercive force Hc2 of the magnetic layer 43 measured in the longitudinal direction of the magnetic tape MT is preferably 1,000 Oe or more. When the coercive force Hc2 of the magnetic layer 43 measured in the longitudinal direction of the magnetic tape MT is 1,000 Oe or more, demagnetization due to leakage flux from the recording head can be minimized.

The above coercive force Hc2 is obtained as follows. First, three magnetic tapes MT are caused to overlap each other with double-sided tapes and are then punched with a punch of φ6.39 mm, and a measurement sample is thereby produced. At this time, marking is performed with an arbitrary ink with no magnetism such that the longitudinal direction (running direction) of the magnetic tape MT can be recognized. Then, an M-H loop of the measurement sample (the entire magnetic tape MT) corresponding to the longitudinal direction (running direction) of the magnetic tape MT is measured by using a vibrating sample magnetometer (VSM). Next, coating films (such as the underlayer 42, the magnetic layer 43, and the back layer 44) are wiped off by using acetone, ethanol, or the like, and only the substrate 41 is left. Then, three obtained substrates 41 are caused to overlap each other with double-sided tapes and are then punched with a punch of φ6.39 mm, and a sample for background correction (hereinafter, simply referred to as a "sample for correction") is thereby produced. Thereafter, the M-H loop of the sample for correction (substrate 41) corresponding to the longitudinal direction of the substrate 41 (the longitudinal direction of the magnetic tape MT) is measured by using the VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows. Measurement mode: Full-loop, Maximum magnetic field: 15 kOe, Magnetic field step: 40 bit, Time constant of Locking amp: 0.3 sec, Waiting time: 1 sec, MH average number: 20

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction. The coercive force Hc2 is obtained from the obtained M-H loop after background correction. Here, for this calculation, a measurement/analysis program bundled in "Type VSM-P7-15" is used. Note that it is assumed that all of the above M-H loop are measured in an environment at 25° C.±2° C. and 50% RH±5% RH. In addition, "diamagnetic field correction" when the M-H loop is measured in the longitudinal direction of the magnetic tape MT is not performed.

(Squareness Ratio)

The squareness ratio S1 of the magnetic layer 43 in the vertical direction of the magnetic tape MT is preferably 65% or more, more preferably 70% or more, still more preferably 75% or more, particularly preferably 80% or more, and most preferably 85% or more. When the squareness ratio S1 is 65% or more, since the vertical orientation of the magnetic powder is sufficiently improved, it is possible to obtain better electromagnetic conversion characteristics.

The squareness ratio S1 of the magnetic tape MT in the vertical direction is obtained as follows. First, three magnetic tapes MT are caused to overlap each other with double-sided tapes and are then punched with a punch of @6.30 mm, and a measurement sample is thereby produced. At this time, marking is performed with an arbitrary ink with no magnetism such that the longitudinal direction (running direction) of the magnetic tape MT can be recognized. Then, an M-H loop of the measurement sample (the entire magnetic tape MT) corresponding to the vertical direction (thickness direction) of the magnetic tape MT is measured by using a VSM. Next, the coating films (such as the underlayer 42, the magnetic layer 43, and the back layer 44) are wiped off by using acetone, ethanol, or the like, and only the substrate 41 is left. Then, the three obtained substrates 41 are caused to overlap each other with double-sided tapes and are then punched with a punch of @6.39 mm, and a sample for background correction (hereinafter, simply referred to as a "sample for correction") is thereby obtained. Thereafter, the M-H loop of the sample for correction (substrate 41) corresponding to the vertical direction of the substrate 41 (the vertical direction of the magnetic tape MT) is measured by using the VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows. Measurement mode: Full-loop, Maximum magnetic field: 15 kOe, Magnetic field step: 40 bit, Time constant of Locking amp: 0.3 sec, Waiting time: 1 sec, MH average number: 20

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction.

A saturation magnetization Ms (emu) and a residual magnetization Mr (emu) of the obtained M-H loop after background correction are substituted into the following formula, and the squareness ratio S1 (%) is calculated. Note that it is assumed that all of the above M-H loop are measured in an environment at 25° C.±2° C. and 50% RH±5% RH. In addition, "diamagnetic field correction" when the M-H loop is measured in the vertical direction of the magnetic tape MT is not measured. Here, for this calculation, a measurement/analysis program bundled in "Type VSM-P7-15" is used.

$$\text{squareness ratio } S1(\%) = (Mr/Ms) \times 100$$

The squareness ratio S2 of the magnetic layer 43 in the longitudinal direction (running direction) of the magnetic tape MT is preferably 35% or less, more preferably 30% or less, still more preferably 25% or less, particularly preferably 20% or less, and most preferably 15% or less. When the squareness ratio S2 is 35% or less, since the vertical orientation of the magnetic powder is sufficiently improved, it is possible to obtain better electromagnetic conversion characteristics.

The squareness ratio S2 in the longitudinal direction of the magnetic tape MT is obtained in the same manner as the squareness ratio S1 except that the M-H loop is measured in the longitudinal direction (running direction) of the magnetic tape MT and the substrate 41.

(Hc2/Hc1)

A ratio Hc2/Hc1 between a coercive force Hc1 of the magnetic layer 43 in the vertical direction of the magnetic tape MT and a coercive force Hc2 of the magnetic layer 43 in the longitudinal direction of the magnetic tape MT satisfies relationships of preferably Hc2/Hc1≤0.80, more preferably Hc2/Hc1≤0.75, still more preferably Hc2/Hc1≤0.70, particularly preferably Hc2/Hc1≤0.65, and most preferably Hc2/Hc1≤0.60. When the coercive forces Hc1 and Hc2 satisfy a relationship of Hc2/Hc1≤0.80, the degree of vertical orientation of the magnetic powder can be increased. Therefore, the magnetization transition width can be reduced and a high-output signal can be obtained during signal reproduction, and thus it is possible to obtain better electromagnetic conversion characteristics. Here, magnetization reacts with high sensitivity due to a magnetic field in the vertical direction from the recording head if Hc2 is small as described above, and it is thus possible to form a satisfactory recording pattern.

In a case where the ratio Hc2/Hc1 satisfies Hc2/Hc1≤0.80, the average thickness of the magnetic layer 43 of 90 nm or less is particularly effective. If the average thickness of the magnetic layer 43 exceeds 90 nm, there is a concern that the lower region of the magnetic layer 43 (the region on the side of the underlayer 42) is magnetized in the longitudinal direction of the magnetic tape MT and the magnetic layer 43 cannot be uniformly magnetized in the thickness direction in a case where a ring-type head is used as a recording head. Therefore, there is a concern that it is not possible to obtain further excellent electromagnetic conversion characteristics even if the ratio Hc2/Hc1 is set to satisfy Hc2/Hc1≤0.80.

A lower limit value of Hc2/Hc1 is not particularly limited, but is, for example, 0.5≤Hc2/Hc1. Here, the Hc2/Hc1 indicates a degree of vertical orientation of the magnetic powder, and a small Hc2/Hc1 indicates a higher degree of vertical orientation of the magnetic powder.

The method for calculating the coercive force Hc2 of the magnetic layer 43 in the longitudinal direction of the magnetic tape MT is as described above. As for the coercive force Hc1 of the magnetic layer 43 in the vertical direction of the magnetic tape MT, it is possible to obtain it similarly to the coercive force Hc2 of the magnetic layer 43 in the longitudinal direction of the magnetic tape MT other than that the M-H loop is measured in the direction perpendicular to the magnetic tape MT and the substrate 41 (thickness direction).

(Activation Volume $V_{act}$)

An activation volume $V_{act}$ is preferably 8000 nm³ or less, more preferably 6000 nm³ or less, still more preferably 5000 nm³ or less, particularly preferably 4000 nm³ or less, and most preferably 3000 nm³ or less. When the activation volume $V_{act}$ is 8000 nm³ or less, a dispersed state of the magnetic powder is improved, and thus it is possible to make a bit inversion region steep and to suppress deterioration of a magnetization signal recorded on an adjacent track due to a leakage magnetic field from the recording head. Thus, there is a concern that more excellent electromagnetic conversion characteristics may not be obtained.

The above-described activation volume $V_{act}$ is obtained by the following formula derived by Street & Woolley.

$$V_{act}(nm^3) = k_B \times T \times X_{irr}/(\mu_0 \times Ms \times S)$$

(Where $k_B$: Boltzmann constant (1.38×10⁻²³ J/K), T: temperature (K), $X_{irr}$: (Irreversible magnetic susceptibility $\mu_0$: Vacuum magnetic permeability, S: (Magnetic viscosity coefficient, Ms: Saturation magnetization (emu/cm³))

The irreversible magnetic susceptibility $X_{irr}$, the saturation magnetization Ms, and the magnetic viscosity coefficient S substituted into the above equation are obtained as follows by using the VSM. Note that the direction of measurement by the VSM is set to the vertical direction (thickness direction) of the magnetic tape MT. Also, measurement by the VSM is performed on the measurement sample cut from the long-shaped magnetic tape MT in an environment at 25° C.±2° C. and 50% RH±5% RH. Additionally, "demagnetizing correction" is not performed when the M-H loop is measured in the vertical direction (thickness direction) of the magnetic tape MT.

(Irreversible Magnetic Susceptibility $X_{irr}$)

The irreversible magnetic susceptibility $X_{irr}$ is defined as an inclination near the remaining coercive force Hr in an inclination of a remaining magnetization curve (DCD curve). First, a magnetic field of −1193 kA/m (15 kOe) is applied to the entire magnetic tape MT, the magnetic field is returned to zero, and a remaining magnetization state is thereby achieved. Thereafter, a magnetic field of about 15.9 kA/m (200 Oe) is applied in the opposite direction to return the magnetic field to zero again, and the remaining magnetization amount is measured. Thereafter, similarly, measurement of applying a magnetic field 15.9 kA/m larger than the applied magnetic field and returning it to zero is repeatedly performed, and a residual magnetization amount is plotted with respect to the applied magnetic field to measure a DCD curve. From the obtained DCD curve, a point where the amount of magnetization is set to zero is defined as a remaining coercive force Hr, and the DCD curve is further differentiated to obtain an inclination of the DCD curve in each magnetic field. In the inclination of the DCD curve, an inclination near the remaining coercive force Hr is $X_{irr}$.

(Saturation Magnetization Ms)

First, an M-H loop after the background correction is obtained similarly to the above method for measuring the squareness ratio S1. Next, Ms (emu/cm³) is calculated from the value of the saturation magnetization Ms (emu) of the obtained M-H loop and the volume (cm³) of the magnetic layer 43 in the measurement sample. Note that the volume of the magnetic layer 43 is obtained by multiplying the area of the measurement sample by the average thickness of the magnetic layer 43. A method for calculating the average thickness $t_1$ of the magnetic layer 43 which is necessary for the calculation of the volume of the magnetic layer 43 is as described above.

(Magnetic Viscosity Coefficient S)

First, a magnetic field of −1193 kA/m (15 kOe) is applied to the entire magnetic tape MT (measurement sample), the magnetic field is returned to zero, and the remaining magnetization state is achieved. Thereafter, a magnetic field equivalent to the value of the remaining coercive force Hr obtained from the DCD curve is applied in the opposite direction. The magnetization amount is continuously measured at constant time intervals for 1000 seconds in a state where the magnetic field is applied. The thus obtained relationship between the time t and the magnetization amount M(t) is checked against the following equation, and the magnetic viscosity coefficient S is thereby calculated.

$$M(t) = M0 + S \times \ln(t)$$

(where, M(t): amount of magnetization for time t, M0: initial amount of magnetization, S: magnetic viscosity coefficient, ln(t): natural logarithm of time)

(Young's Modulus of Magnetic Tape in Longitudinal Direction)

The upper limit value of the Young's modulus of the magnetic tape MT in the longitudinal direction is preferably 9.0 GPa or less, is more preferably 8.0 GPa or less, is still more preferably 7.5 GPa or less, and is particularly preferably 7.1 GPa or less. When the Young's modulus of the magnetic tape MT in the longitudinal direction is 9.0 GPa or less, the degree of expansion and contraction of the magnetic tape MT due to an external force further increases, and it is thus easier to adjust the width of the magnetic tape MT by adjusting the tension. Therefore, it is possible to more appropriately minimize off-track errors, and it is possible to more accurately reproduce data recorded in the magnetic tape MT. The lower limit value of the Young's modulus of the magnetic tape MT in the longitudinal direction is preferably 3.0 GPa or more and is more preferably 4.0 GPa or more. If the lower limit value of the Young's modulus of the magnetic tape MT in the longitudinal direction is 3.0 GPa or more, it is possible to curb degradation of running stability.

The Young's modulus of the magnetic tape MT in the longitudinal direction is a value indicating a lower likelihood of expansion and contraction of the magnetic tape MT in the longitudinal direction due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Here, the Young's modulus of the magnetic tape MT in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, it is advantageous that the Young's modulus of the magnetic tape MT in the longitudinal direction is small as described above and is 9.0 GPa or less in terms of adjustment of the tension.

For measurement of the Young's modulus, a tensile tester (AG-100D manufactured by Shimadzu Corporation) is used. In a case where it is desired to measure the Young's modulus in the tape longitudinal direction, the tape is cut into the length of 180 mm, and a measurement sample is thereby prepared. A jig capable of fixing the width (½ inches) of the tape is attached to the above tensile tester, and the tape width is fixed from the upper and lower sides. The distance (the length of the tape between chucks) is set to 100 mm. After the tape sample is chucked, stress is gradually applied in the direction in which the sample is pulled. A tensile speed is set to 0.1 mm/min. The Young's modulus is calculated using the following formula from the change in the stress and the amount of elongation in this case.

$E(N/m^2) = ((\Delta N/S)/(\Delta x/L)) \times 10^6$ $\Delta N$: Change in stress (N)
S: Sectional area of test piece (mm$^2$)
$\Delta x$: Amount of elongation (mm)
L: Distance between gripping jigs (mm)

The range of stress is set to be from 0.5 N to 1.0 N, and a change in stress ($\Delta N$) and the amount of elongation ($\Delta x$) at this time are used in the calculation. Note that the measurement of the above Young's modulus is performed at 25° C.±2° C. and 50% RH±5% RH.

(Young's Modulus of Substrate in Longitudinal Direction)

The Young's modulus of the substrate 41 in the longitudinal direction is preferably 7.8 GPa or less, is more preferably 7.0 GPa or less, is still more preferably 6.6 GPa or less, and is particularly preferably 6.4 GPa or less. If the Young's modulus of the substrate 41 in the longitudinal direction is 7.8 GPa or less, the degree of expansion and contraction of the magnetic tape MT due to an external force further increases, and it is thus easier to adjust the width of the magnetic tape MT by adjusting the tension. Therefore, it is possible to more appropriately minimize off-track errors, and it is possible to more accurately reproduce data recorded in the magnetic tape MT. The lower limit value of the Young's modulus of the substrate 41 in the longitudinal direction is preferably 2.5 GPa or more and is more preferably 3.0 GPa or more. If the lower limit value of the Young's modulus of the substrate 41 in the longitudinal direction is 2.5 GPa or more, it is possible to curb degradation of running stability.

The Young's modulus of the substrate 41 in the longitudinal direction is obtained as follows. First, the underlayer 42, the magnetic layer 43 and the back layer 44 are removed from the magnetic tape MT to obtain the substrate 41. The Young's modulus of the substrate 41 in the longitudinal direction is obtained using the substrate 41 in the same procedure as in the above Young's modulus of the magnetic tape MT in the longitudinal direction.

The thickness of the substrate 41 occupies more than half of the thickness of the entire magnetic tape MT. Therefore, the Young's modulus of the substrate 41 in the longitudinal direction correlates with a lower likelihood of expansion and contraction of the magnetic tape MT due to an external force, and when this value is larger, the magnetic tape MT is less likely to expand and contract in the width direction due to an external force, and when this value is smaller, the magnetic tape MT is more likely to expand and contract in the width direction due to an external force.

Here, the Young's modulus of the substrate 41 in the longitudinal direction is a value related to the magnetic tape MT in the longitudinal direction, and but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, it is advantageous that the Young's modulus of the substrate 41 in the longitudinal direction is small as described above and is 7.8 GPa or less in terms of adjustment of the tension.

4 Method of Manufacturing Magnetic Tape

Next, an example of a method for manufacturing the magnetic tape MT having the above configuration will be described.

(Preparation Process of Coating Material)

First, an underlayer forming coating material is prepared by kneading and dispersing a non-magnetic powder, a binding agent, and the like in a solvent. Next, a magnetic layer forming coating material is prepared by kneading and dispersing magnetic powder, a binding agent, a lubricant, carbon and the like in a solvent. For example, the following solvents, a dispersion device, and a kneading device can be used to prepare the magnetic layer forming coating material and the underlayer forming coating material.

Examples of solvents used to prepare the above coating materials include ketone-based solvents such as acetone, methyl ethyl ketone, methyl isobutyl ketone and cyclohexanone, alcohol-based solvents such as methanol, ethanol and propanol, ester-based solvents such as methyl acetate, ethyl acetate, butyl acetate, propyl acetate, ethyl lactate and ethylene glycol acetate, ether-based solvents such as diethylene glycol dimethyl ether, 2-ethoxyethanol, tetrahydrofuran and dioxane, aromatic hydrocarbon-based solvents such as benzene, toluene and xylene, halogenated hydrocarbon-based solvents such as methylene chloride, ethylene chloride, carbon tetrachloride, chloroform, and chlorobenzene, and the like. These may be used alone or mixed appropriately.

Although it is possible to use a kneading device such as a continuous twin-screw kneader, a continuous twin-screw kneader capable of performing dilution in multiple stages, a kneader, a pressurizing kneader, or a roll kneader as a kneading device used to prepare the above coating material, the kneading device is not particularly limited to these devices. Also, although it is possible to use a dispersion device such as a roll mill, a ball mill, a lateral sand mill, a vertical sand mill, a spike mill, a pin mill, a tower mill, a pearl mill (for example, a "DCP mill" manufactured by Eirich), a homogenizer, or an ultrasonic disperser as a dispersion device used for preparing the above coating material, the dispersion device is not particularly limited to these devices.

(Coating Process)

Next, an underlayer forming coating material is applied to one main surface of the substrate 41 and is then dried, and the underlayer 42 is thereby formed. Subsequently, a magnetic layer forming coating material is applied to the underlayer 42 and is then dried, and the magnetic layer 43 is thereby formed on the underlayer 42. Note that the magnetic field of the magnetic powder may be oriented in the thickness direction of the substrate 41 with a solenoid coil, for example, at the time of the drying. Also, the magnetic field of the magnetic powder may be oriented in the running direction (longitudinal direction) of the substrate 41, and the magnetic field may then be orientated in the thickness direction of the substrate 41, with the solenoid coil, for example, at the time of the drying. It is possible to further improve a degree of vertical orientation (that is, the squareness ratio S1) of the magnetic powder by performing the processing of temporarily orientating the magnetic powder in the longitudinal direction in this manner. After the magnetic layer 43 is formed, the back layer 44 is formed on the other main surface of the substrate 41. Thereby, the magnetic tape MT is obtained.

The squareness ratios S1 and S2 are set to desired values by adjusting, for example, the strength of a magnetic field applied to the coating film of the magnetic layer forming coating material, the concentration of solid content in the magnetic layer forming coating material, and drying conditions (a drying temperature and a drying time) of the coating film of the magnetic layer forming coating material. The strength of the magnetic field to be applied to the coating film is preferably two times or more and three times or less the coercive force of the magnetic powder. In order to further increase the squareness ratio S1 (that is, in order to further reduce the squareness ratio S2), it is preferable to improve a dispersed state of the magnetic powder in the magnetic layer forming coating material. Further, in order to further increase the squareness ratio S1, it is also effective to magnetize the magnetic powder at a stage before magnetic layer forming coating material is injected into an orientation device for magnetically orienting the magnetic powder. Note that the above-mentioned method of adjusting the squareness ratios S1 and S2 may be used alone or in combination of two or more.

(Curing Process)

After the magnetic tape is wound in a roll shape, the underlayer and the magnetic layer are cured by performing heating processing on the magnetic tape in this state.

(Calendaring Process)

Next, the obtained magnetic tape MT is subjected to calendaring to smooth the surface of the magnetic layer 43.

(Cutting Process)

Next, the magnetic tape MT is cut to a predetermined width (for example, a width of ½ inches). In this manner, the magnetic tape MT is obtained.

(Servo Pattern Writing Process)

Next, after demagnetization of the magnetic tape is performed, a servo pattern is written on the magnetic tape by using a servo writer, and a plurality of servo bands SB are thereby formed.

(Assembling Process)

Next, the magnetic tape with the servo pattern written thereon is assembled with the cartridge case 12. The cartridge 10 illustrated in FIG. 1 is thereby obtained.

5 Operation and Effect

Once the cartridge 10 according to an embodiment is attached to the drive (not illustrated), the plate spring 23 provided at the bottom wall 133 of the reel 13 is biased toward the screw 106 included at the center of the upper surface of the disk portion 102, and the magnetic surface of the magnetic tape MT and the shaft 103 establish conduction via the reel 13, the plate spring 23, and the screw 106. In this manner, it is possible to curb charging of the magnetic tape MT even in a case where the drive gear 102A of the drive is configured of an insulating resin. Therefore, it is possible to curb breakage of the magnetic head such as a TMR element even in a case where continuous recording and reproducing of the cartridge 10 of multiple windings are performed.

Since the projecting portion 23B of the plate spring 23 is bent when the cartridge 10 is chucked by the drive gear 102A, the contact between the plate spring 23 and the screw 106 does not affect the gear engagement between the reel gear 133A and the drive gear 102A, or the influence is reduced.

In a case where the average height of the protrusions 43A of carbon is set to 12 nm or less, and the lower limit value of the number of protrusions 43A of carbon is preferably set to $1.2/\mu m^2$ or more, it is possible to particularly curb charging of the magnetic tape MT and also to improve electromagnetic conversion characteristics.

6 MODIFICATION EXAMPLES

Modification Example 1

Although the example in which the elastic member with conductivity is the plate spring 23 has been described in the above embodiment, the elastic member with conductivity is not limited to the example and may be a compression coil spring with conductivity, a conductive elastomer, or the like. The conductive elastomer may be formed into a projecting shape with respect to the lower surface of the bottom wall 133. A structure that comes into exact contact with the screw may also be used instead of the spring. In this case, a configuration with a margin for smooth engagement with the drive side is preferably used. As a configuration of a hard material instead of the spring, a member with a ring shape opening at the center that stops with contact with the circumference of the screw is exemplified.

Modification Example 2

Although the example in which the reel 13 contains a synthetic resin and the conductive material has been described in the above embodiment, the reel 13 may include a resin layer and a conductive layer. The resin layer configures the main body of the reel 13. The resin layer is an insulating layer containing a synthetic resin. The conductive layer is provided on the surface of the resin layer. The conductive layer may be a plating later or a thin film. The thin film is a film formed by the vacuum film formation technique and is, for example, a sputtered layer or a deposited layer. The thin film forms a conductive path for connecting the magnetic tape MT and the plate spring 23. For example, the thin film may be provided on the entire surface of the reel 13 or at a part of the surface of the reel 13, or may be provided on the entire surface of the reel hub 13A or at a part of the surface of the reel hub 13A.

In a case where the reel 13 has the above configuration, the surface resistivity of the reel 13 means the surface resistivity of the conductive layer.

Modification Example 3

Although the example in which the entire reel 13, that is, both the reel hub 13A and the flange 13B contain the conductive material and have conductivity has been described in the above embodiment, the configuration of the reel 13 is not limited thereto. For example, only the reel hub 13A out of the reel hub 13A and the flange 13B may contain the conductive material and has conductivity. In this case, the surface resistivity of the reel 13 means the surface resistivity of the reel hub 13A.

Although the example in which the reel hub 13A has a one-piece structure with the hub 131 and flange 132 integrally molded has been described in the above embodiment, the reel hub 13A may have a two-piece structure in which the hub 131 and the flange 132 are separately molded. In this case, both the hub 131 and the flange 132 may contain the conductive material and have conductivity, or only the hub 131 out of the hub 131 and the flange 132 may contain the conductive material and have conductivity.

In a case where both the hub 131 and the flange 132 have conductivity, the surface resistivity of the reel 13 means the surface resistivity of the hub 131. Only the hub 131 out of the hub 131 and the flange 132 contains the conductive material, and the surface resistivity of the reel 13 means the surface resistivity of the hub 131.

Modification Example 4

Although the case where the cartridge is one-reel-type cartridge 10 has been described in the above embodiment, the cartridge may be a two-reel-type cartridge.

EXAMPLES

Hereinafter, the present disclosure will be specifically described with reference to examples, but the present disclosure is not limited to these examples.

In the following examples and comparative examples, the surface resistivity of the reel, the surface resistivity of the magnetic surface of the magnetic tape, the average height of protrusions of carbon, the number of protrusions of carbon, and the average area of the protrusions of carbon are values obtained by the measurement methods described in the above embodiment. Also, the average aspect ratio of magnetic powder, the average particle volume of the magnetic powder, the average thickness of a magnetic layer, the average thickness of a underlayer, the average thickness of the substrate (base film), the average thickness of the back layer, the average thickness of a magnetic tape, the squareness ratio S1 of the magnetic layer in the vertical direction of the magnetic tape, the squareness ratio S2 of the magnetic layer in the longitudinal direction of the magnetic tape, and the like are also values obtained by the measurement methods described in the above embodiment.

Example 1

(Preparation Process of Magnetic Layer Forming Coating Material)

A magnetic layer forming coating material is prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.

(First Composition)

Barium ferrite ($BaFe_{12}O_{19}$) magnetic powder (hexagonal plate shape, average aspect ratio of 3.2, average particle volume of 2500 $nm^3$): 100 parts by mass Resin solution with vinyl chloride-based resin dispersed in cyclohexanone (resin solution: the blending amount of vinyl chloride-based resin: 30% by mass, the blending amount of cyclohexanone: 70% by mass): 60 parts by mass (Vinyl chloride-based resin: Polymerization degree 300, Number average molecular weight Mn=10000, containing $OSO_3K$=0.07 mmol/g and secondary OH=0.3 mmol/g as a polar group)

Aluminum oxide powder having a medium particle size: 5 parts by mass ($\alpha$-Al2O3, average particle size (D50) of 0.09 μm)

(Second Composition)

Resin solution with vinyl chloride-based resin dispersed in cyclohexanone (resin solution: the blending amount of vinyl chloride-based resin: 30% by mass, the blending amount of cyclohexanone: 70% by mass): 3.6 parts by mass (Vinyl chloride-based resin: Polymerization degree 300, Number average molecular weight Mn=10000, containing $OSO_3K$=0.07 mmol/g and secondary OH=0.3 mmol/g as a polar group)

Aluminum oxide powder having a medium particle size: 5 parts by mass n-butyl stearate: 2 parts by mass Methyl ethyl ketone: 121.3 parts by mass Toluene: 121.3 parts by mass Cyclohexanone: 60.7 parts by mass Carbon black: 2.0 parts by mass, Particle size (average arithmetic particle diameter) 70.0 nm (Manufactured by Tokai Carbon Co., Ltd., Trade Name: Seast S)

Finally, 4 parts by mass of polyisocyanate (trade name: Coronate L manufactured by Tosoh Corporation) as a curing agent and 2 parts by mass of stearic acid as a lubricant were added to the magnetic layer forming coating material prepared as described above.

(Preparation Process of Underlayer Forming Coating Material)

An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.

(Third Composition)

Needle-like iron oxide powder (non-magnetic powder) having a medium particle size: 100 parts by mass
  ($\alpha$-$Fe_2O_3$, average major axis length of 0.08 μm)
  Vinyl chloride-based resin: 55.6 parts by mass
  (Resin solution: resin content 30% by mass, cyclohexanone 70% by mass)
  Carbon black: 10 parts by mass
  (average particle size of 20 nm)

(Fourth Composition)

Polyurethane-based resin UR8200 (manufactured by Toyo Boseki Kabushiki Kaisha): 18.5 parts by mass
  n-butyl stearate: 2 parts by mass
  Methyl ethyl ketone: 108.2 parts by mass
  Toluene: 108.2 parts by mass
  Cyclohexanone: 18.5 parts by mass Finally, 4 parts by mass of polyisocyanate (trade name: Coronate L manufactured by Tosoh Corporation) as a curing agent and 2 parts by mass of stearic acid as a lubricant were added to the underlayer forming coating material prepared as described above.

(Preparation Process of Back Layer Forming Coating Material)

A back layer forming coating material was prepared as follows. The following raw materials were mixed in a stirring tank equipped with a disperser and filtered to prepare a back layer forming coating material.

Carbon black powder (average particle diameter (D50) 20 nm): 100 parts by mass
  Polyester polyurethane: 100 parts by mass
  (Made by Nippon Polyurethane Industry Co., Ltd., trade name: N-2304)
  Methyl ethyl ketone: 500 parts by mass
  Toluene: 400 parts by mass
  Cyclohexanone: 100 parts by mass (Coating Process)

An underlayer and a magnetic layer were formed on one main surface of a long polyethylene naphthalate film (hereinafter, referred to as a "PEN film") having an average thickness of 4.00 μm, which is a non-magnetic support, as follows by using the magnetic layer forming coating material and the underlayer forming coating material which were prepared as described above.

First, the underlayer forming coating material was applied to the one main surface of the PEN film and was then heated, and the coating film was dried by blowing wind onto the coating film, and the underlayer with an average thickness of 1.05 μm was thereby formed after calender processing.

Next, the magnetic layer forming coating material was applied to the underlayer and was then heated, the coating film was dried by blowing wind onto the coating film, and the magnetic layer with an average thickness of 0.08 μm was thereby formed after calender processing. During the drying of the magnetic layer forming coating material, the magnetic field of the magnetic powder is oriented in the thickness direction of the film. In this manner, the squareness ratio S1 of the magnetic tape in the vertical direction (thickness direction) was set to 65%, and the squareness ratio S2 of the magnetic tape in the longitudinal direction was set to 38%.

Subsequently, the back layer forming coating material was applied to the other main surface of the PEN film and was then heated, the coating film was dried by blowing wind onto the coating film, and the back layer with an average thickness of 0.50 μm was formed after calender processing. Thereby, a magnetic tape was obtained.

(Curing Process)

After the magnetic tape was wound into a roll shape, the underlayer and the magnetic layer were cured by performing heating processing on the magnetic tape in this state.

(Calendering Process)

Calendering was performed to smooth the surface of the magnetic layer. At this time, the temperature of the calender processing was set to a temperature of 100° C., and the pressure of the calender processing was set to 200 kg/cm.

(Cutting Process)

The magnetic tape obtained as described above was cut into a width of ½ inches (12.65 mm). The magnetic tape having an average thickness of 5.63 μm was thereby obtained.

(Servo Pattern Writing Process)

After the demagnetization of the magnetic tape was performed, five servo bands were formed by writing a servo pattern on the magnetic tape by using a servo writer. The servo pattern was made to comply with the LTO-8 standard.

(Assembling Process)

The magnetic tape with the servo pattern written thereon was assembled with an LTO cartridge. As the LTO cartridge, an LTO cartridge having the configuration illustrated in FIG. 1, that is, the LTO cartridge including the conductive reel and the plate spring was used. The conductive reel was configured of a reel hub and a flange (see FIG. 1) formed of a synthetic resin with carbon added thereto. The surface resistivity of the conductive reel was set to $5\times10^5$ Ω/sq. The average height of the protrusions of carbon, the number of protrusions of carbon, and the average area of protrusions of carbon were adjusted through the above process.

Example 2

In the process for preparing the magnetic layer forming coating material, the height of carbon protrusions, the number of protrusions of carbon, and the average area of the protrusions of carbon were adjusted by using, as the magnetic powder, barium ferrite ($BaFe_{12}O_{19}$) magnetic powder (with the hexagonal plate shape, the average aspect ratio of 3.2, and with the average particle volume of 1600 $nm^3$).

The magnetic tape of 5.62 μm was obtained by setting the average thickness of the PEN film to 3.98 μm, the average thickness of the underlayer after the calender processing to 1.07 μm, and the average thickness of the back layer after the calender processing to 0.49 μm.

A cartridge was obtained similarly to Example 1 other than the above matters.

Example 3

In the process for preparing the magnetic layer forming coating material, barium ferrite ($BaFe_{12}O_{19}$) magnetic powder (with the hexagonal plate shape, the average aspect ratio of 3.2, and the average particle volume of 1600 $nm^3$) was used as the magnetic powder. The height of carbon protrusions, the number of the protrusions of carbon, and the average area of the protrusions of carbon were adjusted by performing tape magnetic layer surface processing with a wrapping tape.

A magnetic tape with an average thickness of 5.57 μm was obtained by setting the average thickness of the underlayer after the calender processing to 1.02 μm and the average thickness of the back layer after the calender processing to 0.47 μm.

A cartridge was obtained similarly to Example 1 other than the above matters.

Comparative Example 1

In the process for preparing the magnetic layer forming coating material, barium ferrite ($BaFe_{12}O_{19}$) magnetic powder (with the hexagonal plate shape, the average aspect ratio of 3.2, and the average particle volume of 1600 $nm^3$) was used as the magnetic powder. Also, the height of carbon protrusions, the number of the protrusions of carbon, and the average area of the protrusions of carbon were adjusted by using, as carbon black, carbon black with a particle size (average arithmetic particle diameter) of 35.0 nm (manufactured by Tokai Carbon Co., Ltd., trade name: Seast 116).

A magnetic tape with an average thickness of 5.71 μm was obtained by setting the average thickness of the PEN film to 4.60 μm, the average thickness of the magnetic layer after the calender processing to 0.06 μm, the average thickness of the underlayer after the calender processing to 0.70 μm, and the average thickness of the back layer after the calender processing to 0.35 μm.

An LTO cartridge similar to that in Example 1 other than that an insulating reel was included instead of the conductive reel was used as the LTO cartridge. The surface resistivity of the insulating reel was set to $6 \times 10^{12}$ Ω/sq.

A cartridge was obtained similarly to Example 1 other than the above matters.

Comparative Example 2

In the process for preparing the magnetic layer forming coating material, the height of carbon protrusions, the number of the protrusions of carbon, and the average area of the protrusions of carbon were adjusted by using needle-shaped metal magnetic powder as magnetic powder.

A magnetic tape with an average thickness of 6.42 μm was obtained by setting the average thickness of the PEN film to 4.80 μm, the average thickness of the magnetic layer after the calender processing to 0.09 μm, the average thickness of the underlayer after the calender processing to 1.08 μm, and the average thickness of the back layer after the calender processing to 0.45 μm.

An LTO cartridge similar to that in Example 1 other than the plate spring was not included was used as an LTO cartridge.

A cartridge was obtained similarly to Example 1 other than the above matters.

Comparative Example 3

In the process for preparing the magnetic layer forming coating material, barium ferrite ($BaFe_{12}O_{19}$) magnetic powder (with the hexagonal plate shape, the average aspect ratio of 3.2, and the average particle volume of 1600 $nm^3$) was used as the magnetic powder. The height of carbon protrusions, the number of protrusions of carbon, and the average area of the protrusions of carbon were adjusted by setting the amount of vinyl chloride-based resin to 65 parts by mass in the first composition.

A magnetic tape with an average thickness of 5.68 μm was obtained by setting the average thickness of the PEN film to 4.02 μm, the average thickness of the underlayer after the calender processing to 1.10 μm, and the average thickness of the back layer after the calender processing to 0.48 μm.

An LTO cartridge similar to that in Comparative Example 2 was used as an LTO cartridge.

A cartridge was obtained similarly to Example 1 other than the above matters.

Comparative Example 4

In the process for preparing the magnetic layer forming coating material, barium ferrite ($BaFe_{12}O_{19}$) magnetic powder (with the hexagonal plate shape, the average aspect ratio of 3.2, and the average particle volume of 1600 $nm^3$) was used as the magnetic powder. First, a first composition was kneaded by an extruder. Next, the kneaded first composition was put into a stirring tank equipped with a Disper, sand mill mixing was performed, the second composition was then added thereto, sand mill mixing was further performed, filtering processing was performed, and the magnetic layer forming coating material was prepared thereby to adjust the height of the carbon protrusions, the number of the protrusions of carbon, and the average area of the protrusions of carbon.

A magnetic tape with an average thickness of 5.69 μm was obtained by setting the average thickness of the PEN film to 4.04 μm, the average thickness of the underlayer after the calender processing to 1.08 μm, and the average thickness of the back layer after the calender processing to 0.49 μm.

An LTO cartridge similar to that in Example 1 other than that an insulating reel was included instead of the conductive reel and the plate spring was not included was used as an LTO cartridge.

A cartridge was obtained similarly to Example 1 other than the above matters.

Comparative Example 5

A second composition of the following blend was used in the process for preparing the magnetic layer forming coating material.

(Second Composition)

Resin solution with vinyl chloride-based resin dispersed in cyclohexanone (resin solution: the blending amount of vinyl chloride-based resin: 30% by mass, the blending amount of cyclohexanone: 70% by mass): 3.6 parts by mass (Vinyl chloride-based resin: Polymerization degree 300, Number average molecular weight Mn=10000, containing $OSO_3K$=0.07 mmol/g and secondary OH=0.3 mmol/g as a polar group)

Aluminum oxide powder having a medium particle size: 5 parts by mass n-butyl stearate: 2 parts by mass
Methyl ethyl ketone: 121.3 parts by mass
Toluene: 121.3 parts by mass
Cyclohexanone: 60.7 parts by mass
First carbon black: 2.0 parts by mass, Particle size (average arithmetic particle diameter) 120.0 nm
(Made by Tokai Carbon Co., Ltd., trade name: Seast TA)
Second carbon black: 1.5 parts by mass, Particle size (average arithmetic particle diameter) 70.0 nm
(Manufactured by Tokai Carbon Co., Ltd., trade name: Seast S)

Also, an LTO cartridge similar to that in Example 1 other than that an insulating reel was included instead of the conductive reel was used as an LTO cartridge.

A cartridge was obtained similarly to Example 1 other than the above matters.

[Evaluation]

The following evaluation was performed for the cartridge obtained as described above.

(Evaluation of Surface Resistivity of Magnetic Tape)

The surface resistivity of the magnetic tape was measured by the method described in the above embodiment. The results are shown in Table 1.

(Evaluation of Electromagnetic Conversion Characteristics)

First, a reproduction signal of the magnetic tape was acquired by using a loop tester (manufactured by Microphysics). Hereinafter, reproduction signal acquisition conditions will be described. Note that measurement was performed with the loop tester by rolling off the magnetic tape by the length of about 1 m from the cartridge and attaching the magnetic tape to the loop tester.

head: GMR headspeed: 2 m/s
Signal: Single recording frequency (20 MHz)
Recording current: Optimal recording current Next, the reproduction signal was taken by a spectrum analyzer in a span of 0 to 20 MHz (resolution band width=100 kHz, VBW=30 kHz). Next, the peak of the taken spectrum was defined as the signal amount S, floor noise except for the peak was accumulated as a noise amount N, and a ratio S/N of the signal amount S and the noise amount N was obtained as a signal-to-noise ratio (SNR). Next, the obtained SNR was converted into a relative value (dB) on the basis of the SNR in Comparative Example 1 as a reference medium. Next, whether or not the electromagnetic conversion characteristics were satisfactory was determined by using the SNR (dB) obtained as described above. The results are shown in Table 1.

More satisfactory: The SNR of the magnetic tape was satisfactory by 1 dB or more than the SNR (=0 (dB)) of the evaluation reference sample (Comparative Example 1).

Satisfactory: The SNR of the magnetic tape was equivalent to the SNR (=0 (dB)) of the evaluation reference sample (Comparative Example 1) or exceeded the SNR (=0 (dB)).

Not satisfactory: The SNR of the magnetic tape was less than the SNR (=0 (dB)) of the evaluation reference sample (Comparative Example 1) over the entire region.

(Evaluation of Running Stability at the Time of 100-Winding Continuous Running)

First, the LTO cartridge was loaded on a LTO drive connected to a PC via an SCSI. Then, a so-called full-volume test of recording data on the entire surface of the magnetic tape and reproducing it was performed by operating the LTO drive by using the PC. The full-volume test was performed on a 100-winding cartridge. Note that discharging of the head with respect to the TMR element may occur if the magnetic tape is charged, and there is a concern that repeated small discharging leads to a damage on the TMR element portion. This method was used since it was known through experiences that loading a tape on a new cartridge is more disadvantageous for charging/discharging than causing one roll of tape to repeatedly run multiple times on the assumption of the same environment.

Next, the running stability at the time of 100-windings continuous running was evaluated by the following criteria. The results are shown in Table 1. Running stability was satisfactory: The recording capacity of fully wound cartridge was 12 TB or more in the LTO8 when 100-winding total length recording and reproduction were conducted.

Running stability was not satisfactory: There were cartridges with recording capacity of less than 12 TB in the LTO8 when 100-winding total length recording and reproduction were conducted.

TABLE 1

|  | Carbon protrusion Average area [nm$^2$] | Carbon protrusion Number [counts/μm$^2$] | Carbon protrusion Average height of protrusion [nm] | SNR [dB] | Surface resistance of magnetic tape [Ω/sq.] | Conductive reel | Conductive plate spring | Continuous running of 100 windings |
|---|---|---|---|---|---|---|---|---|
| Exemple 1 | 8400 | 1.4 | 11.3 | 1.0 | $4.5 \times 10^5$ | Used | Used | Good |
| Example 2 | 9400 | 1.2 | 11.8 | 1.5 | $3.3 \times 10^5$ | Used | Used | Good |
| Example 3 | 9300 | 1.7 | 7.6 | 2.1 | $2.0 \times 10^5$ | Used | Used | Good |
| Comparative Exemple 1 | 18800 | 0.2 | 12.9 | 0.0 | $4.0 \times 10^6$ | Not used | Used | Not good |
| Comparative Example 2 | 3800 | 2.0 | 12.7 | −3.2 | $1.8 \times 10^6$ | Used | Not used | Not good |
| Comparative Example 3 | 8000 | 0.9 | 10.4 | 1.9 | $1.7 \times 10^6$ | Used | Not used | Not good |
| Comparative Example 4 | 8000 | 1.1 | 14.7 | −0.1 | $1.2 \times 10^6$ | Not used | Not used | Not good |
| Comparative Example 5 | 5200 | 2.75 | 12.2 | 0.3 | $4.0 \times 10^5$ | Not used | Used | Not good |

|  | Average particle volume of magnetic powder | Carbon particle size [nm] | Carbon blending amount [parts by mass] | Average thickness of magnetic tape [μm] | Average thickness of magnetic layer [μm] | Average thickness of underlayer [μm] | Average thickness of substrate [μm] | Average thickness of back layer [μm] |
|---|---|---|---|---|---|---|---|---|
| Exemple 1 | Ba ferrite 2500 nm$^3$ | 70.0 | 2.0 | 5.63 | 0.08 | 1.05 | 4.00 | 0.50 |
| Example 2 | Ba ferrite 1600 nm$^3$ | 70.0 | 2.0 | 5.62 | 0.08 | 1.07 | 3.98 | 0.49 |
| Example 3 | Ba ferrite 1600 nm$^3$ | 70.0 | 2.0 | 5.57 | 0.08 | 1.02 | 4.00 | 0.47 |
| Comparative Example 1 | Ba ferrite 1600 nm$^3$ | 35.0 | 2.0 | 5.71 | 0.06 | 0.70 | 4.60 | 0.35 |
| Comparative Example 2 | Needle-shaped metal 3000 nm$^3$ | 70.0 | 2.0 | 6.42 | 0.09 | 1.08 | 4.80 | 0.45 |
| Comparative Example 3 | Ba ferrite 1600 nm$^3$ | 70.0 | 2.0 | 5.68 | 0.08 | 1.10 | 4.02 | 0.48 |

TABLE 1-continued

| | | | | | | | | |
|---|---|---|---|---|---|---|---|---|
| Comparative Example 4 | Ba ferrite 1600 nm³ | 70.0 | 2.0 | 5.69 | 0.08 | 1.08 | 4.04 | 0.49 |
| Comparative Example 5 | Ba ferrite 2500 nm³ | 120.0 70.0 | 2.0 1.5 | 5.63 | 0.08 | 1.05 | 4.00 | 0.50 |

The following can be seen from Table 1.

Charging of the magnetic tape is curbed by the cartridge including the conductive reel and including the plate spring on the bottom wall of the reel, and adhesion between the magnetic tape and the head is curbed. Therefore, satisfactory running stability is obtained.

Also, if the average height of the protrusions of carbon black is 12 nm or less, it is possible to curb degradation of outputs due to a spacing loss and thereby to curb degradation of electromagnetic conversion characteristics.

While embodiments and modification examples of the present disclosure have been described above in detail, the present disclosure is not limited to the above embodiments and modification examples, and various modifications based on the technical idea of the present disclosure can be made. For example, the configurations, methods, processes, shapes, materials, numerical values, and the like exemplified in the above embodiments and modification examples are only examples, and as necessary, different configurations, methods, processes, shapes, materials, numerical values, and the like may be used. The configurations, methods, processes, shapes, materials, numerical values, and the like of the above embodiments and modification examples can be combined with each other as long as they do not deviate from the gist of the present disclosure.

The chemical formulas of the compounds and the like exemplified in the above embodiments and modification examples are representative, and a general name of the same compound is not limited to the listed valences and the like. In the numerical ranges stated in stages in the above embodiments and modification examples, the upper limit value or the lower limit value of the numerical range of a certain stage may be replaced with the upper limit value or the lower limit value in the numerical range of another stage. Unless otherwise specified, the materials exemplified in the above embodiments and modification examples may be used alone or two or more thereof may be used in combination.

In addition, the present disclosure may have the following constitutions.

(1)

A cartridge including: a reel that has conductivity and includes a bottom wall; a magnetic tape that is wound around the reel; and a conductive member that is in contact with the reel, in which the conductive member has a reel gear on a lower surface of the bottom wall.

(2)

The cartridge according to (1), in which the conductive member is provided on the lower surface of the bottom wall and at a center portion.

(3)

The cartridge according to (1) or (2), in which the reel gear having a projecting shape is provided at an outer peripheral portion of the conductive member.

(4)

The cartridge according to any of (1) to (3), in which the conductive member is a spring that is able to stretch in a projecting direction of the reel gear.

(5)

A cartridge including: a reel that has conductivity; a magnetic tape that is wound around the reel; and an elastic member that has conductivity, in which the reel has a reel gear that meshes with a drive gear, and the elastic member is configured to be able to be biased toward a conductive portion included in a spindle of a drive when the reel gear meshes with the drive gear.

(6)

The cartridge according to (5), in which the elastic member is a plate spring.

(7)

The cartridge according to (5) or (6), in which the elastic member is provided on a rotation shaft of the reel.

(8)

The cartridge according to any of (5) to (7), in which a surface resistivity of the reel is $1 \times 10^6$ Ω/sq. or less.

(9)

The cartridge according to any of (5) to (8), in which the reel includes a conductive particle.

(10)

The cartridge according to any of (5) to (9), in which the reel includes carbon.

(11)

The cartridge according to (9), in which the conductive portion is a fixing member.

(12)

The cartridge according to (11), wherein the fixing member is a screw.

(13)

The cartridge according to any of (5) to (12), wherein a surface resistivity of a magnetic surface of the magnetic tape is $1 \times 10^6$ Ω/sq. or less.

(14)

The cartridge according to any of (5) to (13), in which a tunnel magneto resistance effect element is used for reproducing the magnetic tape.

(15)

The cartridge according to any of (5) to (14), in which an average thickness of the magnetic tape is 5.3 μm or less.

(16)

The cartridge according to any of (5) to (15), in which the magnetic tape includes a substrate, an underlayer, and a magnetic layer in order, the magnetic layer includes magnetic powder and carbon, and the magnetic layer has, on a surface thereof, protrusions configured of the carbon and an average height of the protrusions is 12 nm or less.

(17)

The cartridge according to (16), in which the number of the protrusions per unit area on a surface of the magnetic layer is 1.2/μm² or more.

(18)

The cartridge according to (16) or (17), in which an average area of the protrusions is 8000 nm² or more and 15000 nm² or less.

REFERENCE SIGNS LIST

10 Cartridge
12 Cartridge case

12A Lower shell
12B Upper shell
13 Reel
13A Reel hub
13B Flange
11 Cartridge memory
22 Metal plate
23 Plate spring
31 Antenna coil
32 Rectification and power circuit
33 Clock circuit
34 Detection and modulation circuit
35 Controller
36 Memory
36A First storage region
36B Second storage region
41 Substrate
42 Underlayer
43 Magnetic layer
43A Protrusion
44 Back layer
56 Head
56A, 56B Servo lead head
101 Spindle
102 Disk portion
102A Drive gear
103 Shaft
104 Magnet
105 Magnet fixing jig
106 Screw
110 Servo frame
111 Servo subframe 1
111A A burst
111B B burst
112 Servo subframe 2
112C C burst
112D D burst
113 Servo stripe
131 Hub 131
132 Flange
133 Bottom wall
133A Reel gear
MT Magnetic tape
SB Servo band
DB Data bind

The invention claimed is:

1. A cartridge comprising:
a reel that has conductivity;
a magnetic tape that is wound around the reel; and
an elastic member that has conductivity,
wherein the reel has a reel gear that meshes with a drive gear, and
the elastic member is configured to be able to be biased toward a conductive portion included in a spindle of a drive when the reel gear meshes with the drive gear, and
wherein the magnetic tape includes a substrate, an underlayer, and a magnetic layer in order,
the magnetic layer includes magnetic powder and carbon, and
the magnetic layer has, on a surface thereof, protrusions configured of the carbon and an average height of the protrusions is 12 nm or less.

2. The cartridge according to claim 1, wherein the elastic member is a plate spring.

3. The cartridge according to claim 1, wherein the elastic member is provided on a rotation shaft of the reel.

4. The cartridge according to claim 1, wherein a surface resistivity of the reel is $1 \times 10^6$ Ω/sq. or less.

5. The cartridge according to claim 1, wherein the reel includes conductive particles.

6. The cartridge according to claim 1, wherein the reel includes carbon.

7. The cartridge according to claim 1, wherein the conductive portion is a fixing member.

8. The cartridge according to claim 7, wherein the fixing member is a screw.

9. The cartridge according to claim 1, wherein a surface resistivity of a magnetic surface of the magnetic tape is $1 \times 10^6$ Ω/sq. or less.

10. The cartridge according to claim 1, wherein a tunnel magneto resistance effect element is used for reproducing the magnetic tape.

11. The cartridge according to claim 1, wherein an average thickness of the magnetic tape is 5.3 μm or less.

12. The cartridge according to claim 5, wherein the number of the protrusions per unit area on a surface of the magnetic layer is $1.2/\mu m^2$ or more.

13. The cartridge according to claim 5, wherein an average area of the protrusions is 8000 $nm^2$ or more and 15,000 $nm^2$ or less.

* * * * *